US009265263B2

(12) United States Patent
Whited et al.

(10) Patent No.: US 9,265,263 B2
(45) Date of Patent: Feb. 23, 2016

(54) FLEX SHAFT-TOOL CONNECTION FOR POWER OPERATED ROTARY KNIFE

(75) Inventors: Jeffrey A. Whited, Amherst, OH (US); Nicholas A. Mascari, Wellington, OH (US)

(73) Assignee: Bettcher Industries, Inc., Birmingham, OH (US)

(*) Notice: Subject to any disclaimer, the term of this patent is extended or adjusted under 35 U.S.C. 154(b) by 21 days.

(21) Appl. No.: 13/434,403

(22) Filed: Mar. 29, 2012

(65) Prior Publication Data

US 2013/0174424 A1 Jul. 11, 2013

Related U.S. Application Data

(63) Continuation-in-part of application No. 13/344,760, filed on Jan. 6, 2012.

(51) Int. Cl.
F16C 1/02 (2006.01)
A22B 5/16 (2006.01)
B26B 25/00 (2006.01)
(Continued)

(52) U.S. Cl.
CPC ............... *A22B 5/165* (2013.01); *B26B 25/002* (2013.01); *F16C 1/06* (2013.01); *F16C 1/08* (2013.01); *F16C 1/02* (2013.01)

(58) Field of Classification Search
USPC ................. 464/52, 53, 173, 177, 182; 30/276
See application file for complete search history.

(56) References Cited

U.S. PATENT DOCUMENTS 1,324,787 A * 12/1919 Berge ............................... 464/53
1,433,537 A * 10/1922 Elliott ............................. 464/53
(Continued)

FOREIGN PATENT DOCUMENTS

WO WO9859192 12/1998
WO WO2005010423 2/2005
WO WO2010011883 1/2010

OTHER PUBLICATIONS

International Search Report dated Oct. 4, 2012 and Written Opinion of the International Searching Authority dated Oct. 4, 2012 for PCT International Application No. PCT/US2012/046611, filed Jul. 13, 2012. PCT International Application No. PCT/US2012 corresponds to and claims priority from the parent application (U.S. Appl. No. 13/344,760, filed Jan. 6, 2012) of the present application. (8 pages).

(Continued)

*Primary Examiner* — Gregory Binda
*Assistant Examiner* — Matthieu Setliff
(74) *Attorney, Agent, or Firm* — Tarolli, Sundheim, Covell & Tummino LLP

(57) ABSTRACT

A driver assembly detachably coupled between a flexible shaft drive transmission having an outer casing and an elongated drive transmitting shaft rotatable within the outer casing and a handle assembly of a power operated toot to provide rotational power from a coupler fitting of the drive transmitting shaft and a drive train of the power operated rotary knife. The driver assembly includes: a tube assembly comprising a main tube defining a throughbore and first and second bushings disposed within the throughbore at respective first and second ends of the main tube and a casing coupler secured to and extending beyond the second end of the main tube, the casing coupler configured to releasably attach the driver assembly to the outer casing; and an elongated shaft supported for rotation by the first and second bushings of the tube assembly.

20 Claims, 35 Drawing Sheets

(51) Int. Cl.
*F16C 1/06* (2006.01)
*F16C 1/08* (2006.01)

(56) References Cited

U.S. PATENT DOCUMENTS

| | | | | |
|---|---|---|---|---|
| 1,530,381 | A * | 3/1925 | Leedom | 464/52 X |
| 1,828,820 | A * | 10/1931 | Schulse | 464/53 X |
| 1,926,999 | A * | 9/1933 | Keller | 464/53 X |
| 1,929,869 | A | 10/1933 | Hassner | |
| 1,993,368 | A | 3/1935 | Goldberg | |
| 2,008,920 | A * | 7/1935 | Moir | 464/53 X |
| 2,222,613 | A * | 11/1940 | Green | 464/53 |
| 2,586,359 | A * | 2/1952 | Mall | 464/53 |
| 2,596,335 | A * | 5/1952 | Kessler | 464/53 |
| 2,679,061 | A * | 5/1954 | Baker | 464/53 X |
| 2,884,771 | A * | 5/1959 | Holt | 464/53 |
| 2,918,808 | A | 12/1959 | Botti | |
| 3,190,084 | A * | 6/1965 | Moon et al. | 464/53 |
| 3,211,485 | A | 10/1965 | Petersen | |
| 3,250,088 | A * | 5/1966 | Hanebuth | 464/53 |
| 3,440,836 | A | 4/1969 | Petersen | |
| 3,505,831 | A * | 4/1970 | Beach et al. | 464/53 |
| 3,545,585 | A | 12/1970 | Eaton, Jr. | |
| 3,606,260 | A | 9/1971 | Rubin | |
| 4,114,484 | A | 9/1978 | Feamster | |
| 4,335,480 | A | 6/1982 | Liu | |
| 4,345,445 | A | 8/1982 | Warthen | |
| 4,416,644 | A * | 11/1983 | Kulischenko et al. | 464/52 |
| 4,436,125 | A | 3/1984 | Blenkush | |
| 4,894,915 | A | 1/1990 | Decker et al. | |
| 4,938,731 | A | 7/1990 | Nguyen et al. | |
| 4,964,839 | A * | 10/1990 | Gloor | 464/52 X |
| 4,989,323 | A * | 2/1991 | Casper et al. | 30/276 X |
| 5,033,777 | A | 7/1991 | Blenkush | |
| 5,496,218 | A | 3/1996 | Brahler | |
| 5,501,580 | A | 3/1996 | Barrus et al. | |
| 5,971,681 | A | 10/1999 | Wolfe et al. | |
| 6,354,949 | B1 | 3/2002 | Baris et al. | |
| 6,470,560 | B1 | 10/2002 | Wanner et al. | |
| 6,550,145 | B2 | 4/2003 | Stoll et al. | |
| 6,694,649 | B2 * | 2/2004 | Whited et al. | 30/276 |
| 6,751,872 | B1 * | 6/2004 | Whited et al. | 30/276 |
| 6,790,144 | B2 | 9/2004 | Talesky | |
| 6,821,048 | B2 | 11/2004 | Talesky | |
| 6,978,548 | B2 * | 12/2005 | Whited et al. | 30/276 |
| 7,153,202 | B2 | 12/2006 | Rosu et al. | |
| 7,207,114 | B2 | 4/2007 | Rosu et al. | |
| 7,695,020 | B2 | 4/2010 | Schmidt | |
| 2002/0004988 | A1 | 1/2002 | Stoll et al. | |
| 2006/0019755 | A1 * | 1/2006 | Rosu et al. | 464/52 |
| 2006/0037200 | A1 | 2/2006 | Rosu et al. | |
| 2007/0078012 | A1 | 4/2007 | Rosu et al. | |
| 2009/0183887 | A1 | 7/2009 | Baber et al. | |
| 2010/0170097 | A1 | 7/2010 | Levsen | |
| 2011/0140379 | A1 | 6/2011 | Knieriem et al. | |
| 2011/0188928 | A1 | 8/2011 | West et al. | |

OTHER PUBLICATIONS

International Search Report dated Nov. 27, 2012 and Written Opinion of the International Searching Authority dated Nov. 27, 2012 for PCT International Application No. PCT/US2012/046619 filed Jul. 13, 2012. PCT International Application No. PCT/US2012/046619 corresponds to and claims priority from the present application. (13 pages).

International Search Report dated Jul. 3, 2014 and Written Opinion of the International Searching Authority dated Jul. 3, 2014 for PCT International Application No. PCT/US2014/023147, filed Mar. 11, 2014. PCT International Application No. PCT/US2014/023147 corresponds to and claims priority from U.S. Appl. No. 13/829,702, filed Mar. 14, 2013 (now issued as U.S Pat. No. 9,121,438 on Sep. 1, 2015). U.S. Appl. No. 13/829,702 is a continuation-in-part of the present application. (9 pages).

Chinese Search Report and Text of First Office Action dated May 20, 2015 for Chinese Application No. 201280071230.6, fled Sep. 5, 2014, Chinese Application No. 201250071230.6 is a national phase application of PCT international Application No, PCT/US2012/046619. PCT international Application No. PCT/2012/046619, filed Jul. 13, 2012 corresponds to and claims priority from the present application. (Chinese Publication No. CN 1951201A cited in the Chinese Search Report corresponds to U.S. Published Application No. US 2007/0078012). (13 pages).

* cited by examiner

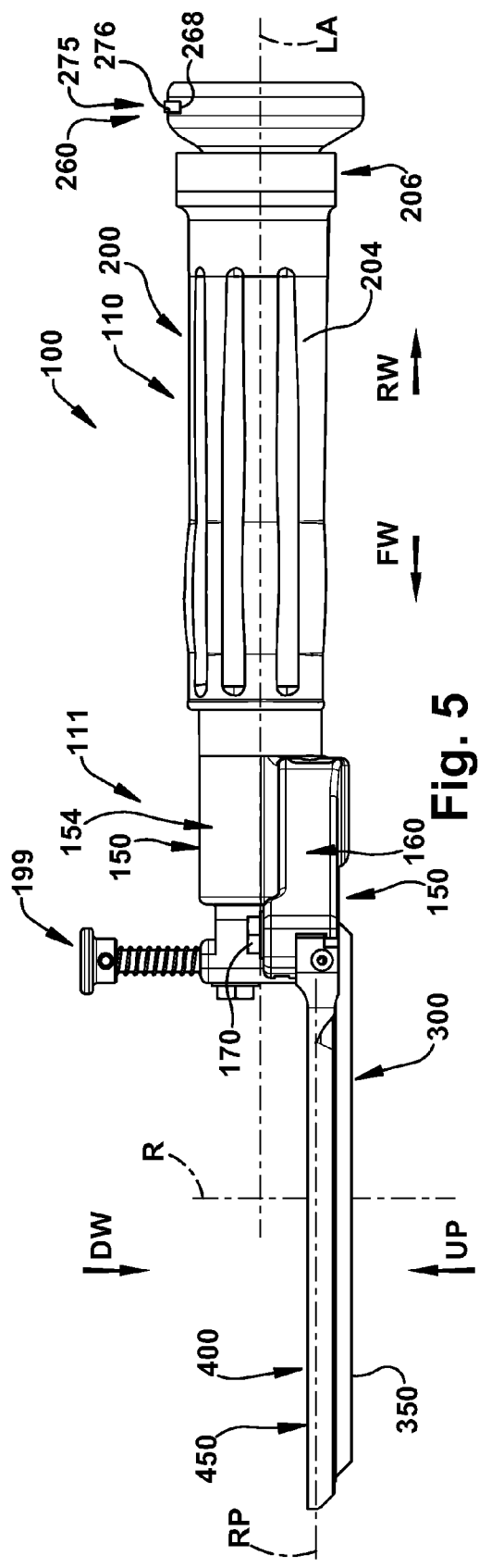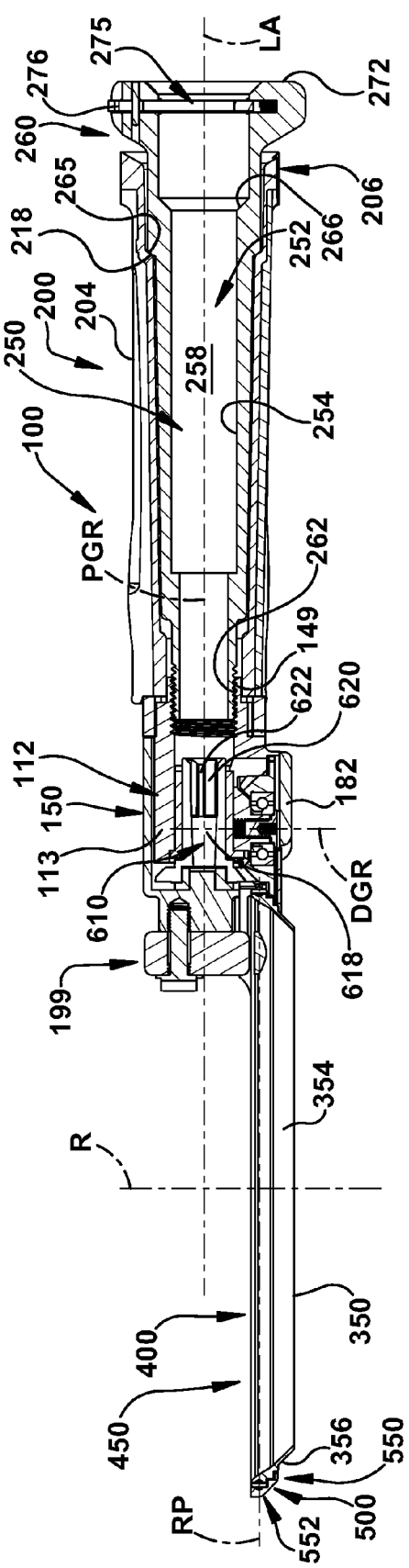

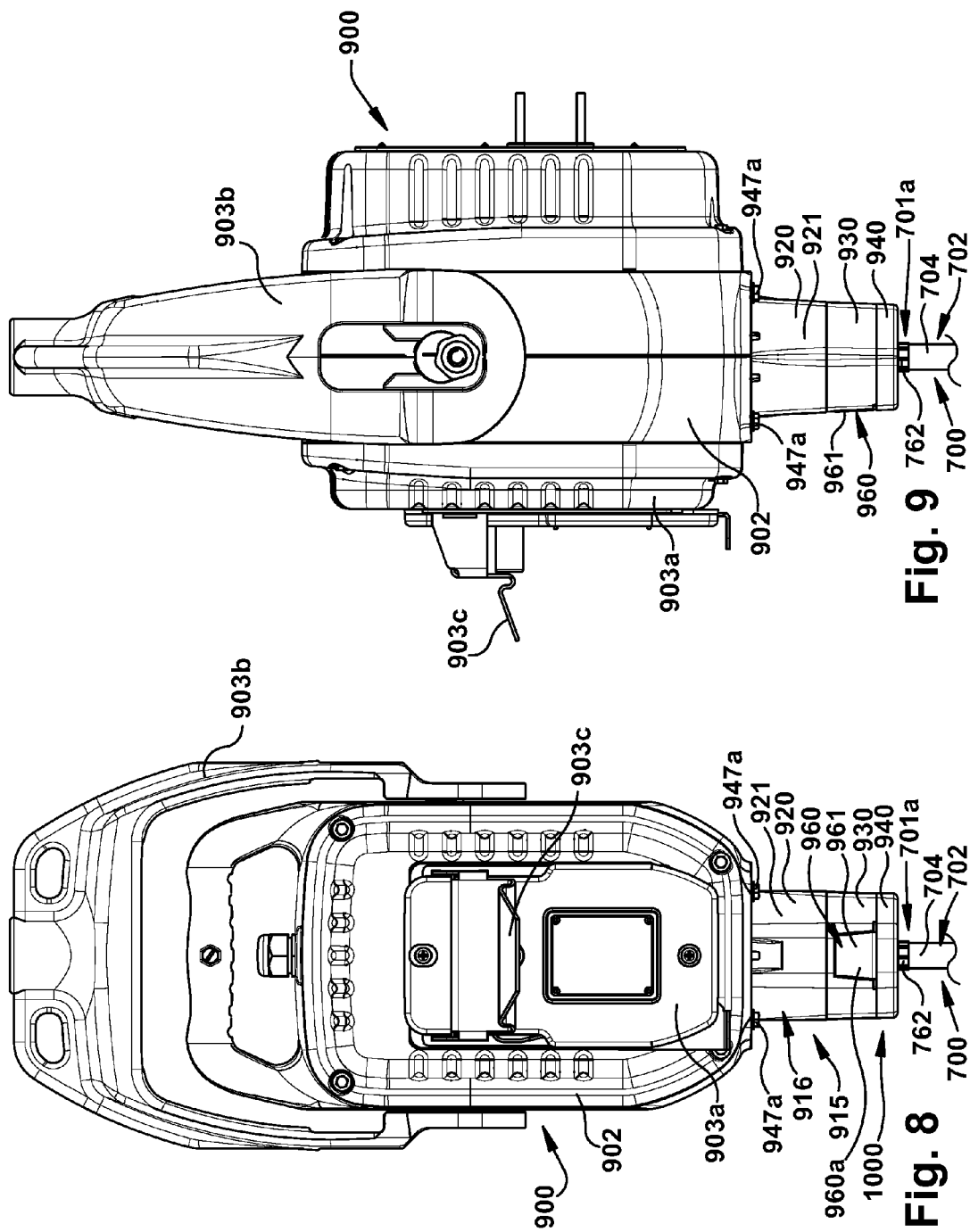

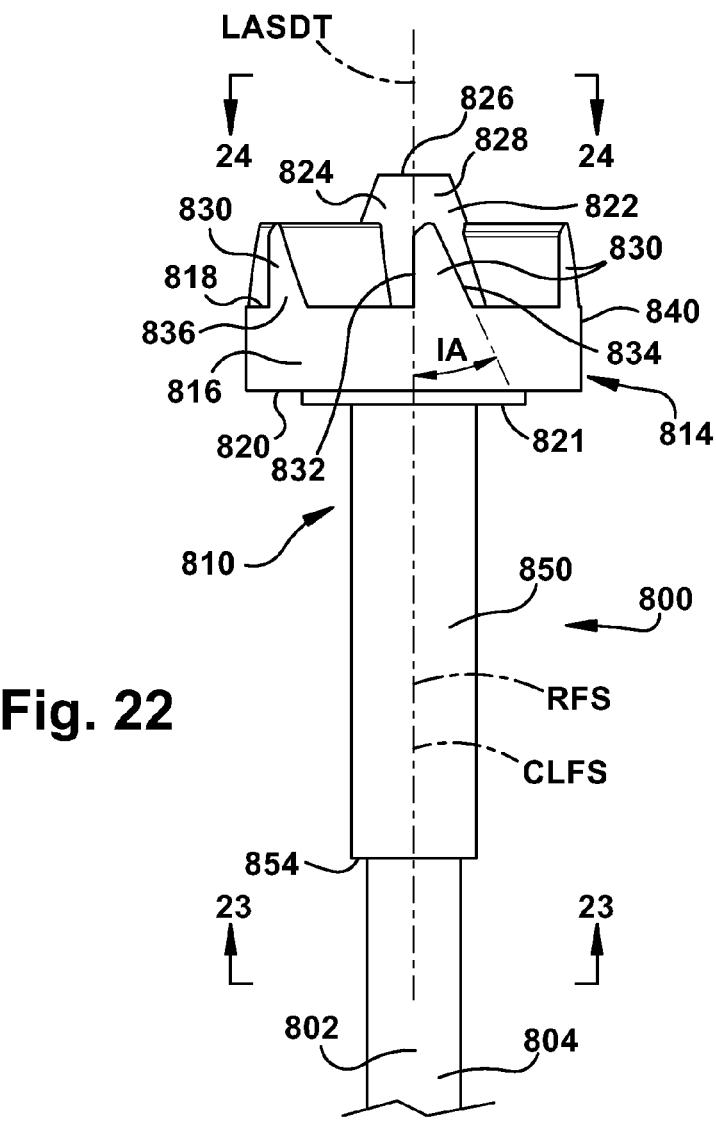
Fig. 22
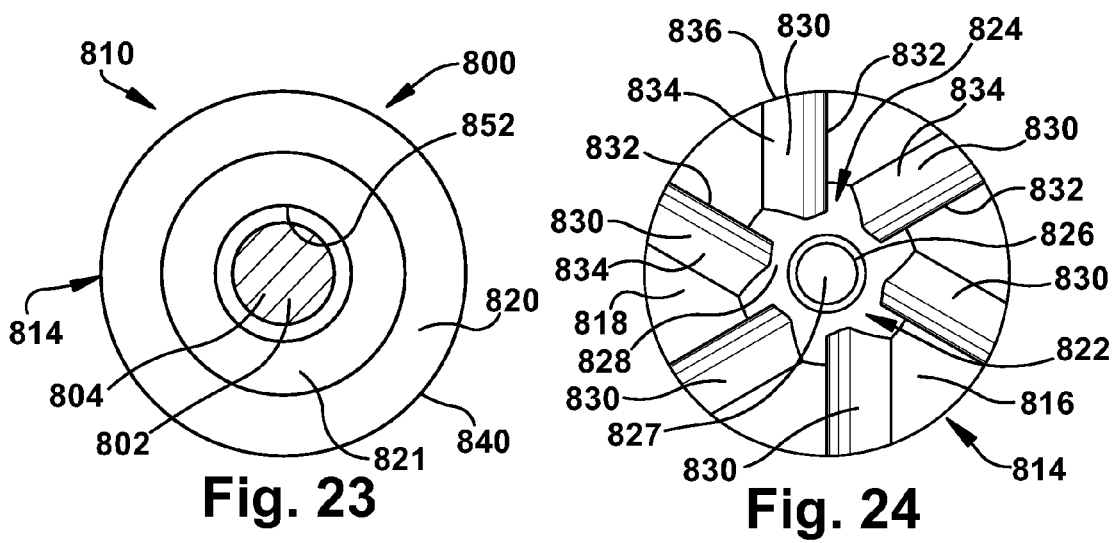
Fig. 23
Fig. 24

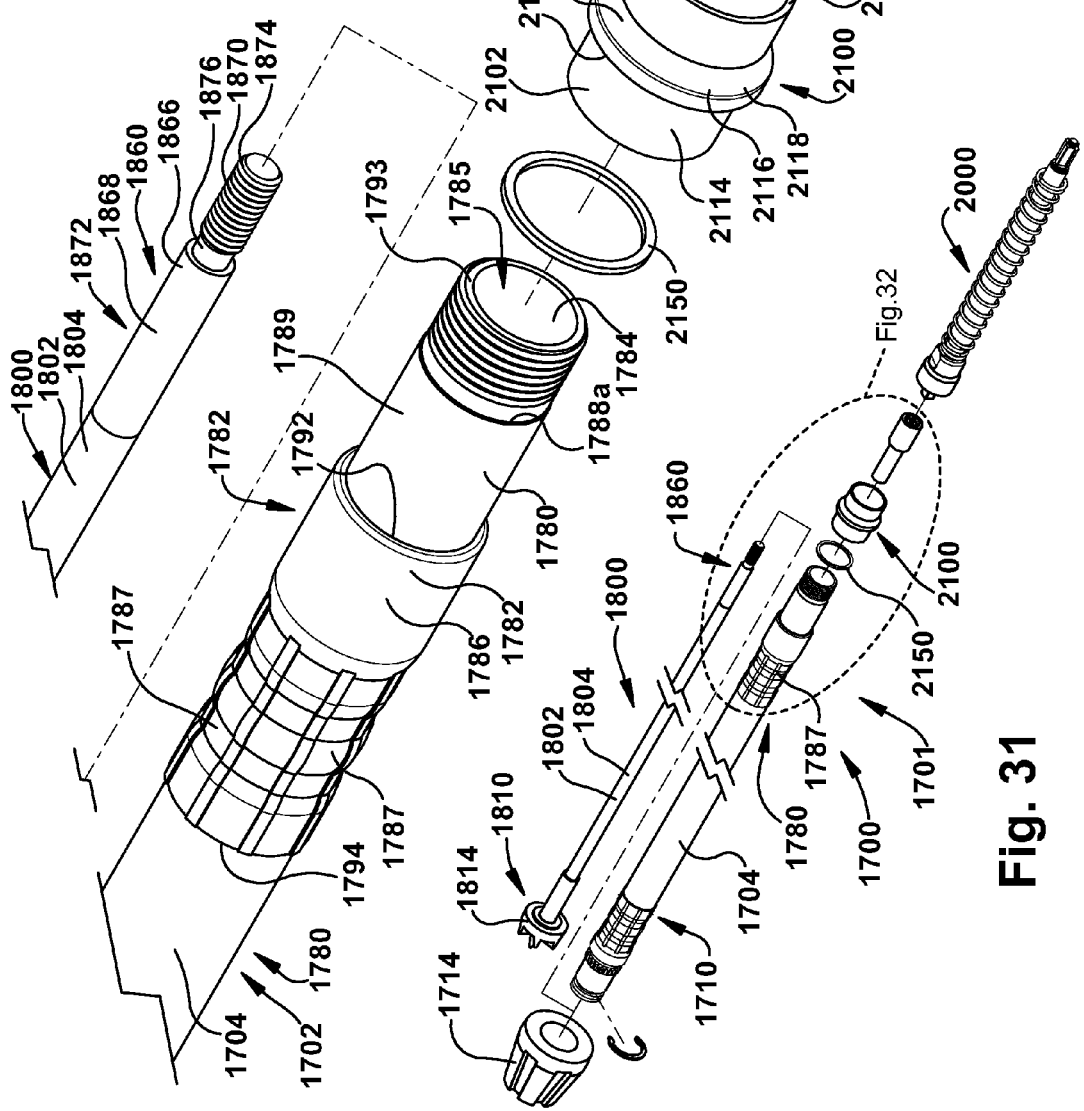

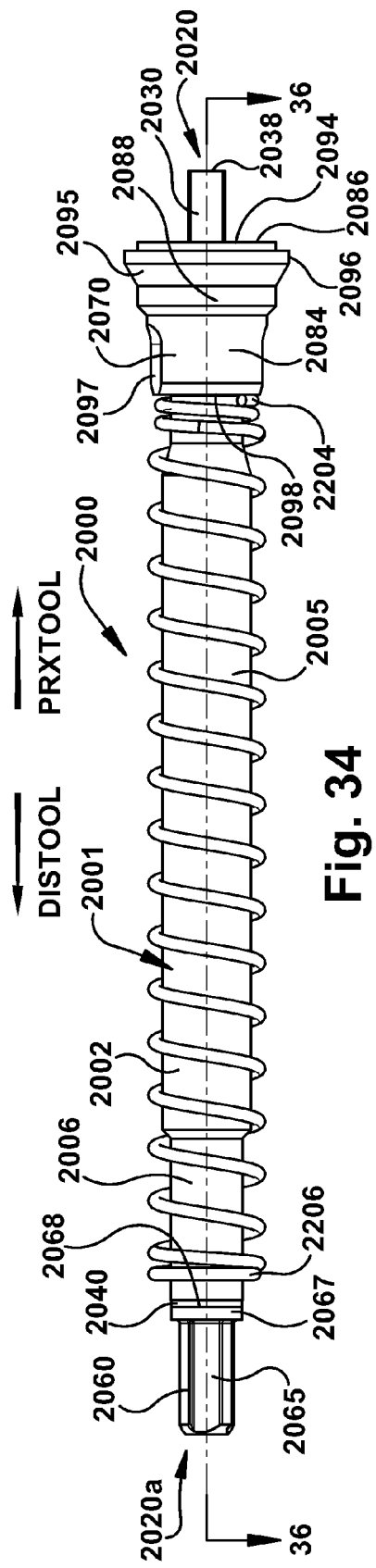
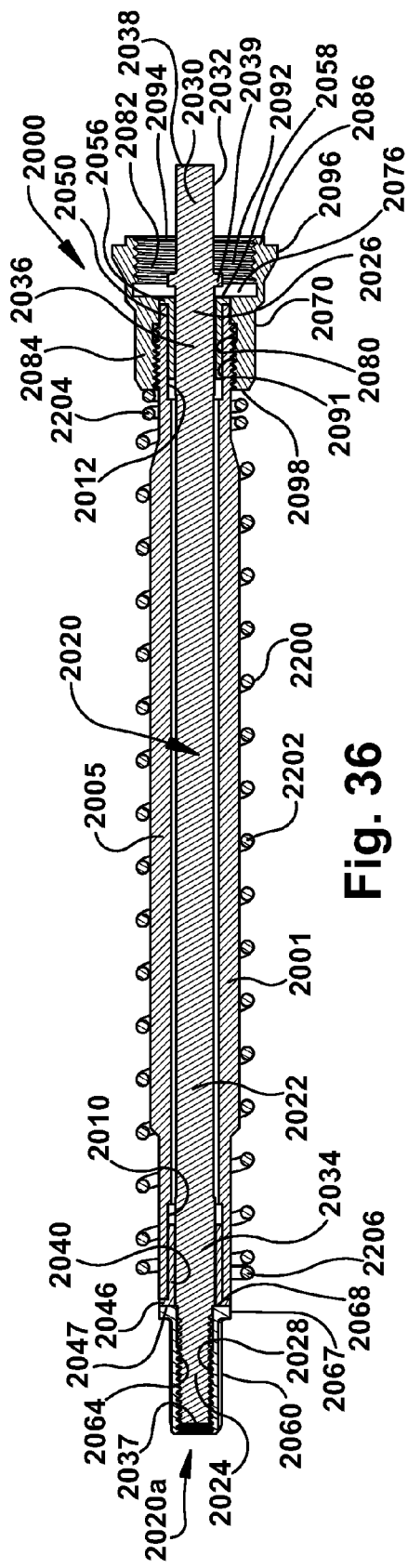

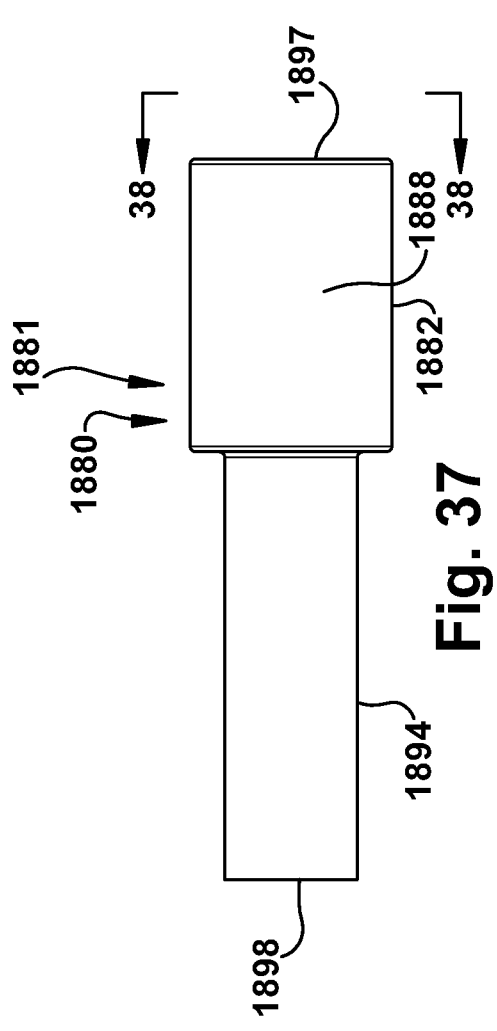
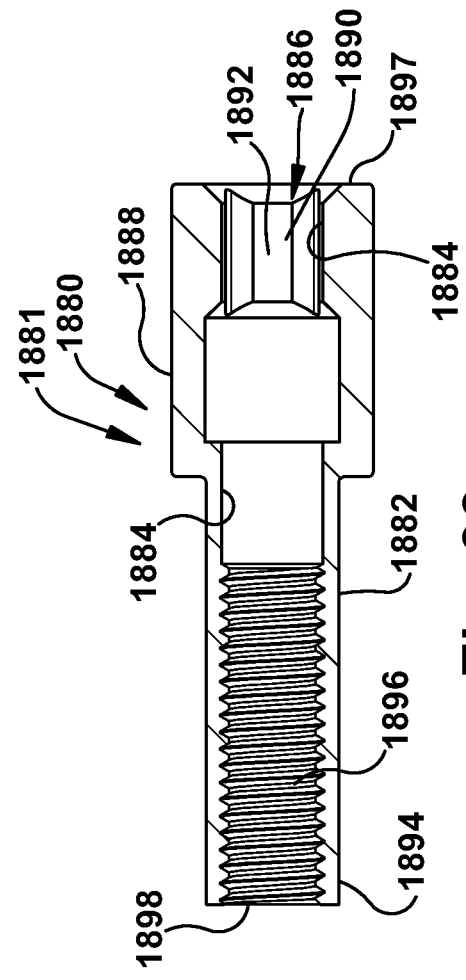
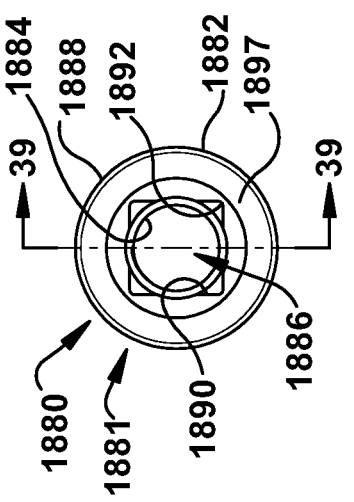
Fig. 37
Fig. 39
Fig. 38

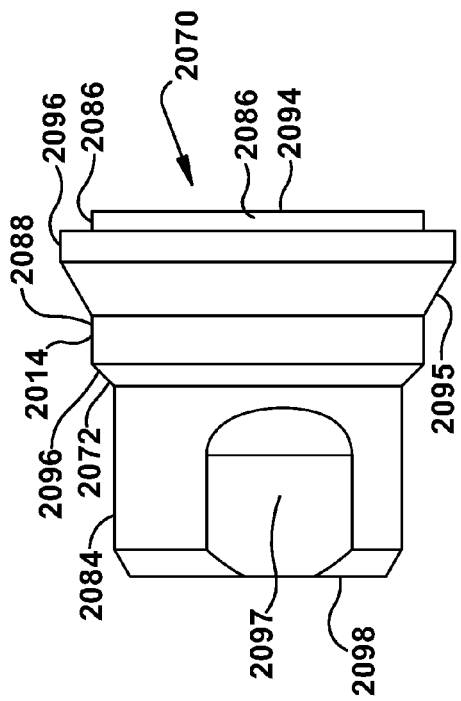
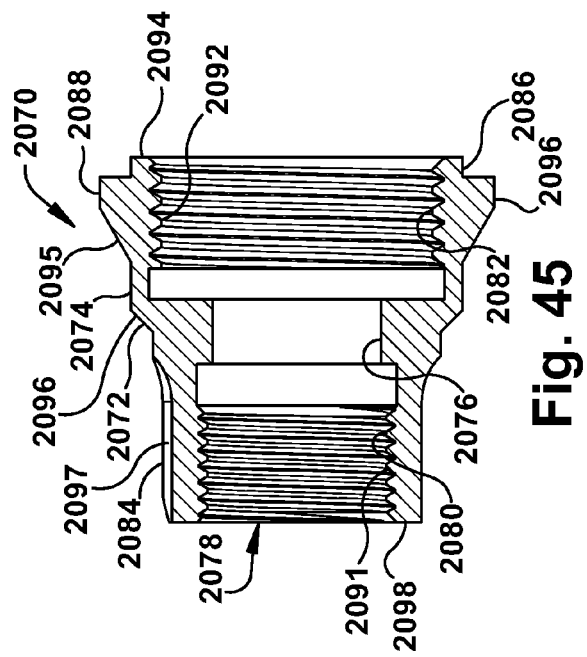
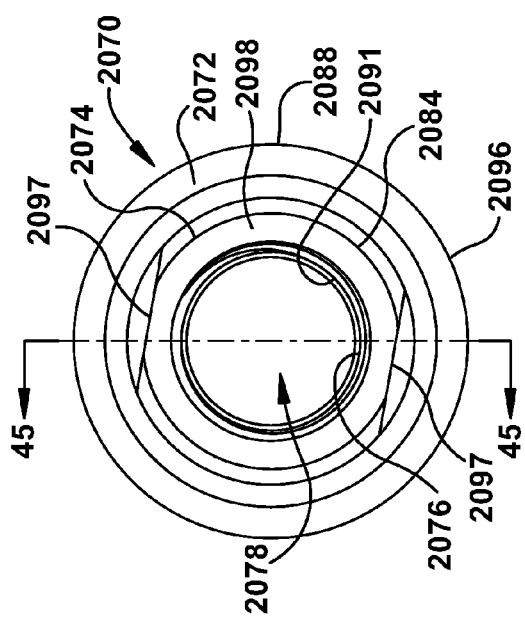

FLEX SHAFT-TOOL CONNECTION FOR POWER OPERATED ROTARY KNIFE

CROSS-REFERENCE TO RELATED APPLICATION

The present application is a continuation-in-part application of U.S. application Ser. No. 13/344,760, filed Jan. 6, 2012, now U.S. Pat. No. 8,968,107, and entitled FLEX SHAFT - DRIVE MOTOR CONNECTION FOR POWER OPERATED ROTARY KNIFE. The present application claims priority from above-identified application Ser. No. 13/344,760, now U.S. Pat. No. 8,968,107, which is incorporated herein in its entirety by reference, for all purposes.

TECHNICAL FIELD

The present disclosure relates to a drive interface or drive connection structure for a flexible shaft drive transmission and a gear train of a power operated tool, such as a power operated rotary knife, to provide rotational power from an external drive motor to the gear train of the power operated tool, and, more specifically, to a drive connection structure wherein the flexible shaft drive transmission comprises an outer casing assembly and an elongated drive transmitting shaft assembly rotatable within the outer casing assembly including a coupler fitting that is secured to a tool end of the drive transmitting shaft, the coupler fitting including a cylindrical outer surface to seal against a bushing of the outer casing assembly to mitigate leakage of lubricant and an enlarged distal head to maintain an axial position of the drive transmitting shaft with respect to the outer casing assembly, the drive connection structure further including a driver assembly releasably secured between a distal end of the outer casing and a handle assembly of the power operated tool, the driver assembly including a main tube and a driver shaft supported for rotation within the main tube by spaced apart bushings positioned at opposite axial ends of the main tube, the driver shaft operatively coupled between the coupler fitting and the drive train of the power operated tool.

BACKGROUND

Power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy; cutting and trimming of elastomeric or urethane foam for a variety of applications including vehicle seats; and tissue removal or debriding in connection with medical/surgical procedures and/or tissue recovery from a body of a human or animal donor.

Power operated rotary knives typically include a handle assembly and a head assembly. The head assembly includes an annular blade housing and an annular rotary knife blade supported for rotation by the blade housing. The head assembly of a power operated rotary knife also includes a gearbox housing which supports a gear train for rotatably driving the rotary knife blade. In some instances, the gear train supported in the gearbox housing may comprise a single gear, in other instances; the gear train may include a plurality of gears for driving the rotary knife blade. The gear train is part of a drive assembly for the power operated rotary knife, the gear train being internal to the rotary knife. Power operated rotary knives having various gear train embodiments including a gear train comprising a single gear and a gear train including a plurality of gears are disclosed in U.S. patent application Ser. No. 13/189,925 to Whited et al., filed on Jul. 25, 2011 ("the '925 application"). The '925 application is assigned to the assignee of the present application and is incorporated herein, in its entirety, by reference.

The drive assembly also includes components external to the power operated rotary knife including an external drive motor and a flexible shaft drive transmission. Motive or rotational power which drives the gear train of the power operated rotary knife is typically provided from an external drive motor and transmitted through a flexible shaft drive transmission. The flexible shaft drive transmission typically includes an elongated drive transmitting shaft which rotates within an outer casing. The elongated drive transmitting shaft includes a driven fitting at one end of the drive transmitting shaft that engages and is rotated by the mating drive fitting of the drive motor and a drive fitting at the opposite end of the drive transmitting shaft that engages and rotates a mating driven fitting of the gear train of the power operated rotary knife. Rotation of the drive transmitting shaft by the external motor rotates the gear train of the power operated rotary knife, which, in turn, rotates the rotary knife blade.

The outer casing of a typical flexible shaft drive transmission includes a first, motor end coupling at one end of the outer casing which is adapted to be releasably coupled to a mating coupling of the drive motor, such that, when the motor end coupling and the drive motor coupling are engaged, the driven fitting of the drive transmitting shaft engages and is rotationally driven by the drive fitting of the drive motor. A second, handle assembly coupling at the opposite end of the outer casing is adapted to be releasably coupled to the handle assembly of the power operated rotary knife such that the drive fitting of the drive transmitting shaft engages and drives the driven fitting of the gear train of the power operated rotary knife.

Typically, lubricant, such as lubricant grease, is disposed between the outer casing and the drive transmitting shaft of the flexible shaft drive transmission. One recurring problem with respect to the handle assembly coupling end of the flexible shaft drive transmission is that lubricant would tend to leak out between the shaft and the outer casing. The drive motor is typically mounted on a hanger positioned above the work area where a power operated rotary knife is manipulated by an operator to trim or cut a product. Thus, motor end coupling of the flexible shaft drive transmission is typically at a higher vertical position than the handle assembly coupling end of the flexible shaft drive transmission. Because of the lower vertical position of the handle assembly coupling, gravity causes the lubricant to migrate or drain toward the handle assembly coupling. Thus, leakage of lubricant between the drive transmitting shaft and the outer casing at the handle assembly coupling end of the flexible shaft drive transmission typically is a much greater problem than at the motor coupling end. Various attempts have been made to minimize lubricant leakage through the handle assembly coupling end of the shaft drive transmission such as, for example, the structures disclosed in U.S. Pat. Nos. 6,3514,949 to Baris et al. and 7,153,202 to Rosu et al., both of which are assigned to the assignee of the present disclosure. However, the problem persisted.

At least in part because of the loss of lubricant through leakage, in prior flexible shaft drive transmissions, the drive transmitting shaft would have to be periodically removed from the outer casing to inject new lubricant into the transmission. If sufficient lubricant leaks out between the drive transmitting shaft and the outer casing, undesirable friction and heat will be generated by contact between the rapidly rotating drive transmitting shaft and the stationary outer casing. Without the periodic disassembly of the shaft drive transmission to inject new lubricant into the outer casing of prior flexible shaft drive transmissions, the operating life of the drive transmitting shaft and the outer casing would be significantly reduced because of increased heat and wear resulting from lack of sufficient lubricant. However, periodic maintenance of the shaft drive transmission, like any required maintenance, is costly in terms of both labor required for maintenance and downtime of the equipment.

An additional problem with prior flexible shaft drive transmission stemmed from the fact that the drive transmitting shaft was not secured within the casing. Specifically, when the motor end coupling is released from the drive motor coupling, the drive transmitting shaft will tend to slide out of the outer casing. This is both inconvenient for the operator of the power operated rotary knife and can result in contamination of the flexible shaft drive transmission.

SUMMARY

In one aspect, the present disclosure relates to a flexible shaft drive transmission coupled between a drive motor and a gear train of a power operated tool, the flexible shaft drive transmission comprising: a) an elongated drive shaft assembly including a rotatable drive transmitting shaft extending along a longitudinal axis, a first driven fitting at one end of the drive transmitting shaft and a second drive fitting at a second end of the drive transmitting shaft, the first driven fitting and the second drive fitting rotating with the drive transmitting shaft; b) an outer casing including first and second ends and defining a throughbore, the outer casing receiving the drive transmitting shaft within the throughbore and supporting the drive transmitting shaft for rotation within the outer casing; and c) a coupling affixed to the first end of the outer casing and adapted to be releasably connected to the drive motor, the motor end coupling including a coupling body defining a central opening through which the drive transmitting shaft passes and having an outer surface defining a tapered region, the tapered region having a proximal end and a distal end, the proximal end of the tapered region of the coupling body being closer in proximity to the outer casing than the distal end of the tapered region, the tapered region tapering from a first diameter at the proximal end of the tapered region to a second diameter at the distal end of the tapered region, the first diameter being larger than the second diameter.

In another aspect, the present disclosure relates to a flexible shaft drive transmission coupled between a drive motor and a gear train of a power operated tool, the flexible shaft drive transmission comprising: a) an elongated drive shaft assembly including a rotatable drive transmitting shaft extending along a longitudinal axis, a first driven fitting at one end of the drive transmitting shaft and a second drive fitting at a second end of the drive transmitting shaft, the first driven fitting and the second drive fitting rotating with the drive transmitting shaft, the first driven fitting configured to engage a drive fitting of a drive motor; b) an outer casing including first and second ends and defining a throughbore, the outer casing receiving the drive transmitting shaft within the throughbore and supporting the drive transmitting shaft for rotation within the outer casing; and c) the first driven fitting including a plurality of drive engagement faces disposed about an axially extending locating member.

In another aspect, the present disclosure relates to a connection structure for a flexible shaft drive transmission and a drive motor, the flexible shaft drive transmission transmitting rotational power between the drive motor and a gear train of a power operated tool, the connection structure comprising: a) the flexible shaft drive transmission including: i) an elongated drive shaft assembly including a rotatable drive transmitting shaft extending along a longitudinal axis, a first driven fitting at one end of the drive transmitting shaft and a second drive fitting at a second end of the drive transmitting shaft, the first driven fitting and the second drive fitting rotating with the drive transmitting shaft; ii) an outer casing including first and second ends and defining a throughbore, the outer casing receiving the drive transmitting shaft within the throughbore and supporting the drive transmitting shaft for rotation within the outer casing; and iii) a motor end coupling affixed to the first end of the outer casing and adapted to be releasably connected to the drive motor, the motor end coupling including a coupling body defining a central opening through which the drive transmitting shaft passes and having an outer surface defining a tapered region, the tapered region having a proximal end and a distal end, the proximal end of the tapered region of the coupling body being closer in proximity to the outer casing than the distal end of the tapered region, the tapered region tapering from a first diameter at the proximal end of the tapered region to a second diameter at the distal end of the tapered region, the first diameter being larger than the second diameter; and b) the drive motor including: a drive fitting rotatable about an axis of rotation and a coupling, the coupling including a collar, an inner surface of the collar defining an opening configured to receive the coupling body of the motor end coupling such that the drive fitting of the drive motor operatively engages the driven fitting of the drive shaft assembly to rotate the drive transmitting shaft within the outer casing of the shaft drive transmission.

In another aspect, the present disclosure relates to a flexible shaft drive transmission coupled between a drive motor and a gear train of a power operated tool, the flexible shaft drive transmission comprising: a) an outer casing assembly having a drive motor end and a tool end and including a bushing positioned at the tool end of the outer casing assembly, the bushing defining a longitudinal central opening; b) lubricant disposed within the outer casing; and c) an elongated drive transmitting shaft assembly rotatable within the outer casing assembly, the elongated drive transmitting shaft assembly including a flexible drive transmitting shaft having a motor end and a tool end, the drive transmitting shaft assembly further including a coupler fitting affixed to the tool end of the drive transmitting shaft, the coupler fitting including a body and an enlarged head extending distally from the body, the body fitting within the longitudinal central opening of the bushing and providing a seal between the coupler fitting and the bushing to mitigate leakage of the lubricant from the tool end of the outer casing and the enlarged head having a diameter greater than a diameter of the longitudinal central opening of the bushing to constrain axial movement of the drive transmitting shaft with respect to the outer casing.

In another aspect, the present disclosure relates to a driver assembly detachably coupled between a flexible shaft drive transmission having an outer casing and an elongated drive transmitting shaft rotatable within the outer casing and a handle assembly of a power operated tool to provide rotational power from a coupler fitting of the drive transmitting shaft and a drive train of the power operated rotary knife, the driver assembly comprising: a) a tube assembly comprising a main tube defining a throughbore and first and second bushings disposed within the throughbore at respective first and second ends of the main tube and a casing coupler secured to and extending beyond the second end of the main tube, the casing coupler configured to releasably attach the driver assembly to the outer casing; and b) an elongated shaft supported for rotation by the first and second bushings of the tube assembly, a first end portion of the shaft rotatably supported in the first bushing and a second end portion of the shaft rotatably supported in the second bushing, the first end portion of the elongated shaft including a driver fitting extending axially beyond the first end of the main tube, the first bushing defining an end wall to constrain axial movement of the elongated shaft with respect to the tube assembly in a first direction, the second end portion of the elongated shaft including a driven fitting extending axially beyond the second end of the main tube, the second bushing including an end wall to constrain axial movement of the elongated shaft with respect to the tube assembly in a direction opposite of the first direction.

In another aspect, the present disclosure relates to a flexible shaft drive transmission assembly coupled between a drive motor and a gear train of a power operated tool, the flexible shaft drive transmission assembly comprising: a) a flexible drive shaft transmission including: 1) an outer casing assembly having a drive motor end and a tool end and including a bushing positioned at the tool end of the outer casing assembly, the bushing defining a longitudinal central opening; 2) lubricant disposed within the outer casing; and 3) an elongated drive transmitting shaft assembly rotatable within the outer casing assembly, the elongated drive transmitting shaft assembly including a flexible drive transmitting shaft having a motor end and a tool end, the drive transmitting shaft assembly further including a coupler fitting coupled to the tool end of the drive transmitting shaft, the coupler fitting including a body and an enlarged head extending distally from the body, the body fitting within the longitudinal central opening of the bushing and providing a seal between the coupler fitting and the bushing to mitigate leakage of the lubricant from the tool end of the outer casing and the enlarged head having a diameter greater than a diameter of the longitudinal central opening of the bushing to constrain axial movement of the drive transmitting shaft with respect to the outer casing; and b) a driver assembly including a tube assembly releasably coupled to the tool end of the outer casing assembly and an elongated driver shaft assembly at least partially disposed within the tube assembly and operatively coupled to coupler fitting of the drive transmitting shaft assembly.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 5 is a schematic side elevation view of the power operated rotary knife of the power operated tool assembly of FIG. 1;

FIG. 6 is a longitudinal sectional view of the power operated rotary knife of the power operated tool assembly of FIG. 1, as seen from a plane indicated by the line 6-6 in FIG. 3;

FIG. 8 is a schematic front elevation view of the drive motor assembly and the shaft drive transmission of the power operated tool assembly of FIG. 1 with a motor end coupling of the shaft drive transmission and a motor coupling of the drive motor assembly in an engaged state;

FIG. 9 is a schematic side elevation view of the drive motor assembly and the shaft drive transmission of FIG. 8;

FIG. 22 is a schematic side elevation view of a motor end portion of the drive shaft assembly of the shaft drive transmission of FIG. 19;

FIG. 23 is a schematic section view of the drive shaft assembly of FIG. 22, as seen from a plane indicated by the line 23-23 in FIG. 22;

FIG. 24 is a schematic top plan view of the drive shaft assembly of FIG. 22, as seen from a plane indicated by the line 24-24 in FIG. 22;

FIG. 31 is a schematic exploded perspective view of the shaft drive transmission of FIG. 29;

FIG. 32 is a schematic enlarged, exploded perspective view of a portion of the shaft drive transmission of FIG. 29, as would be seen within a circle labeled FIG. 32 in FIG. 31;

FIG. 34 is a schematic side elevation view of the driver assembly of the power operated rotary knife end of the shaft drive transmission of FIG. 29;

FIG. 36 is a schematic longitudinal section view of the driver assembly of FIG. 34, as seen from a plane indicated by the line 36-36 in FIG. 34;

FIG. 37 is a schematic side elevation view of a coupler screw of the drive shaft assembly of the shaft drive transmission of FIG. 29;

FIG. 38 is a schematic front elevation view of the coupler screw of FIG. 37, as seen from a plane indicated by the line 38-38 in FIG. 37;

FIG. 39 is a schematic longitudinal section view of the coupler screw of FIG. 37, as seen from a plane indicated by the line 39-39 in FIG. 38;

FIG. 43 is a schematic side elevation view of a casing coupler of the driver assembly of FIG. 34 of the shaft drive transmission of FIG. 29;

FIG. 44 is a schematic front elevation view of the casing coupler of FIG. 43; and FIG. 45 is a longitudinal section view of the casing coupler of FIG. 43, as seen from a plane indicated by the line 45-45 in FIG. 44.

DETAILED DESCRIPTION

Figure 1:
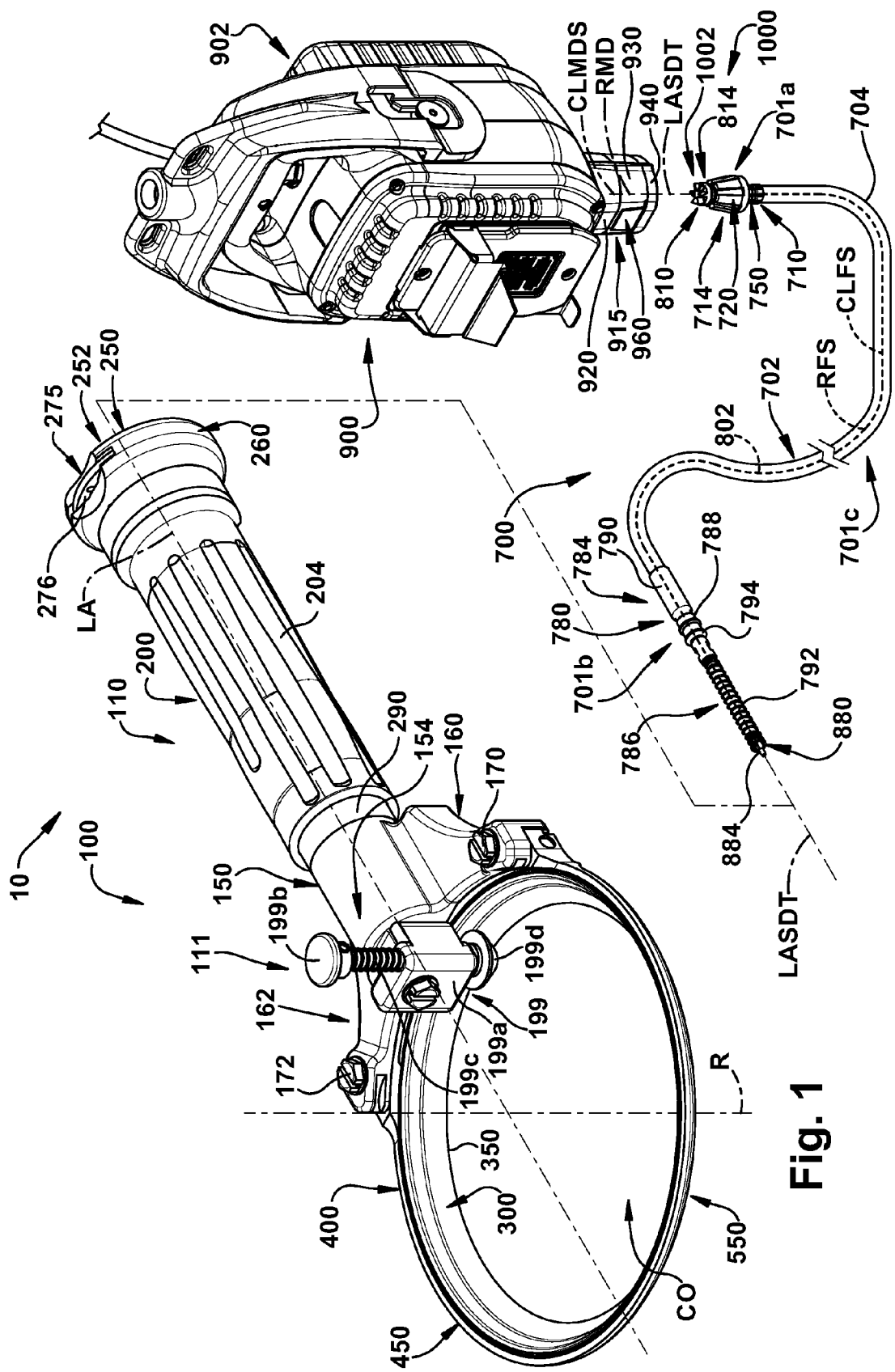
FIG. 1 is a schematic perspective view of a first exemplary embodiment of a power operated tool assembly, including a power operated rotary knife, a drive motor assembly, and a flexible shaft drive transmission of the present disclosure.

The present disclosure relates to a drive interface or drive connection structure, shown generally at 1000 in FIGS. 8-13, for operatively coupling a flexible shaft drive transmission 700 and an external drive motor assembly 900 for transmitting motive or rotational power from a drive motor 901 of the drive motor assembly 900 to a power operated tool 100, such as a power operated rotary knife. The shaft drive transmission-drive motor drive connection structure 1000 includes a motor end coupling 714 and a driven fitting 814 of the flexible shaft drive transmission 700 and a drive motor coupling 915 and a drive fitting 972 of the drive motor assembly 900. The motor end coupling 714 of the flexible shaft drive transmission 700 is configured to releasably engage the drive motor coupling 915 of the drive motor assembly 900. When the motor end coupling 714 is operatively engaged or is in an engaged state with respect to the drive motor coupling 915, the driven fitting 814 is operatively engaged by or coupled to the drive fitting 972 of the drive motor assembly 900. The driven fitting 814 is part of a drive shaft assembly 800 of the flexible shaft drive transmission 700. The drive shaft assembly 800 includes an elongated, flexible drive transmitting shaft or flex shaft 802, the driven fitting 814 at a first end 810 of the drive shaft assembly 800, and a male drive fitting 884 at a second end 880 of the drive shaft assembly 800.

Advantageously, the drive connection structure 1000 of the present disclosure provides for quick coupling and uncoupling of mating motor end and drive motor couplings 714, 915 of the flexible shaft drive transmission 700 and the drive motor assembly 900 by an operator of the power operated tool 100 using one hand. Additionally, when the couplings 714, 915 of the shaft drive transmission 700 and the drive motor assembly 900 are in the engaged state, in one exemplary embodiment of the present disclosure, a drive engagement structure 1002 (FIG. 25) between the driven fitting 814 of the shaft drive transmission 700 and the drive fitting 972 of the drive motor assembly 900 comprises a plurality of planar drive engagement surfaces 832, 984. As can best be seen in FIGS. 22 and 25, the planar drive engagement surfaces 832 of the driven fitting 814 are defined on or are formed on axially projecting vanes 830 of the driven fitting 814. As can best be seen in FIGS. 25 and 26, the planar drive engagement surfaces 984 of the drive fitting 972 are defined on or are formed on axially projecting vanes 982 of the drive fitting 972.

The drive engagement structure 1002 of the present disclosure also includes an axial locating structure 1004. The planar drive engagement surfaces 832 of the plurality of vanes 830 of the driven fitting 814 extend radially about a locating member 822 of the driven fitting 814. Similarly, the planar drive engagement surfaces 984 of the drive fitting 972 extend radially about a locating member 992 of the drive fitting 972. In one exemplary embodiment, the locating member 822 of the drive fitting 814 comprises a tapered central projection 824 and the locating member 992 of the drive fitting 972 comprises a tapered central opening 994 in the drive fitting 972. When the motor end coupling 714 of the flexible shaft drive transmission 700 and the drive motor coupling 915 of the drive motor assembly 900 are in the engaged state, the tapered central projection 824 of the driven fitting 814 is received into the tapered central opening 994 of the drive fitting 972 to define the axial locating structure 1004.

Advantageously, the drive engagement structure 1002 of the present disclosure comprising the plurality of planar drive engagement surfaces 832, 984 of the driven and drive fitting fittings 814, 972 provides a large drive or contact area between the fittings 814, 972 resulting in a durable, positive drive connection between the drive motor 901 and the flex shaft 802 of the shaft drive transmission 700. Furthermore, the axial locating structure 1004 of the present disclosure comprising the central locating member 822 of the driven fitting 814 and the central opening 984 of the drive fitting 972 advantageously provides for accurate alignment of an axis of rotation RMD of a drive shaft 970 of the drive motor 901 and an axis of rotation RFS of the drive transmitting shaft or flex shaft 802 of the drive shaft assembly 800. Moreover, the drive connection structure 1000 of the present disclosure eliminates the need for a rotatable or slip ring interposed between the mating couplings 714, 915 of the shaft drive transmission 700 and the drive motor assembly 900.

In one exemplary embodiment, the present disclosure features a power operated tool assembly 10 including: the power operated tool 100, such as a power operated rotary knife; the external drive motor assembly 900; and the flexible shaft drive transmission 700 extending between and transmitting motive or rotational drive power between the drive motor 901 of the drive motor assembly 900 and the power operated rotary knife 100. The flexible shaft drive transmission 700, the drive motor 901 and the drive motor coupling 915 of the drive motor assembly 900 are part of a drive mechanism or assembly 600 of the power operated tool assembly 10 that operably connects rotational power generated by the drive motor 900 to the power operated rotary knife 100 to rotate a rotary knife blade 300 of the rotary knife 100.

The flexible shaft drive transmission 700 includes an outer casing assembly 702 and the drive shaft assembly 800, which is rotatable within the outer casing assembly 702. The outer casing assembly 702 includes a longitudinally extending, generally tubular outer casing 704 which defines a tubular throughbore 706. The outer casing assembly 702 additionally includes the first or motor end coupling 714 disposed at a first end 710 of the outer casing 704 and a second or handle assembly coupling 784 disposed at a second end 780 of the outer casing 704. The motor end coupling 714 and the handle assembly coupling 784 each include central openings or passageways that continue the throughbore 706 of the outer casing 704 such that the drive shaft assembly 800 extends through the throughbore 706 and beyond respective ends of the motor end coupling 714 and the handle assembly coupling 784. The motor end or motor coupling 714 is configured to be releasably coupled to the drive motor coupling 915 of the drive motor assembly 900 and the handle assembly coupling 784 is configured to be releasably coupled to the handle assembly 110 of the power operated rotary knife 100 to transmit motive power or drive torque from the drive motor 900 to the power operated rotary knife 100.

The drive shaft assembly 800 includes the flexible, elongated drive transmitting shaft or flex shaft 802 extending through the outer casing 704 and includes the first, driven fitting 814 disposed at the first end of 810 of the flex shaft 802 and the second, male drive fitting 884 disposed at the second end 880 of the flex shaft 802. The outer casing 704 surrounds and is coaxial with the flex shaft 802. To reduce friction between the rotating flex shaft 802 and the stationary outer casing 704, a relatively viscous lubricant (not shown) is disposed within the outer casing 704. The drive transmitting shaft or flex shaft 802 comprises a solid, steel central core 804 which, in one exemplary embodiment, is a central wire surrounded by one or more layers of wires or windings tightly wrapped around the core wire 804 in a helix. The flex shaft 802 is capable of transmitting substantial torque yet is flexible so that the power operated rotary knife 100 can be manipulated while drive is transmitting to and through it. The flex shaft 802 is freely rotatable with respect to the casing assembly 702, including the outer casing 704 and the motor end and handle assembly couplings 714, 784.

The driven fitting 814 of the drive shaft assembly 800 is engaged and rotated by the mating drive fitting 972 of the drive motor assembly 900 when the first or motor end coupling 714 is operatively coupled or engaged to the motor coupling 915 of the drive motor assembly 900 and the drive motor 901 is actuated. The drive fitting 884 of the drive shaft assembly 800 engages and rotates a female socket for fitting 622 of a pinion gear 610 of the power operated rotary knife 100 when the handle assembly coupling 784 is operatively coupled or engaged to the handle assembly 110 of the power operated rotary knife 100 and the drive motor is actuated.

Power Operated Rotary Knife 100

Figure 2:
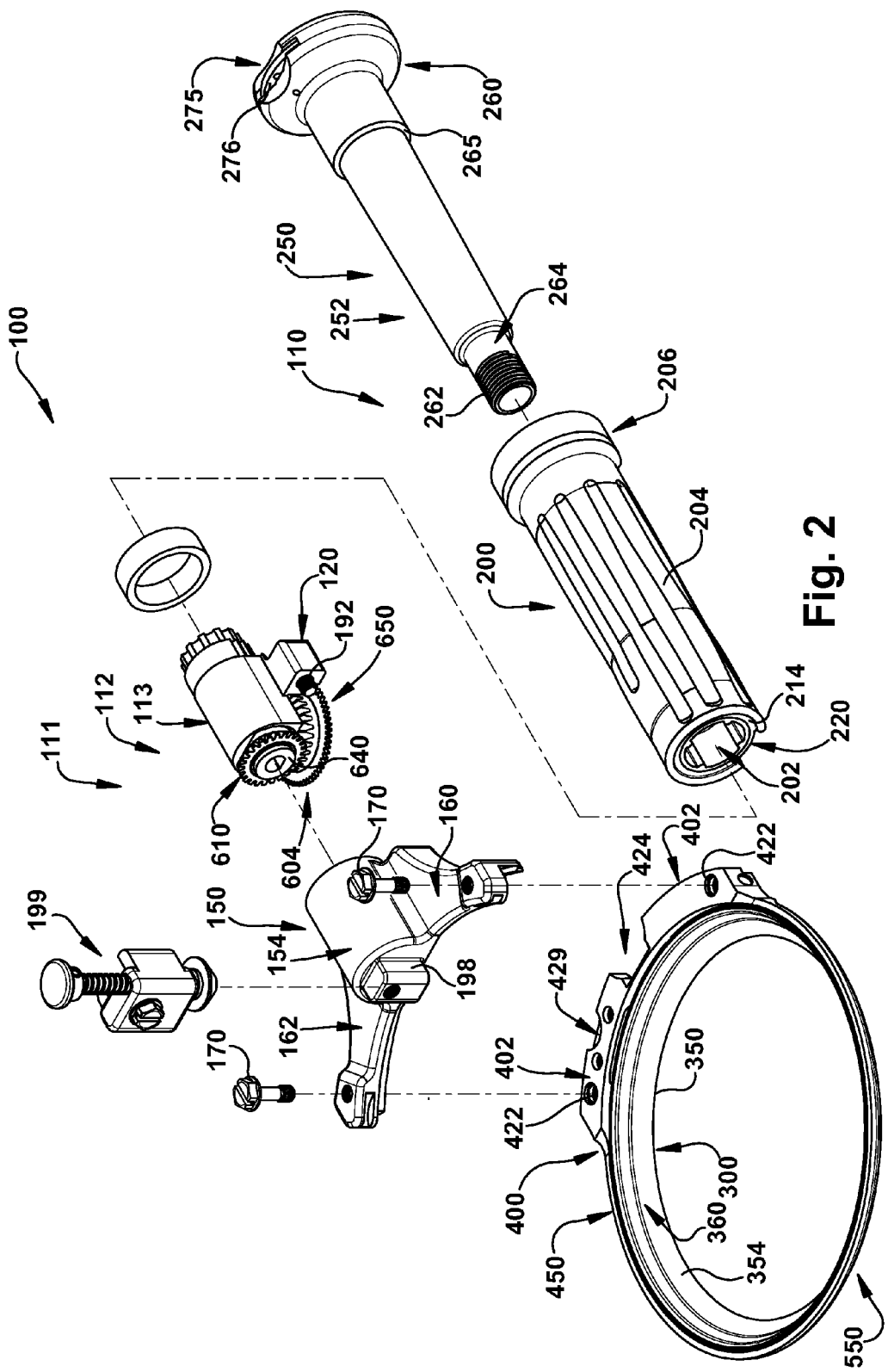
FIG. 2 is a schematic exploded perspective view of the power operated rotary knife of the power operated tool assembly of FIG. 1.
Figure 2A:
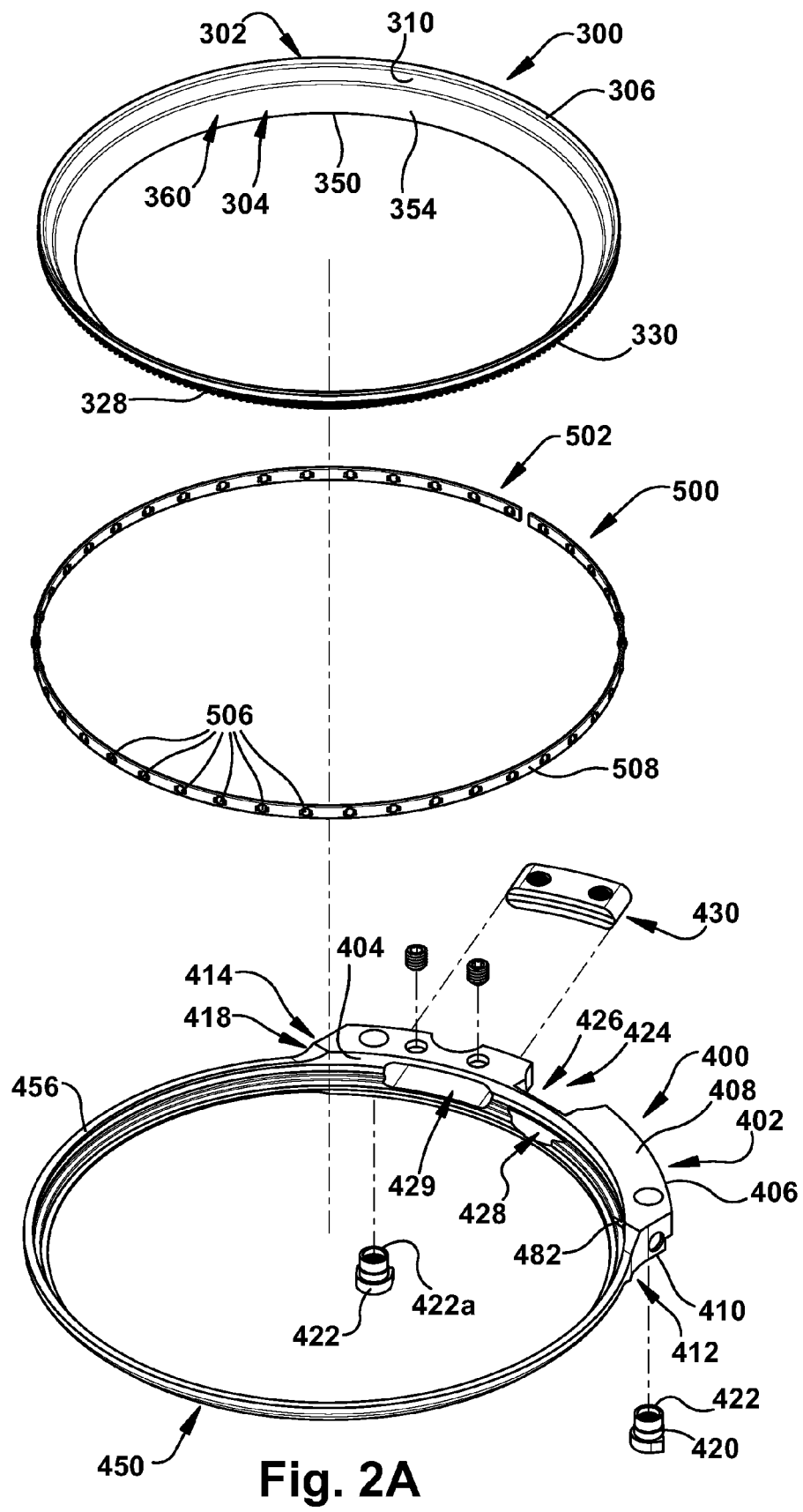
FIG. 2A is a schematic exploded perspective view of a portion of a head assembly of the power operated rotary knife of the power operated tool assembly of FIG. 1 including a rotary knife blade, a blade housing and a blade-blade housing bearing structure that, in one exemplary embodiment, includes an elongated rolling bearing strip that secures and rotatably supports the rotary knife blade with respect to the blade housing.
Figure 2B:
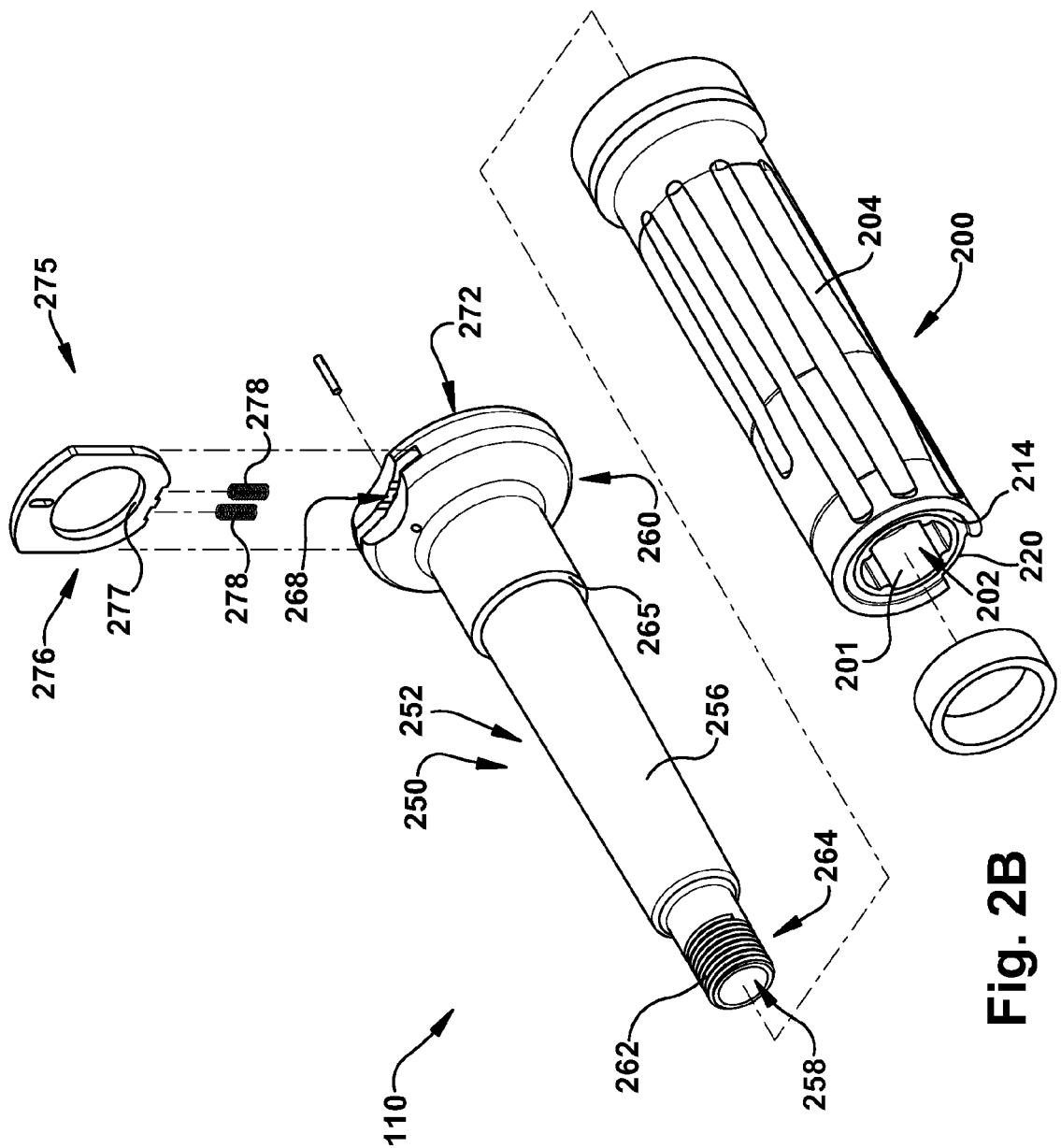
FIG. 2B is a schematic exploded perspective view of a handle assembly of the power operated rotary knife of the power operated tool assembly of FIG. 1 including a hand piece, a hand piece retaining assembly and a drive shaft latching assembly supported by the hand piece retaining assembly.

In one exemplary embodiment, the power operated tool 100 comprises a power operated rotary knife, as shown in FIGS. 1-6. The power operated rotary knife 100 includes an elongated handle assembly 110 and a head assembly or head portion 111 removably coupled to a forward end of the handle assembly 110. The handle assembly 110 includes a hand piece 200 that is secured to the head assembly 111 by a hand piece retaining assembly 250 (FIGS. 2 and 2B).

In one exemplary embodiment, the head assembly 111 includes a continuous, generally ring-shaped or annular rotary knife blade 300, a continuous, generally ring-shaped or annular blade housing 400, and a blade-blade housing support or bearing structure 500. Annular, as used herein, means generally ring-like or generally ring-shaped in configuration. Continuous annular, as used herein, means a ring-like or ring-shape configuration that is continuous about the ring or annulus, that is, the ring or annulus does not include a split extending through a diameter of the ring or annulus. The head assembly 111 further includes a gearbox assembly 112 and a frame or frame body 150 for securing the rotary knife blade 300 and the blade housing 400 to the gearbox assembly 112.

The rotary knife blade 300 rotates in the blade housing 400 about its axis of rotation R. In one exemplary embodiment, the rotary knife blade 300 includes a bearing surface 319 and the driven gear 328. Both the bearing surface 319 and the driven gear 328 are axially spaced from an upper end 306 of a body 302 of the blade 300 and from each other. The rotary knife blade 300 is supported for rotation in the blade housing 400 by the blade-blade housing support or bearing structure 500 of the present disclosure (best seen in FIG. 4). The blade-blade housing bearing structure 500 both supports the rotary knife blade 300 for rotation with respect to the blade housing 400 and releasably secures the rotary knife blade 300 to the blade housing 400.

In one exemplary embodiment, the blade-blade housing bearing structure 500 includes an elongated rolling bearing strip 502 having a plurality of spaced apart rolling bearings such as a plurality of ball bearings 506 supported in a flexible separator cage 508. The elongated rolling bearing strip 502 is disposed in an annular passageway 504 (FIG. 4) formed between opposing bearing surfaces 319, 459 of the rotary knife blade 300 and the blade housing 400, respectfully. The blade-blade housing bearing structure 500 defines a plane of rotation RP (FIGS. 5 and 6) of the rotary knife blade 300 with respect to the blade housing 400, the rotational plane RP being substantially orthogonal to the rotary knife blade central axis of rotation R.

The plurality of ball or rolling bearings 506 are in rolling contact with and bear against the opposing bearing surfaces 319, 459 of the rotary knife blade 300 and the blade housing 400 to support the knife blade 300 for rotation with respect to the blade housing 400 and secure the knife blade 300 with respect to the blade housing 400. The flexible separator cage 508 rotatably supports and locates the plurality of rolling bearings 506 in spaced apart relation within the annular passageway 504. As can best be seen in FIG. 2, an assembled combination 550 of the rotary knife blade 300, the blade housing 400 and blade-blade housing bearing structure 500 is releasably secured as a unitary structure to the gearbox assembly 112 by the frame body 150 thereby completing the head assembly 111. The assembled combination 550 of the rotary knife blade 300, the blade housing 400 and blade-blade housing bearing structure 500 is referred to as the blade-blade housing combination 550. The handle assembly 110 is releasably secured to the head assembly 111 by the hand piece retaining assembly 250 (FIG. 2B) thereby completing the power operated rotary knife 100. As used herein with respect to the power operated rotary knife 100, as shown in FIGS. 2-6, a front or distal end of the power operated rotary knife 100 is an end of the knife 100 that includes the blade-blade housing combination 550 (as seen in FIG. 2), while a rear or proximal end of the power operated rotary knife 100 is an end of the knife 100 that includes the handle assembly 110, and, specifically, an enlarged end 260 of an elongated central core 252 of the hand piece retaining assembly 250.

Figure 7:
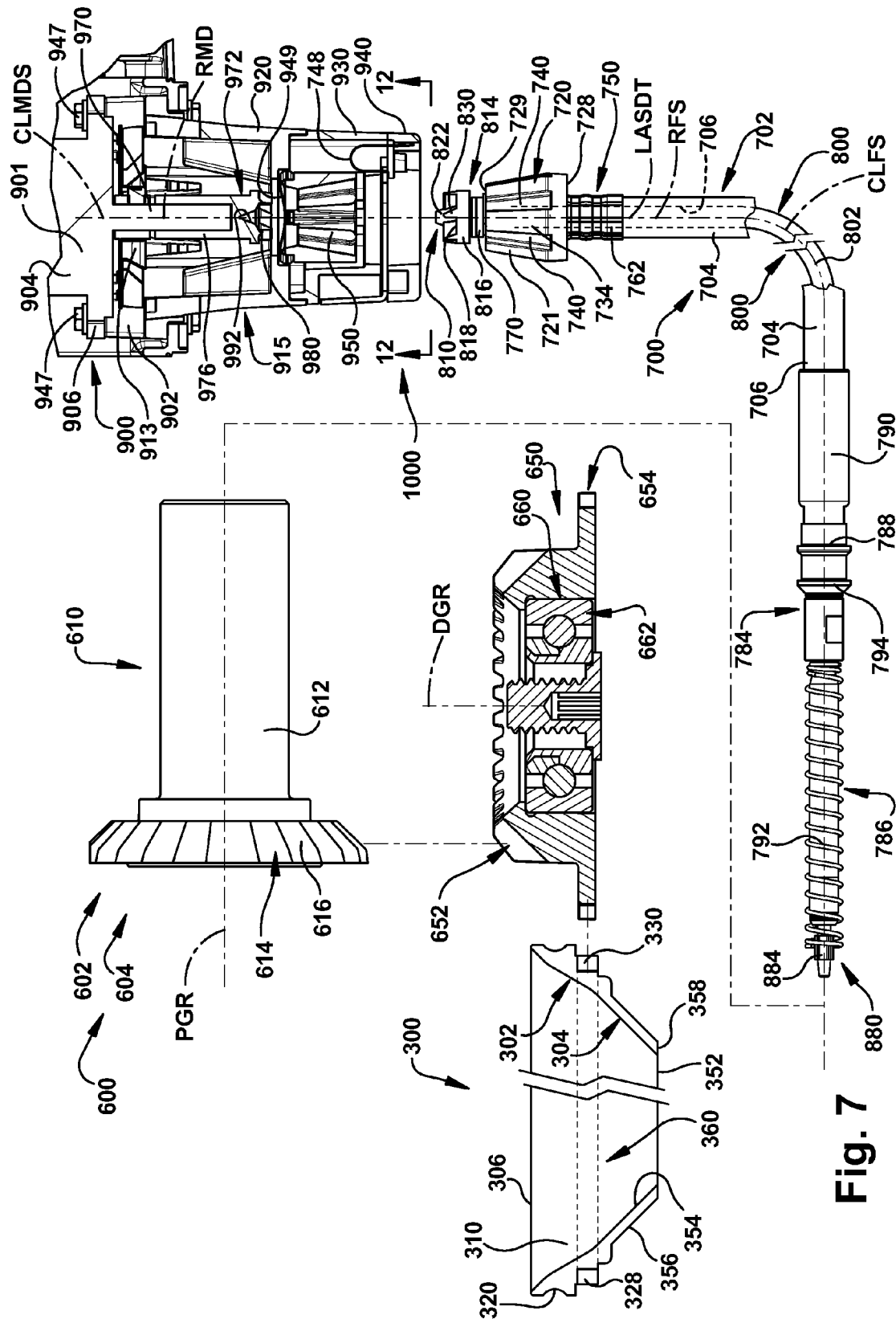
FIG. 7 is a schematic view, partly in side elevation and partly in section, of a drive assembly of the power operated tool assembly of FIG. 1.
Figure 10:
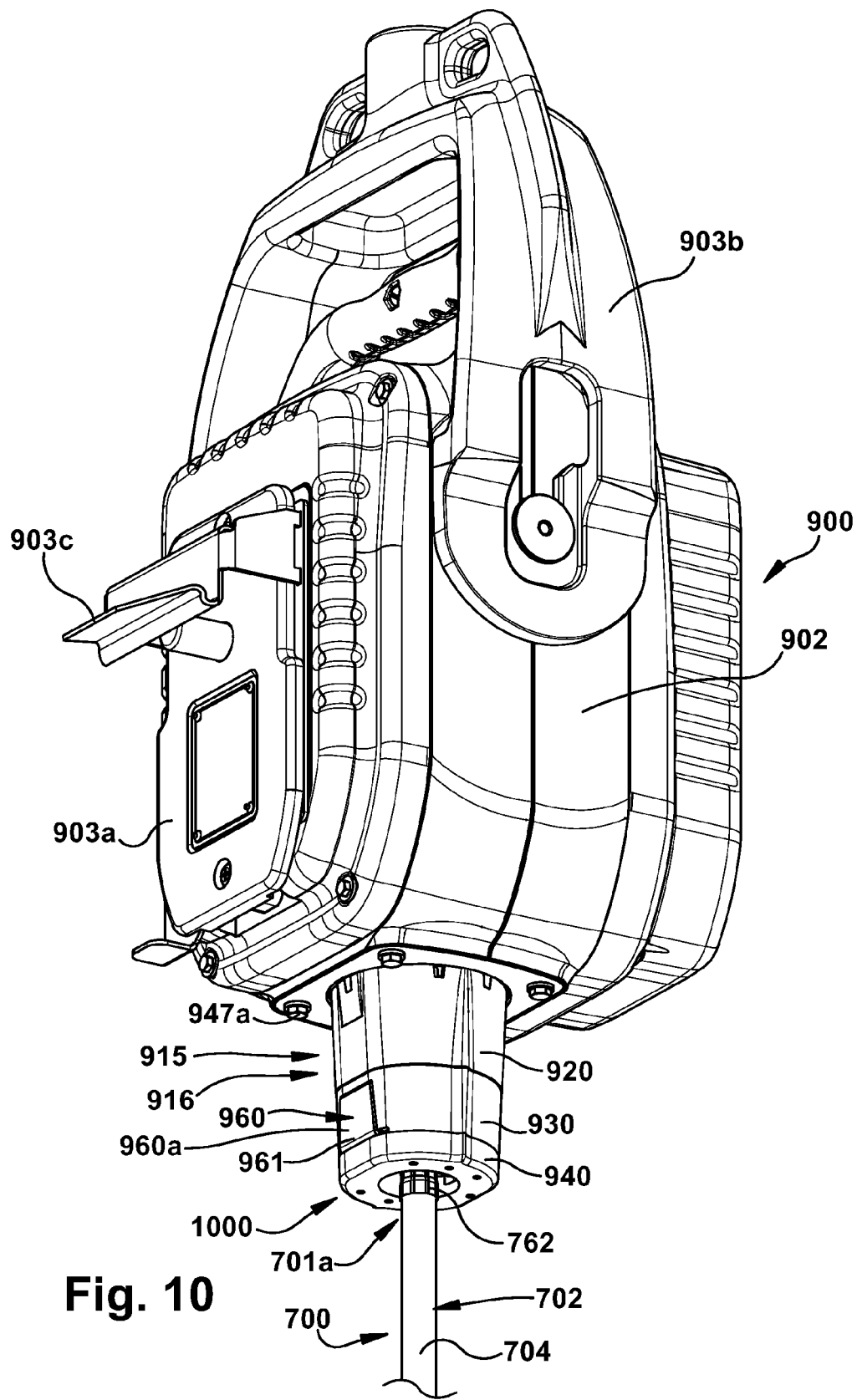
FIG. 10 is a schematic bottom perspective view of the drive motor assembly and the shaft drive transmission of FIG. 8.

The rotational speed of a specific rotary knife blade 300 in the power operated rotary knife 100 will depend upon the specific characteristics of the drive mechanism 600 (shown schematically in FIG. 7) of the power operated tool assembly 10, including the external drive motor 901, the drive motor coupling 915, the flexible shaft drive assembly 700, the gear train 604, and a diameter and gearing of the rotary knife blade 300. Further, depending on the cutting or trimming task to be performed, different sizes and styles of rotary knife blades may be utilized in the power operated rotary knife 100 of the present disclosure. For example, rotary knife blades in various diameters are typically offered ranging in size from around 1.4 inches in diameter to over 7 inches in diameter. Selection of a blade diameter will depend on the task or tasks being performed.

Figure 2C:
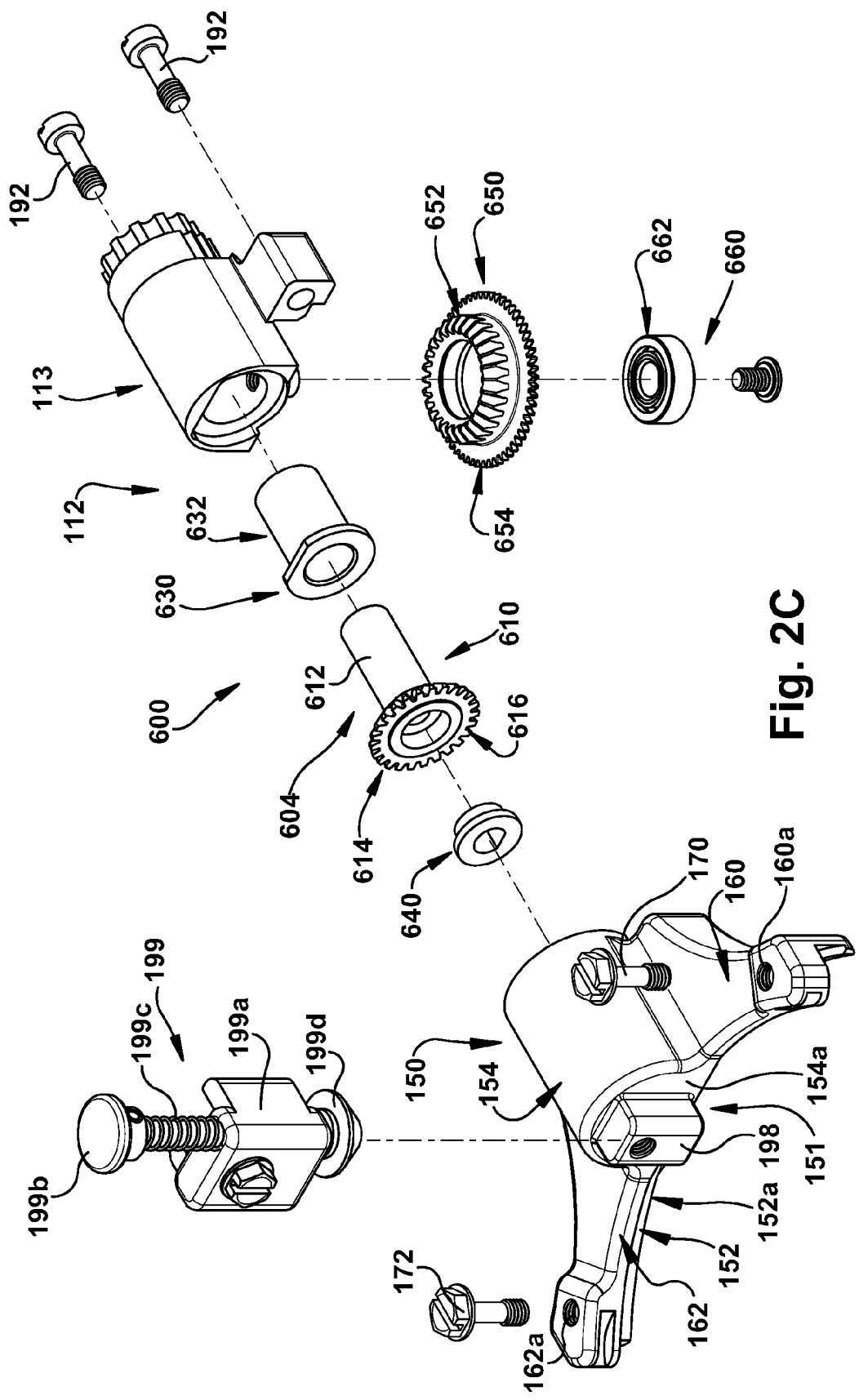
FIG. 2C is a schematic exploded perspective view of a portion of the head assembly of the power operated rotary knife of the power operated tool assembly of FIG. 1 including a gearbox assembly, a steeling assembly and a frame body, the gearbox assembly including a gear train and a gearbox housing.
Figure 3:
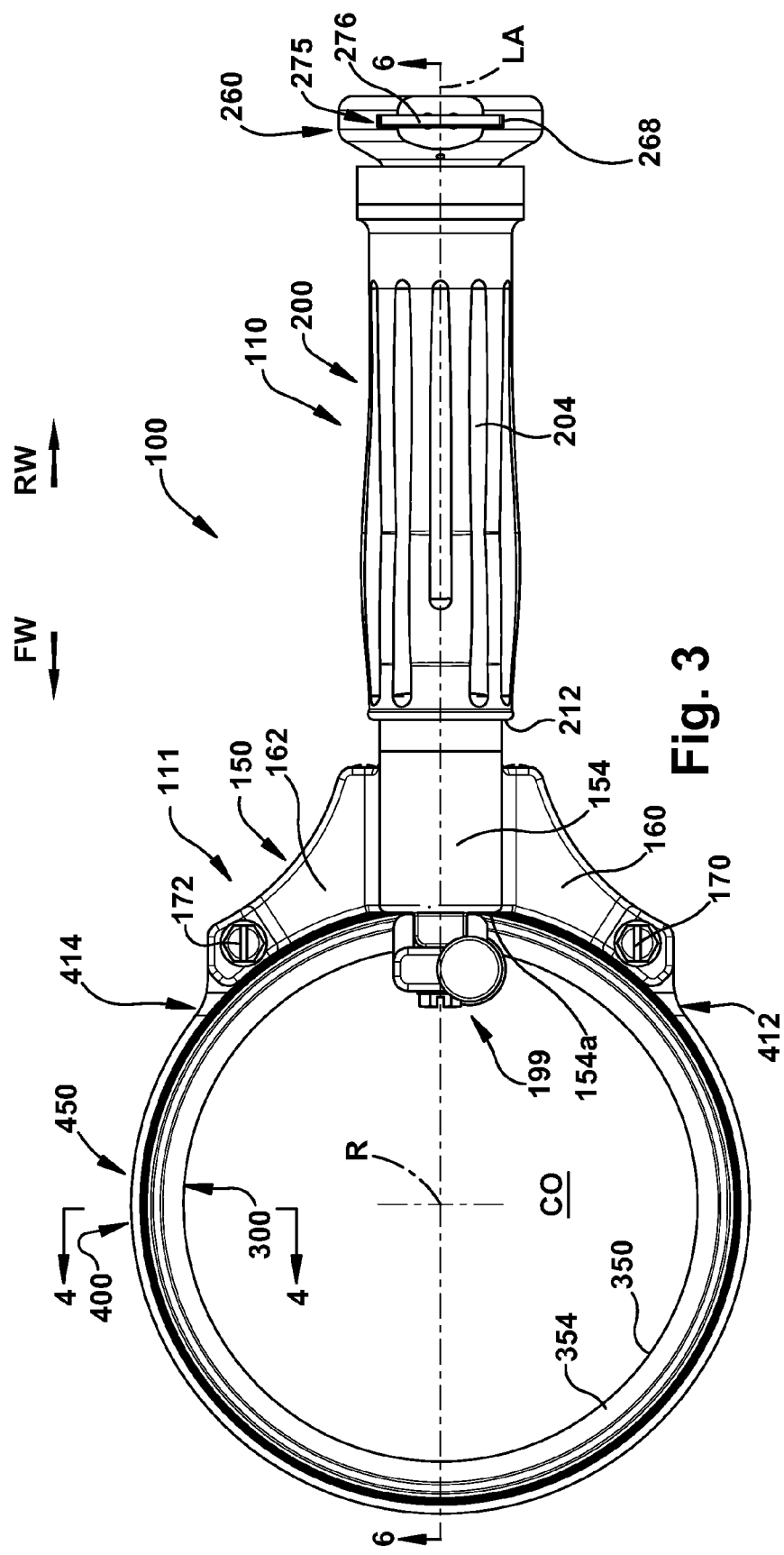
FIG. 3 is a schematic top plan view of the power operated rotary knife of the power operated tool assembly FIG. 1.

The head assembly 111 includes the frame 150 and the gearbox assembly 112. As is best seen in FIG. 2C, the gearbox assembly 112 includes a gearbox housing 113 and the gear train 604. The gear train 604 is supported by the gearbox housing 113. The gear train 604 includes, in one exemplary embodiment, the pinion gear 610 and a drive gear 650, together with a bearing support assembly 630 that rotatably supports the pinion gear 610 and a bearing support assembly 660 that rotatably supports the drive gear 650.

The pinion gear 610 comprises an input shaft 612 and a gear head 614 that extends radially outwardly from the input shaft 612 and defines a set of bevel gear teeth 616. The input shaft 612 extends in a rearward direction RW along the handle assembly longitudinal axis LA and includes a central opening 618 (FIG. 6) extending in a forward direction FW from a rearward end 629 (FIG. 2C) to a forward end 628 of the input shaft 612, the central opening 618 terminating at the gear head 614. An inner surface 620 of the input shaft 612 defines the cross-shaped female socket or fitting 622 (FIG. 6) which receives a mating male drive fitting 814 (FIG. 1) of the flexible shaft drive transmission 700 to rotate the pinion gear 610 about an axis of rotation PGR which is substantially congruent with the handle assembly longitudinal axis LA and intersects the knife blade axis of rotation R. The pinion gear 610 is supported for rotation in the gearbox housing 113 by a pair of sleeve bushings 632, 640 (FIG. 2C).

The drive gear 650 is a double gear that includes a first bevel gear 652 and a second spur gear 654, disposed in a stacked relationship, about an axis of rotation DGR (FIG. 7) of the drive gear 650. The drive gear axis of rotation DRG is substantially parallel to the rotary knife blade axis of rotation R. The drive gear first bevel gear 652 meshes with the pinion gear 610 to rotatably drive the drive gear 650 about the drive gear axis of rotation DGR. The second spur gear 654 of the drive gear engages the driven gear 328 of the rotary knife blade 300, forming an involute gear drive, to rotate the knife blade 300 about the blade axis of rotation R. The drive gear 650 is supported for rotation in the gearbox housing 113 by a ball bearing assembly 662.

The gear train 604 is part of the drive mechanism 600 (shown schematically in FIG. 7), some of which is external to the power operated rotary knife 100, that provides motive power to rotate the rotary knife blade 300 with respect to the blade housing 400. The drive mechanism 600 includes the external drive motor assembly 900 and the flexible shaft drive assembly 700, which is releasably secured to the handle assembly 110 by a drive shaft latching assembly 275 (FIG. 2B). The drive shaft latching assembly 275 is supported in the enlarged end 260 of the elongated central core 252. Specifically, a slidable latch 276 is constrained in U-shaped slot 268 extending partially through the enlarged end 260 of the elongated central core 252. An inner peripheral portion 277 of a slidable latch 276 (FIG. 2B) of the latching assembly 275 is biased by a pair of springs 278 to engage a radial securement groove 788 (FIG. 1) of the handle assembly coupling 780 of the drive shaft assembly 800. The latch 276 releasably secures the handle assembly coupling 780 to the central core 252 of the handle assembly 110. When the handle assembly coupling 780 is coupled to the handle assembly central core 252, the male drive fitting 884 of the drive shaft assembly 800 engages the mating female socket or fitting 622 of the pinion gear 610 of the power operated rotary knife 100.

The inner surface 254 of the elongated central core 252 also includes an inwardly stepped shoulder 266 (FIG. 6) that provides a stop for a corresponding outwardly stepped shoulder 794 of the handle assembly coupling 784 of the flexible shaft drive transmission 700. A radially extending shoulder 265

(FIG. 2B) of an outer surface 256 of central core 252 serves as a stop for an interfitting radially inwardly stepped shoulder 218 of the inner surface 201 of hand piece 200 to secure the hand piece 200 in place with respect to the head assembly 111. The gear train 604 of the power operated rotary knife 100 transmits rotational power from a flexible elongated drive transmitting shaft or flex shaft 802 of the flexible shaft drive assembly 700, through the pinion and drive gears 610, 650, to rotate the rotary knife blade 300 with respect to the blade housing 400.

The frame body 150 (FIG. 2C) of the head assembly 111 includes an arcuate mounting pedestal 152 at a front or forward end 151 of the frame body 150. The arcuate mounting pedestal 152 defines a seating region 152a for a mounting section 402 of the blade housing 400 such that the blade-blade housing combination 550 may be releasably affixed to the frame body 150. The frame body 150 also defines a cavity or opening that slidably receives the gearbox housing 113, as the gearbox housing is moved in a forward direction FW (FIG. 3) along a longitudinal axis LA of the handle assembly 110 in the direction of the frame body 150. When the gearbox housing 113 is fully inserted into the frame cavity and secured to the frame body 150 by a pair of threaded fasteners 192 (FIG. 2C), the drive gear 650 of the gear train 604 engages and meshes with the driven gear 328 of the rotary knife blade 300 to rotate the blade 300 about its axis of rotation R.

The frame body 150 releasably couples the blade-blade housing combination 550 to the gearbox housing 113 to form the head assembly 111 of the power operated rotary knife 100. The hand piece 200 of the handle assembly 110 is secured or mounted to the head assembly 111 by the hand piece retaining assembly 250 (FIG. 2B) to complete the power operated rotary knife 100. The elongated central core 252 of the hand piece retaining assembly 250 extends through a central throughbore 202 of the hand piece 200 and threads into the gearbox housing 113 to secure the hand piece 200 to the gearbox housing 113.

The handle assembly 110 (FIG. 2B) extends along the longitudinal axis LA (FIGS. 3, 5 and 6) of the handle assembly 110 that is substantially orthogonal to the central axis of rotation R of the rotary knife blade 300. The hand piece 200 includes an inner surface 201 that defines the central throughbore 202, which extends along the handle assembly longitudinal axis LA. The hand piece 200 includes a contoured outer handle or outer gripping surface 204 that is grasped by an operator to appropriately manipulate the power operated rotary knife 100 for trimming and cutting operations. As can be seen in FIG. 6, the hand piece retaining assembly 250 includes the elongated central core 252 having a threaded portion 262 on a reduced diameter end 264. To secure the hand piece 200 to the head assembly 111, the central core 252 is aligned and rotated such that the threaded portion 262 is screwed into a threaded opening 149 of the gearbox housing 113.

Figure 4:
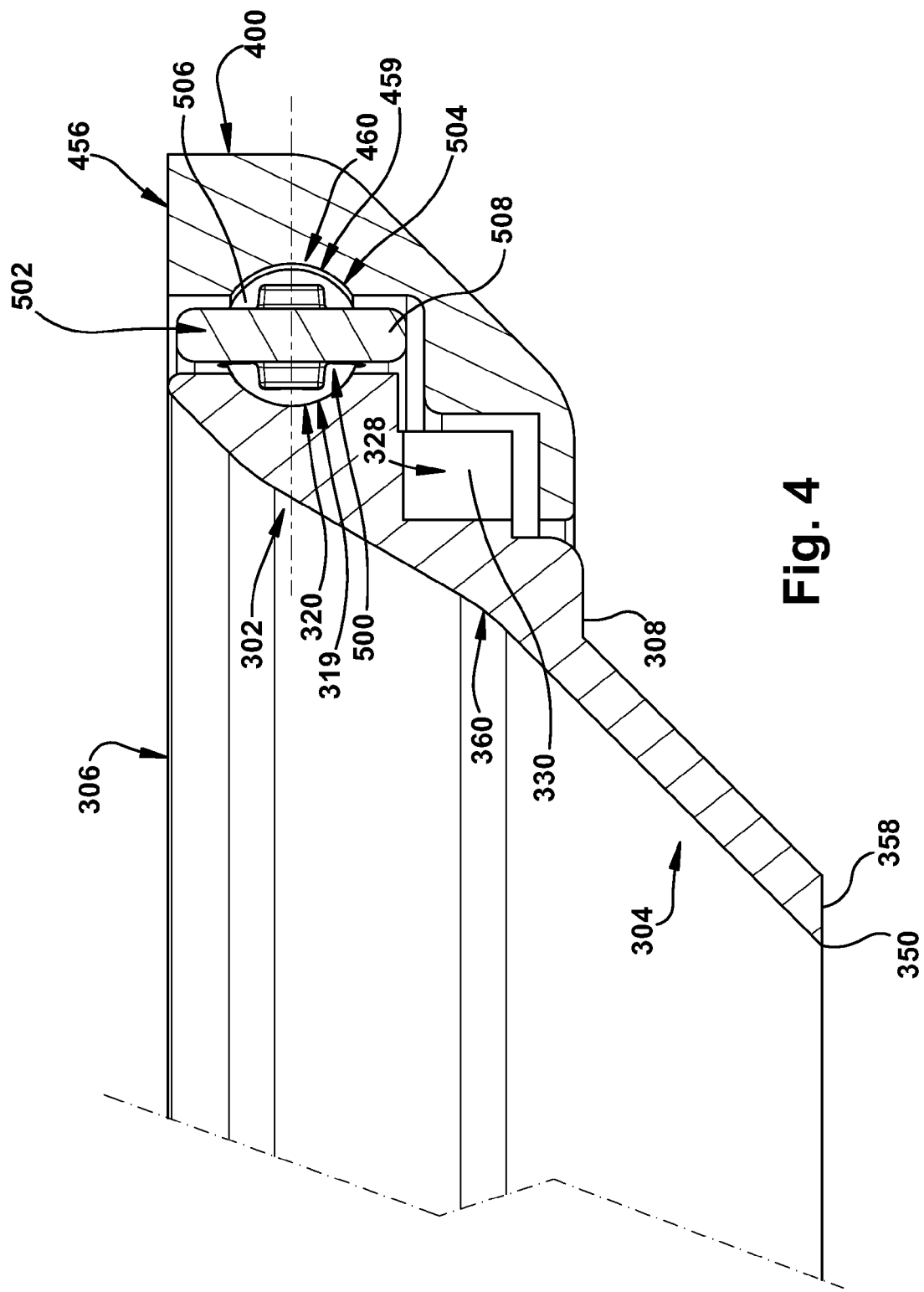
FIG. 4 is a schematic enlarged section view of the assembled combination of the rotary knife blade, the blade housing and the blade-blade housing bearing structure of the power operated rotary knife of the power operated tool assembly of FIG. 1 as seen from a plane indicated by the line 4-4 in FIG. 3.

In one exemplary embodiment, the rotary knife blade 300 of the power operated rotary knife 100 is a one-piece, continuous annular structure. As can best be seen in FIG. 4, the rotary knife blade 300 includes the body 302 and a blade section 304 extending axially from the body 302. The knife blade body 302 includes an upper end 306 and a lower end 308 spaced axially from the upper end 306. The body 302 of the rotary knife blade 300 further includes an inner wall 310 and an outer wall 312 spaced radially apart from the inner wall 310. An upper, substantially vertical portion 340 of the body outer wall 312 defines the knife blade bearing surface 319. In one exemplary embodiment of the power operated rotary knife 100 and as best seen in FIG. 4, the knife blade bearing surface 319 comprises a bearing race 320 that is arcuate in a central portion and extends radially inwardly into the outer wall 312. As can be seen in FIG. 4, the knife blade bearing race 320 is axially spaced from the upper end 306 of the knife blade body 302.

The outer wall 312 of the body 302 of the rotary knife blade 300 defines the driven gear 328. The driven gear 328 comprises the set of spur gear teeth 330 extending radially outwardly in a stepped portion of the outer wall 312. In one exemplary embodiment, the blade driven gear 328 is a spur gear which means that it is a cylindrical gear defining a set of gear teeth 330 that are parallel to the axis of the gear, i.e., parallel to the axis of rotation R of the rotary knife blade 300. The set of spur gear teeth 330 of the knife blade driven gear 328 are axially spaced from both the upper end 306 of the body 302 and the lower end 308 of the body 302 and are axially spaced from the arcuate bearing race 320 of the body 302.

The blade section 304 extends from the second end 308 of the body 302 and includes a blade cutting edge 350 at an inner, lower end 352 of the blade section 304. As can be seen, the blade section 304 includes an inner wall 354 and a radially spaced apart outer wall 356. The inner and outer walls 354, 356 are substantially parallel. A bridging portion 358 at the forward end of the rotary knife blade 300 extends between the inner and outer walls 354, 356 and forms the cutting edge 350 at the intersection of the bridging portion 358 and the inner wall 354. As can best be seen in FIG. 4, the rotary knife blade body inner wall 310 and the blade section inner wall 354 together form a substantially continuous knife blade inner wall 360 that extends from the upper end 306 to the cutting edge 350. The knife blade inner wall 360 defines a cutting opening CO (FIGS. 1 and 3) of the power operated rotary knife 100, that is, the opening defined by the rotary knife blade 300 that cut material passes through, as the power operated rotary knife 100 trims or cut a product.

In one exemplary embodiment, the blade housing 400 of the power operated rotary knife 100 is a one-piece, continuous annular structure. The blade housing 400 includes the mounting section 402 and a blade support section 450 extending from the mounting section 402. In the blade housing 400, the blade support section extends around the entire 360 degrees) (360° circumference of the blade housing 400. The mounting section 402 extends radially outwardly from the blade support section 450 and subtends an angle of approximately 120°. Stated another way, the blade housing mounting section 402 extends approximately ⅓ of the way around the circumference of the blade housing 400. In the region of the mounting section 402, the mounting section 402 and the blade support section 450 overlap.

The mounting section 402 is both axially thicker and radially wider than the blade support section 450. The blade housing mounting section 402 includes an inner wall 404 and a radially spaced apart outer wall 406 and a first upper end 408 and an axially spaced apart second lower end 410. At forward ends 412, 414 of the mounting section 402, there are tapered regions that transition between the upper end 408, lower end 410 and outer wall 406 of the mounting section and the corresponding upper end, lower end and outer wall of the blade support section 450.

The blade housing mounting section 402 includes two mounting inserts 420, 422 (FIG. 2A) that extend between the upper and lower ends 408, 410 of the mounting section 402. The mounting inserts 420 define threaded openings 422 (FIG. 2A). The blade housing mounting section 402 is received in the seating region 152a defined by the arcuate mounting pedestal 152 of the frame body 150 and is secured to the frame body 150 by a pair of threaded fasteners 170 (FIG. 2C). Specifically, the pair of threaded fasteners 170 extend through threaded openings 160a, 162a defined in a pair of arcuate arms 160, 162 of the frame body 150 and thread into the threaded openings 422 of the blade housing mounting inserts 420 to releasably secure the blade housing 400 to the frame body 150 and, thereby, couple the blade housing 400 to the gearbox assembly 112 of the head assembly 111.

The mounting section 402 further includes a gearing recess 424 (FIG. 2A) that extends radially between the inner and outer walls 404, 406. The gearing recess 424 includes an upper clearance recess 426 that does not extend all the way to the inner wall and a wider lower opening 428 that extends between and through the inner and outer walls 404, 406. The upper clearance recess 426 provides clearance for the pinion gear 610 and the axially oriented first bevel gear 652 of the gearbox drive gear 650. The lower opening 428 is sized to receive the radially extending second spur gear 654 of the gearbox drive gear 650 and thereby provide for the interface or meshing of the second spur gear 654 and the driven gear 328 of the rotary knife blade 300 to rotate the knife blade 300 with respect to the blade housing 400.

The mounting section 402 of the blade housing 400 also includes a blade housing plug opening 429 (FIG. 2A) extending between the inner and outer walls 404, 406. The blade housing plug opening 429 is generally oval-shaped in cross section and is sized to receive a blade housing plug 430. The blade housing plug 430 is removably secured to the blade housing 400 by two screws 432 (FIG. 2A). Removal of the blade housing plug 430 allows for the rolling bearing strip 502 of the blade-blade housing bearing structure 500 to be threaded into the annular passageway 504 to rotatably secure the rotary knife blade 300 to the blade housing 400 and to be removed from the annular passageway 504 to allow the knife blade 300 to be removed from the blade housing 400.

In one exemplary embodiment of the power operated rotary knife 100 and as best seen in FIG. 4, the blade housing bearing surface 459 comprises a bearing race 460 that extends radially inwardly into the inner wall 452. The bearing race 460 is arcuate in a central portion of the bearing race 460. The bearing race 460 is axially spaced from the upper end 456 of the blade support section 450.

A forward wall 154a of a central cylindrical region 154 of the frame body 150 includes a projection 198 that supports a steeling assembly 199 (FIG. 2C). The steeling assembly 199 includes a support body 199a, spring biased actuator 199b, and a push rod 199c with a steeling member 199d affixed to a bottom of the push rod 199c. The steeling assembly support body 199a is affixed to the projection 198. When the actuator 199b is depressed by the operator, the push rod 199c moves downwardly and the steeling member 199d engages the blade edge 350 of the knife blade 300 to straighten the blade edge 350.

In one exemplary embodiment, the hand piece 200 and the elongated central core 252 of the handle assembly 110 may be fabricated of plastic or other material or materials known to have comparable properties and may be formed by molding and/or machining The hand piece 200, for example, may be fabricated of two over molded plastic layers, an inner layer comprising a hard plastic material and an outer layer or gripping surface comprised of a softer, resilient plastic material that is more pliable and easier to grip for the operator. The gearbox housing 113 and the frame body 150 of the head assembly 111 may be fabricated of aluminum or stainless steel or other material or materials known to have comparable properties and may be formed/shaped by casting and/or machining The blade and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes. Additional details regarding the structure and function of the power operated rotary knife 100 are found in the previously referenced '951 application, which is incorporated herein in its entirety.

Flexible Shaft Drive Transmission 700

As can best be seen in FIGS. 1, 19-21, the flexible shaft drive transmission 700 comprises the outer casing assembly 702 and the drive shaft assembly 800, which is rotatably supported within the tubular throughbore 706 defined by the outer casing 704. The outer casing assembly 702 is stationary with respect to the rotating drive shaft assembly 800 and includes the outer casing 704, the motor end coupling 714 and the handle assembly coupling 784. The outer casing assembly 702 includes an outer casing 704 comprising a flexible tube. The flexible tube may include one or more tubular layers of plastic material, such as nylon, and, optionally, also may include one or more layers of braided wire between the tubular layers for added strength and durability. One or more layers may optionally comprise a spiral wound layer of metal conduit with interlocking edges, as disclosed in U.S. published application no. US-2007-0078012-A1, published Apr. 5, 2007.

Figure 25:
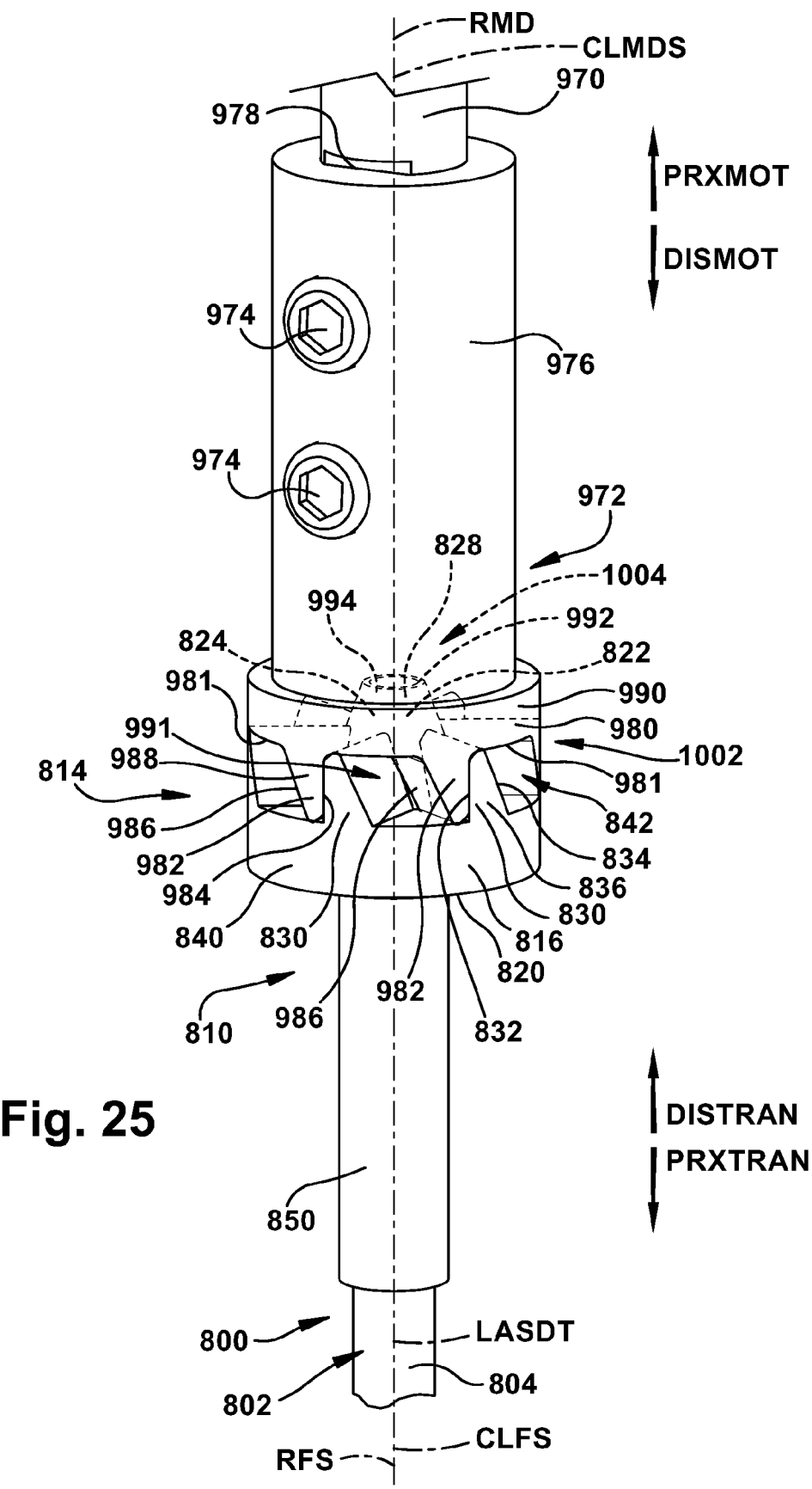
FIG. 25 is a schematic perspective view of a drive connection between a driven fitting of the drive shaft assembly of the shaft drive transmission and a drive fitting of the drive motor assembly, as they would appear when the motor end portion of the drive shaft transmission is in an engaged state with the drive motor assembly.

The drive shaft assembly 800 includes the drive transmitting shaft or flex shaft 802, the first, driven fitting 814 at the first end 810 of the flex shaft 802 and the second, male drive fitting 884 at the second end 880 of the flex shaft 802. When the motor end coupling 714 of the drive shaft assembly 800 is in the engaged state (operatively coupled or connected) to the motor coupling 915 of the drive motor assembly 900 (as shown, for example, in FIGS. 8-13), the first, driven fitting 814 is operatively engaged with the drive fitting 972 of the drive motor assembly 900, as shown in FIG. 25. Actuation of the drive motor 901, when the motor end coupling 714 and the drive motor coupling 915 are in the engaged state results in rotation of the flex shaft 802 and, via the gear train 604, rotation of the rotary knife blade 300 of the power operated rotary knife 100.

The flexible shaft drive transmission 700 includes a first end 701a, adjacent the drive motor assembly 900, a second end 701b, adjacent the power operated rotary knife handle assembly 110, and a flexible, elongated central portion 701c. When driven by the drive motor assembly 900, the flex shaft 802 of the drive shaft assembly 800 rotates about an axis of rotation RFS (FIGS. 1, 19, 21 and 22), which is substantially congruent with a central longitudinal axis LASDT of the drive shaft assembly 800. The central longitudinal axis LASDT of the drive shaft assembly 800 is substantially congruent with a center line CLFS (FIG. 22) though the flex shaft 802 and also defines a central longitudinal axis of the flexible shaft drive transmission 700.

When the handle assembly coupling 784 of the outer casing assembly 702 is coupled to the central core 252 of the handle assembly 110 by the drive shaft latching assembly 275, the male drive fitting 884 of the drive shaft assembly 800 operatively engages the female fitting 622 of the pinion gear 610. When the handle assembly coupling 784 is connected to the handle assembly 110, the central longitudinal axis LASDT of the drive shaft assembly 800 is substantially congruent with both the pinion gear axis of rotation PGR and the longitudinal axis LA of the handle assembly 110.

Figure 18:
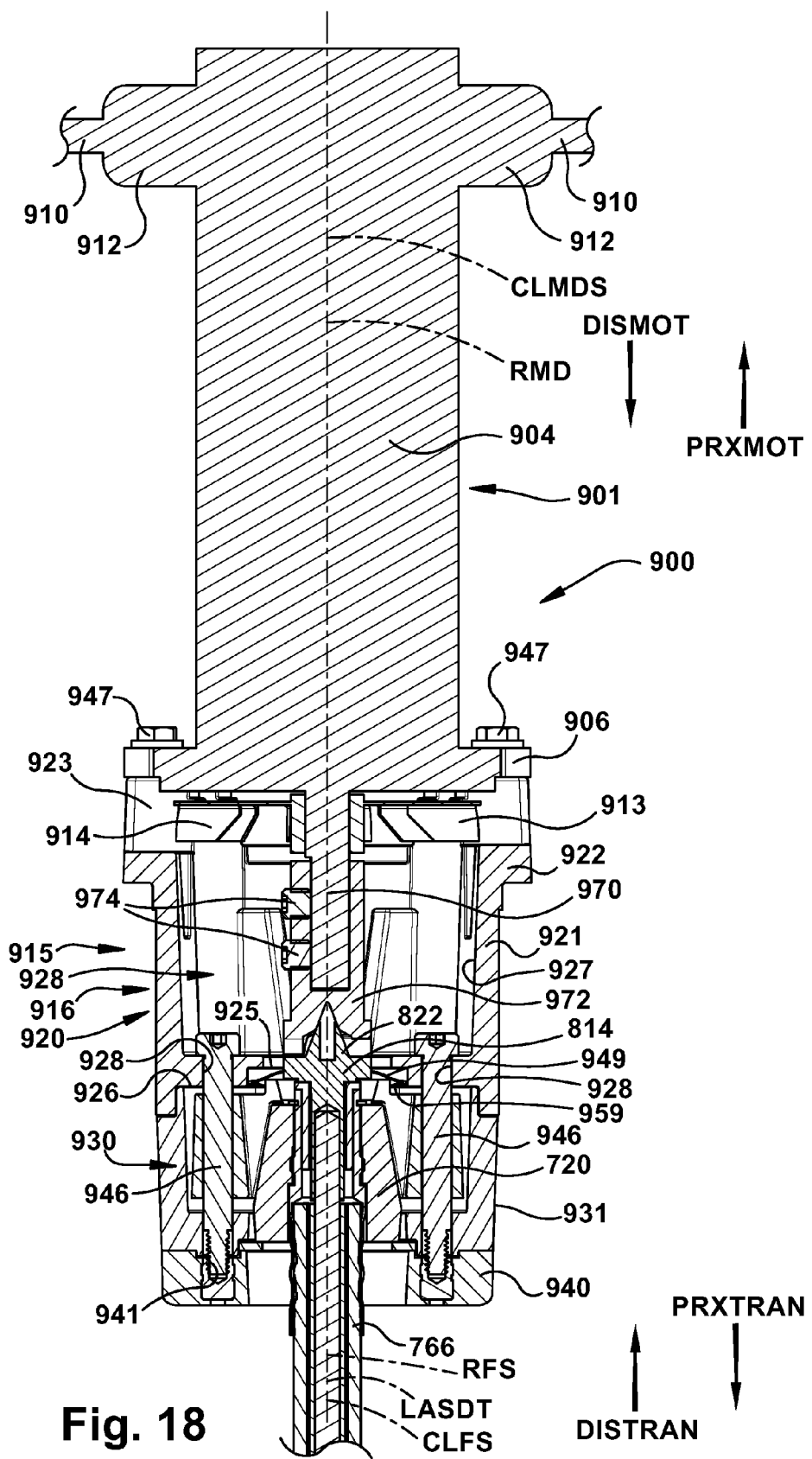
FIG. 18 is a schematic sectional view of the drive motor assembly and the shaft drive transmission of FIG. 12, as seen from a plane indicated by the line 18-18 in FIG. 15, showing the drive connection structure between a motor end portion of the shaft drive transmission and the drive motor assembly, with the shaft drive assembly removed for clarity.

When the motor end coupling 714 of the outer casing assembly 702 is coupled to or in an engaged state with the motor coupling 915 of the drive motor assembly 900, the drive fitting 972 of the drive motor 901 operatively engages the driven fitting 814 of the drive shaft assembly 800 and the central longitudinal axis LASDT of the drive shaft assembly 800 is substantially congruent with an axis of rotation RMD (FIG. 18) of the drive motor 901 and is substantially congruent with a center line CLMDS through a drive shaft 970 of the drive motor 901. As used herein with respect to the drive connection structure 1000 of the flexible shaft drive transmission 700 and the drive motor assembly 900, the term axial shall mean in a direction or movement along the central longitudinal axis LASDT of the drive shaft assembly 800, while the term radial shall mean movement in a direction radially away or outwardly from the central longitudinal axis LASDT.

Figure 19:
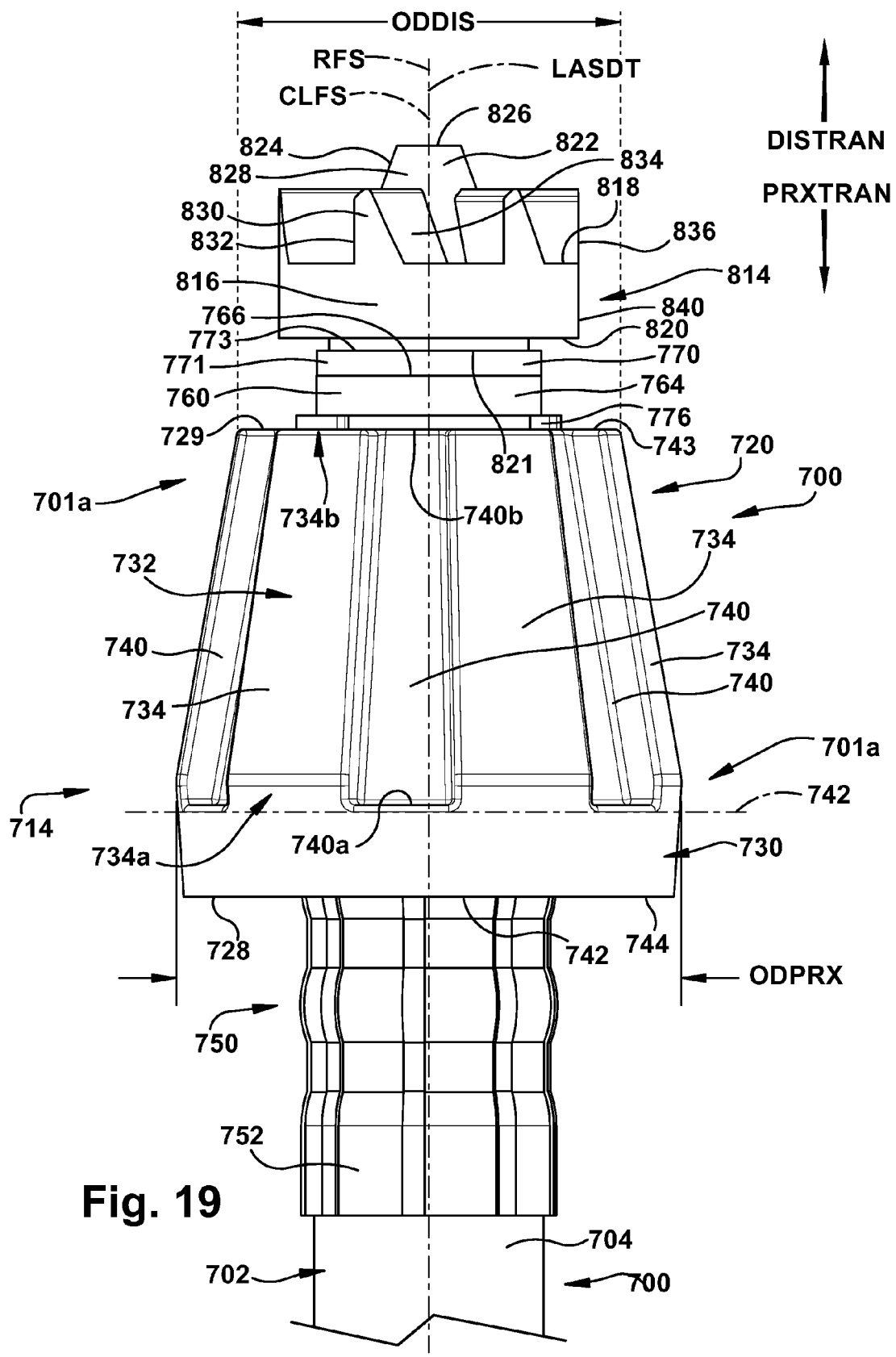
FIG. 19 is a schematic side elevation view of the motor end portion of the shaft drive transmission of the power operated tool assembly of FIG. 1 showing a portion of an outer casing assembly and the drive shaft assembly of the shaft drive transmission.
Figure 20:
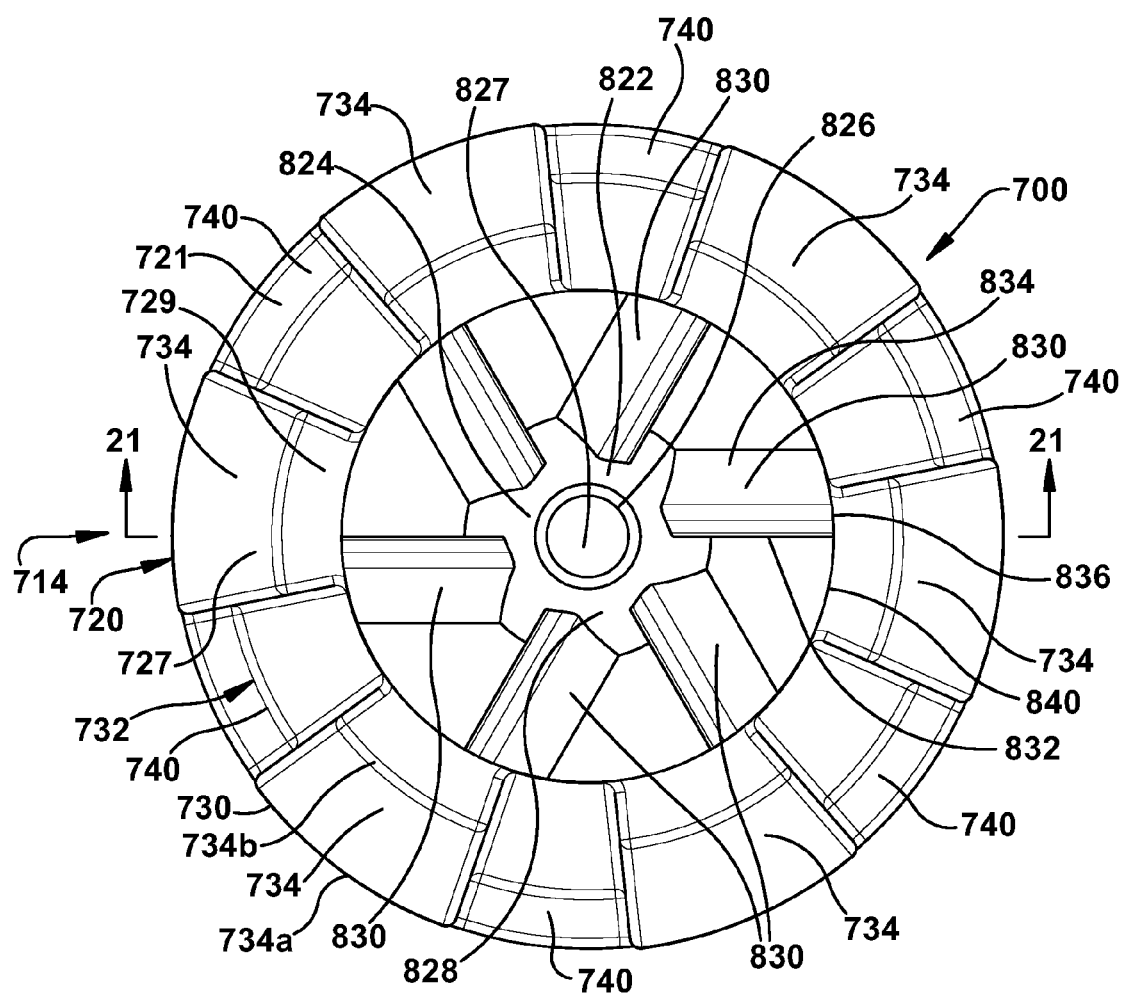
FIG. 20 is a schematic top plan view of the motor end portion of the shaft drive transmission of FIG. 19.
Figure 21:
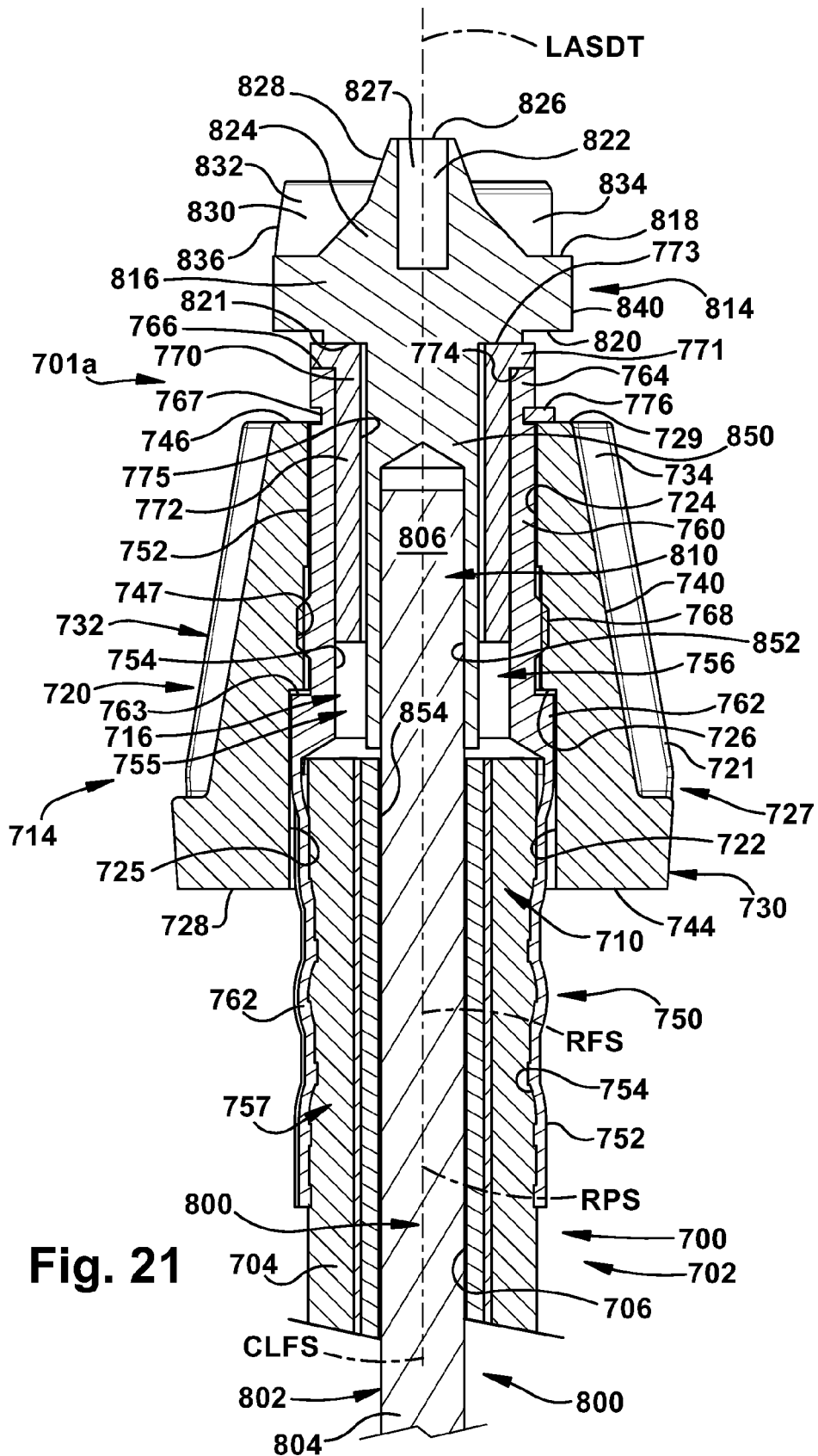
FIG. 21 is a schematic section view of the motor end portion of the shaft drive transmission of FIG. 19, as seen from a plane indicated by the line 21-21 in FIG. 20.

As can best be seen in FIGS. 19 and 21, the flex shaft 802 of the shaft drive transmission 800 extends through the throughbore 706 defined by the tubular outer casing 704 and through a throughbore 716 of the motor end coupling 714. The driven fitting 814 of the drive shaft assembly 800 extends distally beyond the motor end coupling 714. As used herein, with respect to the motor end 701a of the flexible shaft drive transmission 700, the terms distal or distal direction DISTRAN (FIGS. 17-19) shall mean in a direction from the central portion 701c of the shaft drive transmission 700 toward the first, motor end portion 701a of the shaft drive transmission 700 and toward the drive motor 900. The terms proximal or proximal direction PRXTRAN shall mean the opposite direction. That is, as can be seen in FIG. 19, the driven fitting 814 of the shaft drive assembly 800 is distal or in the distal direction DISTRAN with respect to the motor end coupling 714, while the outer casing 704 is proximal or in the proximal direction PRXTRAN with respect to the driven fitting 814 and the motor end coupling 714.

The motor end coupling 714 includes a coupling body 720 and a support pedestal 750 which supports the coupling body 720 and attaches or secures the coupling body 720 to the outer casing 704 of the outer casing assembly 702. As can best be seen in FIGS. 19-21, the coupling body 720 is generally cone-shaped or frustoconical shaped and includes an outer surface 721 and an inner surface 722. The inner surface 722 defines a central opening 723 which is part of the throughbore 716 of the motor end coupling 714. As can best be seen in FIGS. 14B, 19 and 21, the coupling body 720 includes a distal tapered region 727 and a proximal generally cylindrical region 730. The distal tapered region 727 defines a distal end 729 of the coupling body 720, while the proximal cylindrical region 730 defines a proximal end 728 of the coupling body 720. The distal end 729 of the coupling body 720 is defined by a distal end wall 746 of the coupling body 720, while the proximal end 728 of the coupling body 720 is defined by a proximal end wall 744.

As can be seen in FIG. 19, an outer diameter ODPRX at a proximal end 742 of the distal tapered region 727 of the coupling body 720 is larger than an outer diameter ODDIS at a distal end 743 of the distal tapered region 727 of the coupling body 720. The distal end 743 of the distal tapered region 727 coincides with the distal end 729 of the coupling body 720. The proximal end 742 of the distal tapered region 727 approximately coincides with a proximal end 740 (FIG. 19) of a plurality of channels or recesses 740 formed in the outer surface 721 of the coupling body 720. The tapering between the proximal and distal ends 742, 743 of the tapered distal region 727 is a substantially a uniform taper resulting in the coupling body 720 having the configuration of a substantially frustoconical, tapered cone 732. In one exemplary embodiment, an angle of taper of the cone 732 is approximately 10° with respect to the shaft drive transmission central longitudinal axis LASDT.

In the tapered distal region 727 of the coupling body 720, the outer surface 721 of the coupling body 720 defines a plurality of radially spaced apart raised ribs 734 separated by the plurality of channels or recesses 740 between the ribs 734. The ribs 734 extend axially or longitudinally along the tapered central region 726 of the coupling body 720. In one exemplary embodiment, the number of raised ribs 734 and channels 740 is six. In one exemplary embodiment, because the tapered distal region 727 is generally uniformly tapered from a larger diameter proximal end 742 to a small diameter distal end 743, both the raised ribs 734 and the channels 740 taper uniformly from a narrower distal end 734b, 740b to a wider at a proximal end 734a, 740a. That is, a circumferential distance or arc defined by each of the ribs 734 and channels 740 increases when proceeding from the distal end 743 to the proximal end 742 of the tapered distal region 727 of the coupling body 720. Additionally, in one exemplary embodiment, each of the raised ribs 734 is of substantially uniform height above the respective adjacent channels 740 from the distal end 734b to the proximal end 734a of the rib 734.

The plurality of ribs 734 of the tapered distal region 727 of the coupling body 720 are configured to interfit with a plurality of channels or recesses 957 of the mating tapered collar 950 of the drive motor coupling 915, while the plurality of channels 740 of the tapered distal region 727 of the coupling body 720 are configured to interfit with a plurality of raised ribs 956 of the tapered collar 950 of the drive motor coupling 915. In one exemplary embodiment, each of the channels 957 and the ribs 956 of the tapered collar 950 are tapered along their longitudinal extent, like the ribs 734 and channels 740 of the coupling body 720, to properly receive the tapered ribs 734 and the tapered channels 740 of the tapered distal region 727 of the coupling body 720.

The tapered, mating configurations of the respective six recesses 734, 957 and six ribs 734, 956 of the coupling body 720 of the motor end coupling 714 and the tapered collar 950 of the motor drive coupling 915 advantageously allows for easy, one handed insertion of the coupling body 720 into the tapered collar 950. Moreover, the use of the interfitting tapered couplings 714, 915, with six recesses and six interfitting ribs, results in positive and sure alignment of the drive motor rotational axis RMD and the flex shaft axis of rotation RFS and the central longitudinal axis LASDT of the flexible shaft drive transmission 700. As explained previously, properly alignment of the axis of rotation RMD of the drive motor 901 and the axis of rotation RFS of the drive transmitting shaft or flex shaft 802 is important in reducing flex shaft vibration and excessive wearing of components of the shaft drive transmission 700.

Figure 14A:
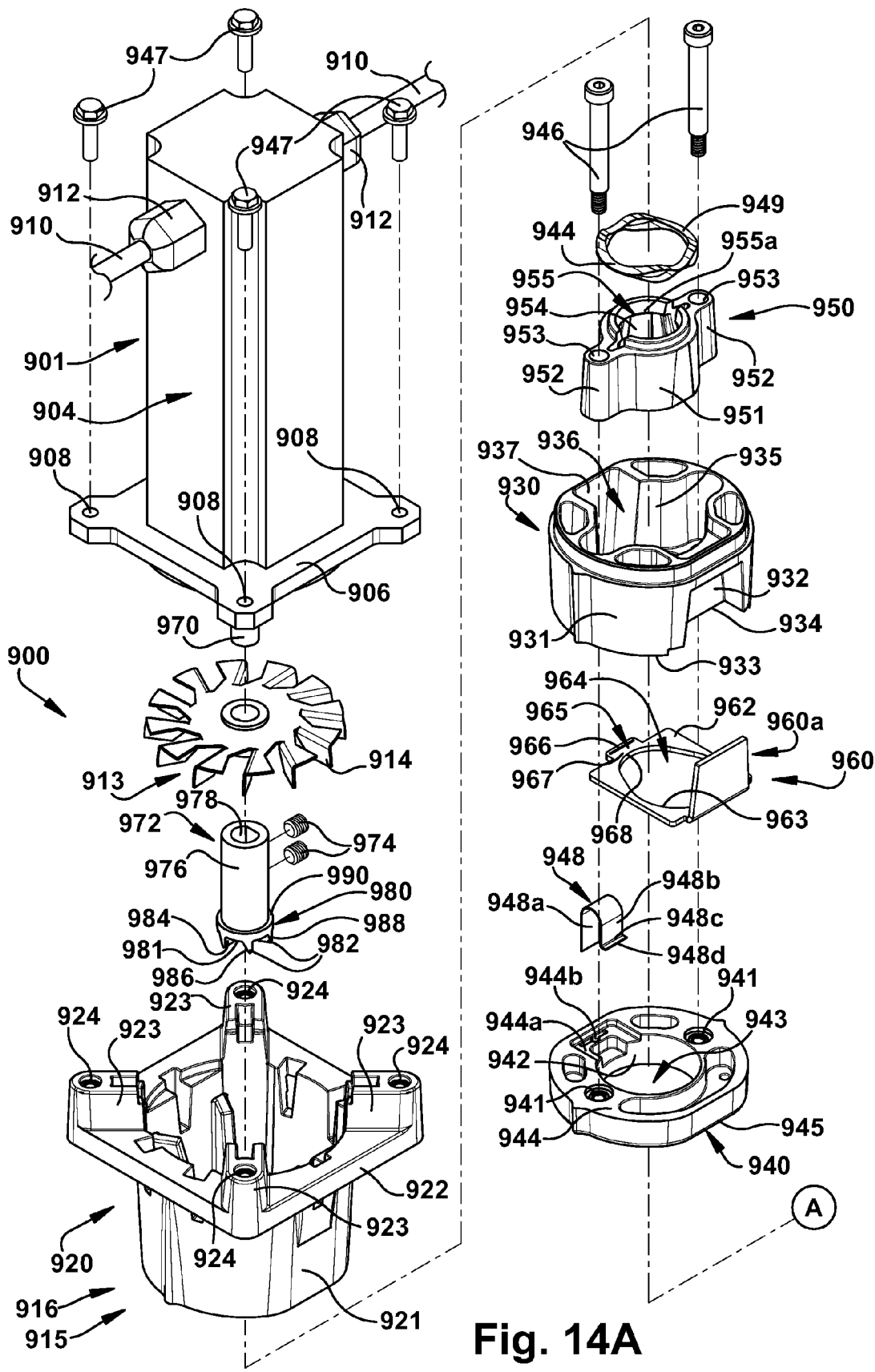
FIG. 14A is a schematic exploded perspective view of the drive motor assembly of FIG. 12.
Figure 14B:
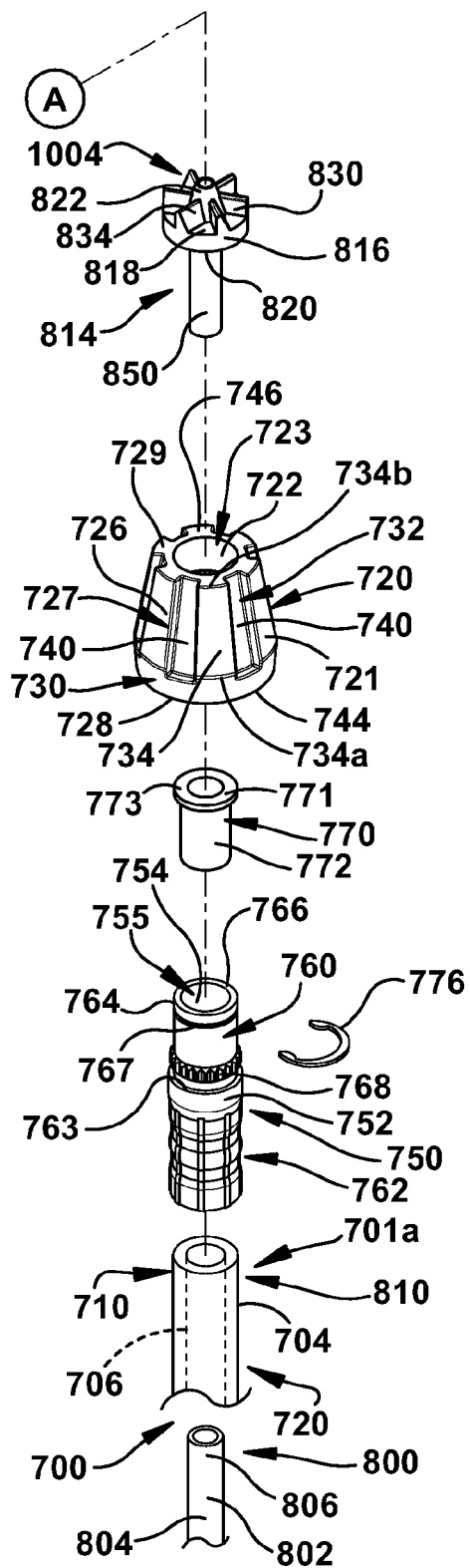
FIG. 14B is a schematic exploded perspective view of a motor end portion of the flexible shaft drive transmission of FIG. 12.
Figure 15:
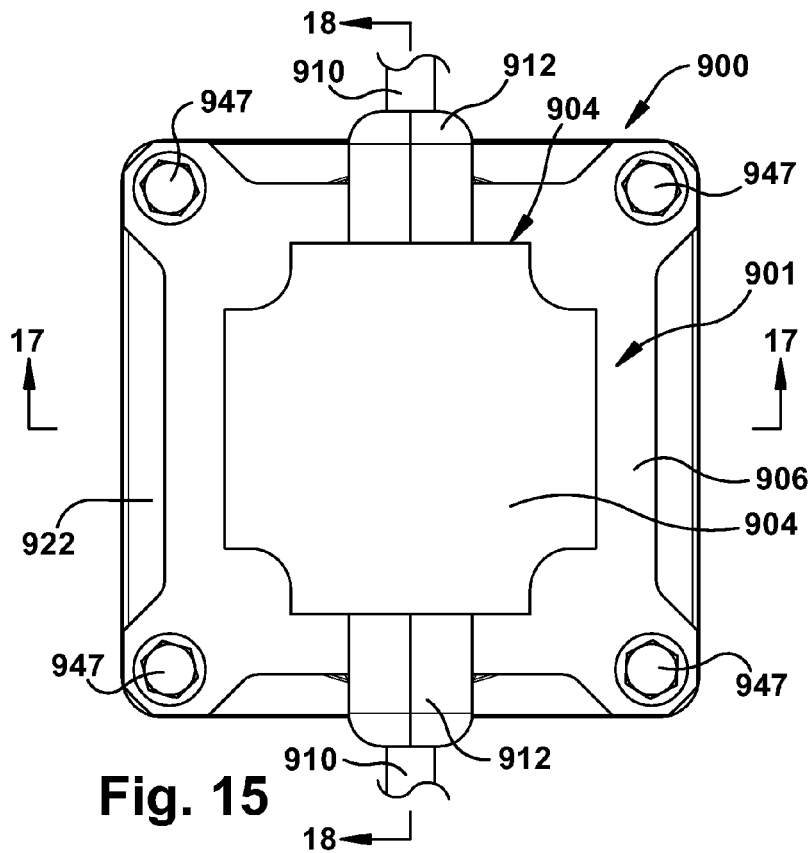
FIG. 15 is a schematic top elevation view of the drive motor assembly and the shaft drive transmission of FIG. 12.

As can best be seen in FIGS. 14B and 21, the central opening 723 of the coupling body 720 includes a smaller diameter upper portion 724 and a larger diameter lower portion 725. A shoulder 726 is formed between the upper and lower portions 724, 725 of the coupling body 720.

The motor end coupling 714 also includes the support pedestal 750. As can best be seen in FIGS. 14 and 21, the support pedestal 750 includes an outer surface 752 and an inner surface 754. The inner surface 754 defines a longitudinal passageway or central opening 755 which defines a portion of the throughbore 716 of the motor end coupling 714. The support pedestal 750 includes a distal, axially thicker walled, cylindrical stem portion 760 and a proximal, axially thinner walled, cylindrical casing portion 762. The stem portion 760 of the support pedestal 750 is received into the central opening 723 and supports the coupling body 720. A stepped shoulder 763 is formed on the outer surface 752 between the stem portion 760 and the casing portion 762 of the support pedestal 750. The stepped shoulder 763 of the support pedestal 750 engages the stepped shoulder 726 of the coupling body 720 to inhibit axial movement of the coupling body 720 in the proximal direction PRXTRAN.

An upper or distal portion 764 of the stem 760 extends distally beyond the distal end 729 of the coupling body 720. The distal portion 764 of the stem 760 includes a circumferential groove 767 formed in the outer surface 752. The groove 767 receives a retaining ring 776 to inhibit axial movement of the coupling body 720 in the distal direction DISTRAN with respect to the support pedestal 750. Relative rotational movement of the coupling body 720 with respect to the support pedestal 750 by engagement of a knurled peripheral annulus 768 formed on the outer surface 752 of the support pedestal 750 and an aligned knurled peripheral annular 747 formed on the inner surface 722 of the coupling body 720.

A sleeve bushing 770 is disposed at a distal end 766 of the support pedestal stem portion 760. In one exemplary embodiment, the sleeve bushing 770 is pressed into the upper, reduced diameter portion 756 of the central opening 755 of the support pedestal 750. The sleeve bushing 770 includes an enlarged annular head 771 and a cylindrical body 772. As noted above, the cylindrical body 772 of the bushing 770 is received in the upper reduced diameter portion 756 of the support pedestal longitudinal passageway 755 and a proximal wall 774 defined by the enlarged head 771 bears against the distal end 766 of the stem portion 760 of the support pedestal 750. A distal wall 773 defined by the enlarged head 771 provides a seating surface for an axially stepped portion 821 of a proximal wall 820 of a cylindrical base 816 of the drive fitting 814. The sleeve bushing 770 defines a central, longitudinal passageway 775 that defines a portion of the throughbore 716 of the motor end coupling 714.

In one exemplary embodiment, the proximal, thin walled casing portion 762 of the support pedestal 750 is crimped onto the outer casing 704 of the casing assembly 702 to secure the support pedestal 750 to the casing 704 and thereby couple or secure the coupling body 720 to the casing 704. Those of skill in the art would recognize that there are a number of alternative approaches to securing the motor end coupling 714 to the casing 704 including molding and adhesive means. A proximally extending portion of the thin walled casing portion 762 extending rearward from the coupling body 720 functions as a stress relief sleeve so as to avoid undesirable kinking of the flexible shaft drive transmission 700 at the interface of the outer casing 704 and the coupling body 720.

As will be explained below, the drive motor coupling 915 includes a latching mechanism 960 that releasably secures the motor end coupling 714 to the drive motor coupling 915 thereby achieving an engaged state of the two couplings 714, 915. The latching mechanism 960 includes a push button latch 960a that moves or slides orthogonally or radially with respect to the drive motor axis of rotation RMD and the longitudinal axis LASDT of the shaft drive transmission 700. As can best be seen in FIGS. 17, 21 and 28, the proximal end wall 744 of the coupling body 720 of the motor end coupling 714 is engaged by an upper or top portion 967 of a latching region 965 of the push button latch 960a of the latching mechanism 960 to secure the motor end coupling 714 to the drive motor coupling 915. The latching mechanism 960 of the drive motor coupling 915 provides a quick connect-quick disconnect feature for the coupling and uncoupling of the motor end coupling 714 and the drive motor coupling 915.

That is, the latching interconnection between the motor end coupling 714 and the drive motor coupling 915, together with the ribs/channel engagement structure of the coupling body 720 of the motor end coupling 714 and the tapered collar 950 of the drive motor coupling 915 allow the operator of the power operated knife 100 to engage or couple shaft drive transmission 700 to the drive motor assembly 900 using only one hand by simply pushing the coupling body 720 of the motor end coupling 714 up into the tapered collar 950 of the drive motor coupling 915 with one hand thereby allowing the latching region 965 of the push button latch 960a to latch against the stepped shoulder 744 and thereby operatively engaging the motor end coupling 714 to the drive motor coupling 915. Conversely, the operator need only depress an actuator 961 of the push button latch 960a with a finger to release the latching region 965 of the push button latch 960a from the proximal end wall 744 of the coupling body 720 and thereby release or disengage the motor end coupling 714 from the drive motor coupling 915.

The flexible shaft drive transmission 700 further comprises the elongated drive shaft assembly 800 rotatable within the outer casing assembly 702. As is best seen in FIGS. 22-24, the drive shaft assembly 800 includes the flex shaft 802 comprising a flexible metal core 804. In one exemplary embodiment, the metal core 804 is surrounded by one or more helical windings about the core 804. The drive shaft assembly 800 further includes the driven fitting 814 at the drive motor end 810 of the drive shaft assembly 800 and the drive fitting 884 at the power operated rotary knife end 880 of the drive shaft assembly. The driven fitting 814 includes a cylindrical base 816 and a shaft 850 extending proximally from a proximal wall 820 of the cylindrical base 816. The shaft 850 defines a central socket 852. The central socket 852 extends distally from a proximal end 854 of the shaft 850 and receives a distal end portion 806 (FIG. 21) of the flex shaft 802. The driven fitting shaft 850 may be secured to the end portion 806 of the flex shaft 802 in varies ways including crimping and adhesive attachment.

As can best be seen in FIG. 21, the proximal wall 820 of the cylindrical base 816 includes an axially stepped central portion 821. The stepped central portion 821 of the proximal wall 820 functions as a seating surface for the driven fitting 814. Specifically, the stepped central portion 821 rotates on and bears against the distal wall 773 of the enlarged head 771 of the sleeve bushing 770 of the motor end coupling 714

The cylindrical base 816 of the driven fitting 814 includes a planar upper surface 818. Extending axially from the planar upper surface 818 is a locating member 822. In one exemplary embodiment, the locating member 822 comprises a central tapered projection 824 projecting axially in the distal direction DISTRAN from the planar upper surface 818 of the cylindrical base 816. The locating member 822 is radially surrounded by a plurality of vanes 830 projecting axially in the distal direction DISTRAN from the planar upper surface 818 of the cylindrical base 816 and radially outwardly from the tapered projection 824. In one exemplary embodiment, the plurality of vanes 830 comprises six vanes. A portion 828 of the locating member 822 extends distally beyond the six vanes 830 and terminates in a distal end 826 of the locating member 822. Each of the six vanes 830 includes a drive engagement face 832, a back wall 834 and a radial outer surface 836. The radial outer surface 836 of each of the vanes 830 is congruent and coextensive with a radial outer surface 840 of the cylindrical base 816.

As can best be seen in FIG. 22, for each vane 830, the engagement face 832 is substantially vertical, that is, a plane through the engagement face 832 would be substantially parallel to a portion of the central longitudinal axis LASDT of the flexible shaft drive transmission 700 extending through the driven fitting 814 and the planes through each of the engagement faces 832 would intersect in a line substantially coextensive with the portion of the central longitudinal axis LASDT of the shaft drive transmission 700 extending through the driven fitting 814. Also, as can best be seen in FIG. 22, for each vane 830, an included angle IA is defined by the engagement face 832 and the back wall 834. In one exemplary embodiment, the included angle would be approximately 25°, the diameter of the driven fitting 814 would be approximately 0.75 inches, a total height of the driven fitting 814 from the proximal wall 820 to the distal end 826 of the locating member 822 would be approximately 0.56 inches.

When the motor end coupling 714 is in an engaged state with the drive motor coupling 915, the drive fitting 972 of the drive motor assembly 900 is in operative or driving engagement with driven fitting 814 of the drive shaft assembly 800. When the drive motor 901 is actuated, the drive fitting 972 drives or rotates the driven fitting 814 which, in turn, rotates the flex shaft 802 and the male drive fitting 884 of the drive shaft assembly 800. As can best be seen in FIG. 25, the six vanes 830 of the driven fitting 814 of the drive shaft assembly 800 interfit into respective cavities 991 formed between the radially spaced apart six vanes 982 of the drive fitting 972 of the drive motor assembly 900. Similarly, the six vanes 982 of the drive fitting 972 interfit into respective cavities 842 formed between the radially spaced apart six vanes 830 of the driven fitting 814. The interfitting of the vanes 830 of the driven fitting 814 and the vanes of the drive fitting 972, as schematically illustrated in FIG. 25, defines the drive engagement structure 1002 of the drive connection structure 1000 of the present disclosure.

When the motor end coupling 714 is in an engaged state with the drive motor coupling 915, the drive fitting 972 of the drive motor assembly 900 is in operative or driving engagement with driven fitting 814 of the drive shaft assembly 800, as shown in FIG. 25, the forward portion 828 of the tapered central projection 824 of the locating member 822 of the driven fitting 814 extends axially into the tapered central opening 984 of the locating member 992 of the drive fitting 972. The interfitting of the tapered central projection 824 of the driven fitting 814 into the tapered central opening 984 of the drive fitting 972 defines the axial locating structure 1004 of the present disclosure. In one exemplary embodiment, the locating member 992 of the drive fitting 972 comprises the tapered central opening 984 defined in a cylindrical body 976 of the drive fitting 972 of the drive motor assembly 900. The interfitting of the locating member forward portion 828 of the driven fitting 814 and the central opening 984 of the drive fitting 972 helps to insure proper coaxial alignment between the motor drive axis of rotation RMS and the flex shaft axis of rotation RFS.

Also, when the motor end coupling 714 is an engaged state with the drive motor coupling 915 and the drive motor 901 actuated, the drive engagement faces 832 of the six projecting vanes 830 are operatively engaged and rotated by corresponding drive engagement faces 984 of six projecting vanes 982 of the cylindrical body 976 of the drive fitting 972. The use of six interfitting vanes 830, 982 of the driven fitting 814 and the drive fitting 972 insures, at most, a small rotation (rotation required would be 60° or less) of the motor end coupling 814 with respect to the drive motor coupling 915, allowing for one-handed quick connection of the motor end coupling 814 and the drive motor coupling 915.

The interfitting of the six vanes 830 of the driven fitting 814 with the six vanes 982 of the drive fitting 972 results in a drive connection between the drive motor assembly 900 and the flexible shaft drive transmission 700 that comprises six planar surfaces, namely, the contacting drive engagement faces 832, 984 of the driven fitting 814 of the drive shaft assembly 800 and the drive fitting 972 of the drive motor assembly 900. The use of six planar drive engagement faces advantageously results in a large total drive contact area. Additionally, the use of six planar contact surfaces mitigates a problem associated with prior motor drive-shaft drive transmission drive connections which utilized a square drive fitting at the end of the drive transmitting shaft and a mating square socket fitting affixed to the drive shaft of the drive motor. Specifically, in such prior drive connections, the vertices of the square male fitting of the drive transmitting shaft tended to become rounded off over time thereby becoming loose or sloppy in the square socket fitting resulting in an initial "clunking" in the drive connection when the drive motor was actuated by the operator to drive the power operated rotary knife. The use of six planar drive engagement faces in the drive connection of the present disclosure overcomes the problem of rounded off vertices of a square mail fitting and the associated "clunking" problem upon actuation of the power operated rotary knife 100.

The outer casing assembly 702 of the flexible shaft drive transmission 700 also includes the handle assembly coupling 784 at the second or power operated knife end portion 701b of the shaft drive transmission 700. The handle assembly coupling 784 includes a distal portion 786 that extends into the throughbore 258 of the elongated central core 252 of the hand piece retaining assembly 250 of the power operated rotary knife handle assembly 110. The handle assembly coupling 784 of the outer casing assembly 702 includes a coil spring 792 (FIGS. 1 and 7) that biases both the male drive fitting 884 of the drive shaft assembly 800 to a disengaged position or state with respect to female fitting 622 of the pinion gear and the handle assembly coupling 784 to a disengaged position or state with respect to the handle assembly 110 of the power operated rotary knife 100. That is, when the latch 276 of the drive shaft latching assembly 275 is depressed by the operator of the power operated rotary knife 100, the coil spring 792 functions to operatively disengage the drive connection between the flexible shaft drive transmission 700 and the power operated rotary knife 100. A stress relief sleeve 790 is molded onto the second end 780 of the outer casing 704 and transitions between the outer casing 704 and the handle assembly coupling 784 so as to avoid undesirable kinking of the shaft drive transmission 700 at the interface of the outer casing 704 and the handle assembly coupling 784.

Drive Motor Assembly 900

Figure 11:
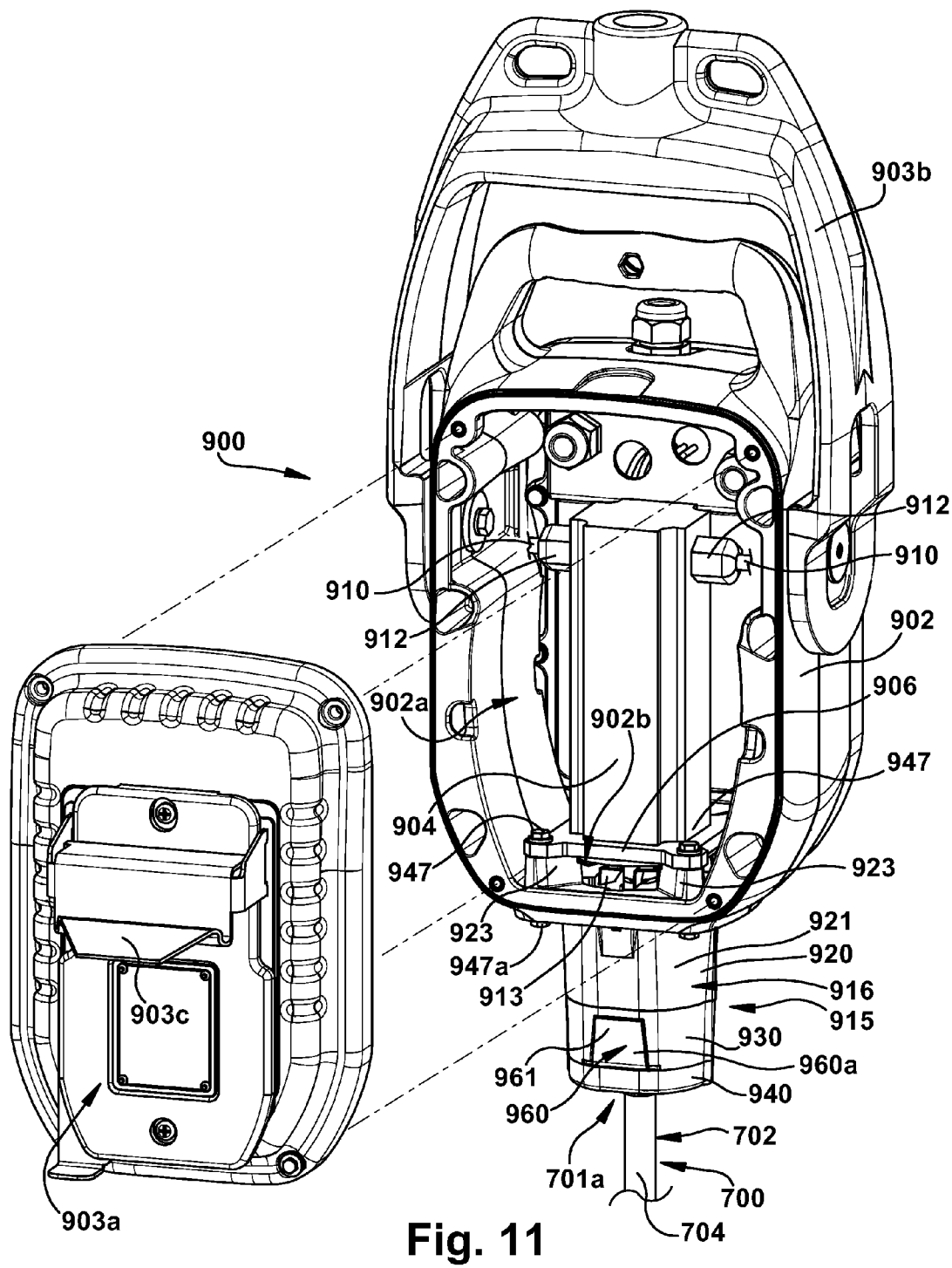
FIG. 11 is a schematic perspective view of the drive motor assembly and the shaft drive transmission of FIG. 8 with an access panel of a drive motor cover of the drive motor removed to better show the drive motor within the drive motor cover.
Figure 13:
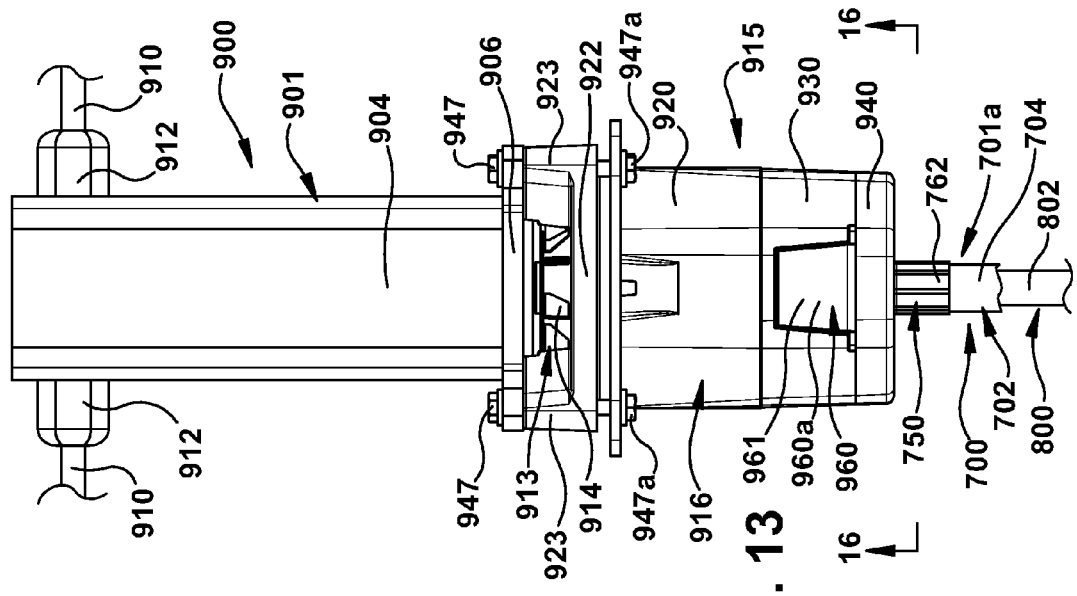
FIG. 13 is a schematic side elevation view of the drive motor assembly and the shaft drive transmission of FIG. 12.
Figure 12:
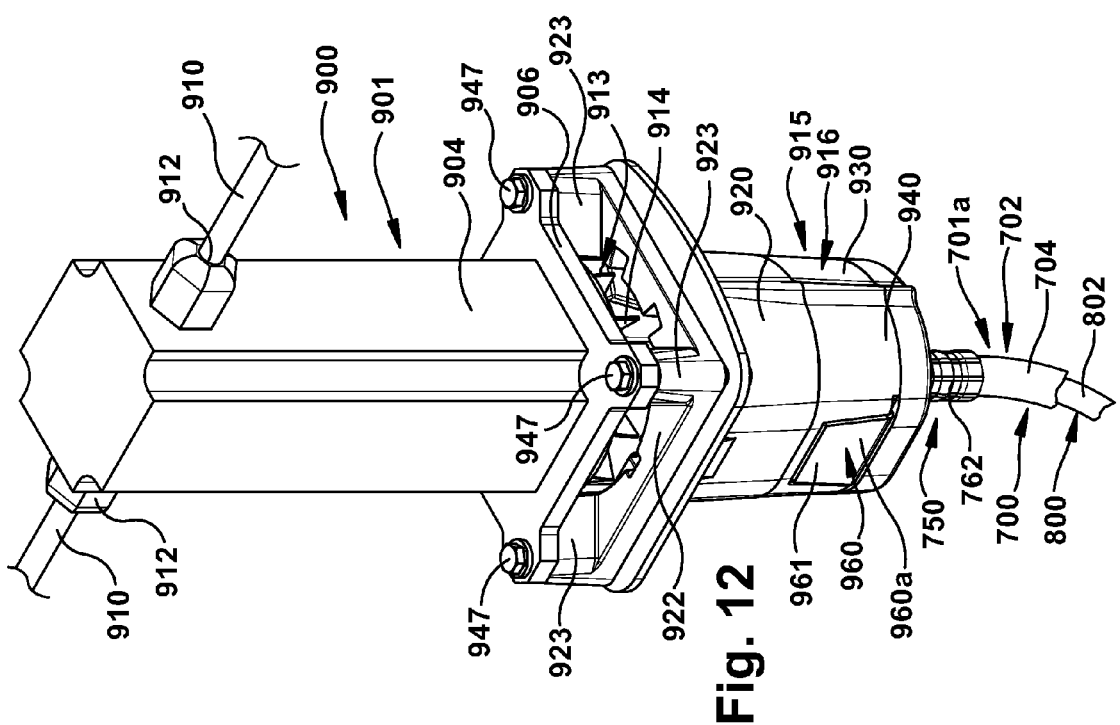
FIG. 12 is a schematic perspective view of the drive motor assembly, with the drive motor cover removed to better show the drive motor and the drive motor coupling, and a motor end portion of the flexible shaft drive transmission of the power operated tool assembly of FIG. 1 in an engaged state.

The drive motor assembly 900, in one exemplary embodiment, includes the drive motor 901, a drive motor cover 902 (shown in FIGS. 8-11) and the motor coupling 915. As best seen in FIG. 11, the drive motor cover 902 defines a cavity 902a which receives the drive motor 901 and the drive motor coupling 915 extends through an opening 902b in a lower or distal end of the cover 902. The drive motor cover 902 also includes a removable access panel 903a which may be removed for purposes of obtaining access to the drive motor 901. A pivoting mounting bracket 903b that pivots with respect to the cover 902 is provided allowing for horizontal, vertical or angled mounting of the mounting bracket 903b, while the drive motor 901 remains oriented in a vertical position within the cover 902. Affixed to an outer surface of the access panel 903a is a rotary knife hanger 903c. The rotary knife hanger 903c allows the operator to hang the power operated rotary knife 100 out of harm's way when the knife 100 is not in use. The power operated rotary knife 100 is hung by its distal end by positioning the knife 100 such that the hanger extends through the cutting opening CO defined by the rotary knife blade 300 and the blade housing 400.

In one exemplary embodiment, the drive motor 901 comprises a brushless DC servo motor. By way of example and without limitation, one appropriate drive motor is an Elwood Gettys Model M423-SAYO-OUOY-3K DC servo motor manufactured by Elwood Corporation, 2701 North Green Bay Road, Racine, Wis. 53404 (www.elwood.com). The drive motor 901 includes a drive motor body 904 and is supplied power and control signals via a pair electrical cables 910 which extend through a pair of sealed connectors 912 which are affixed to the drive motor body 904 and allow the cables 910 pass into the interior of the drive motor body 904.

Figure 17:
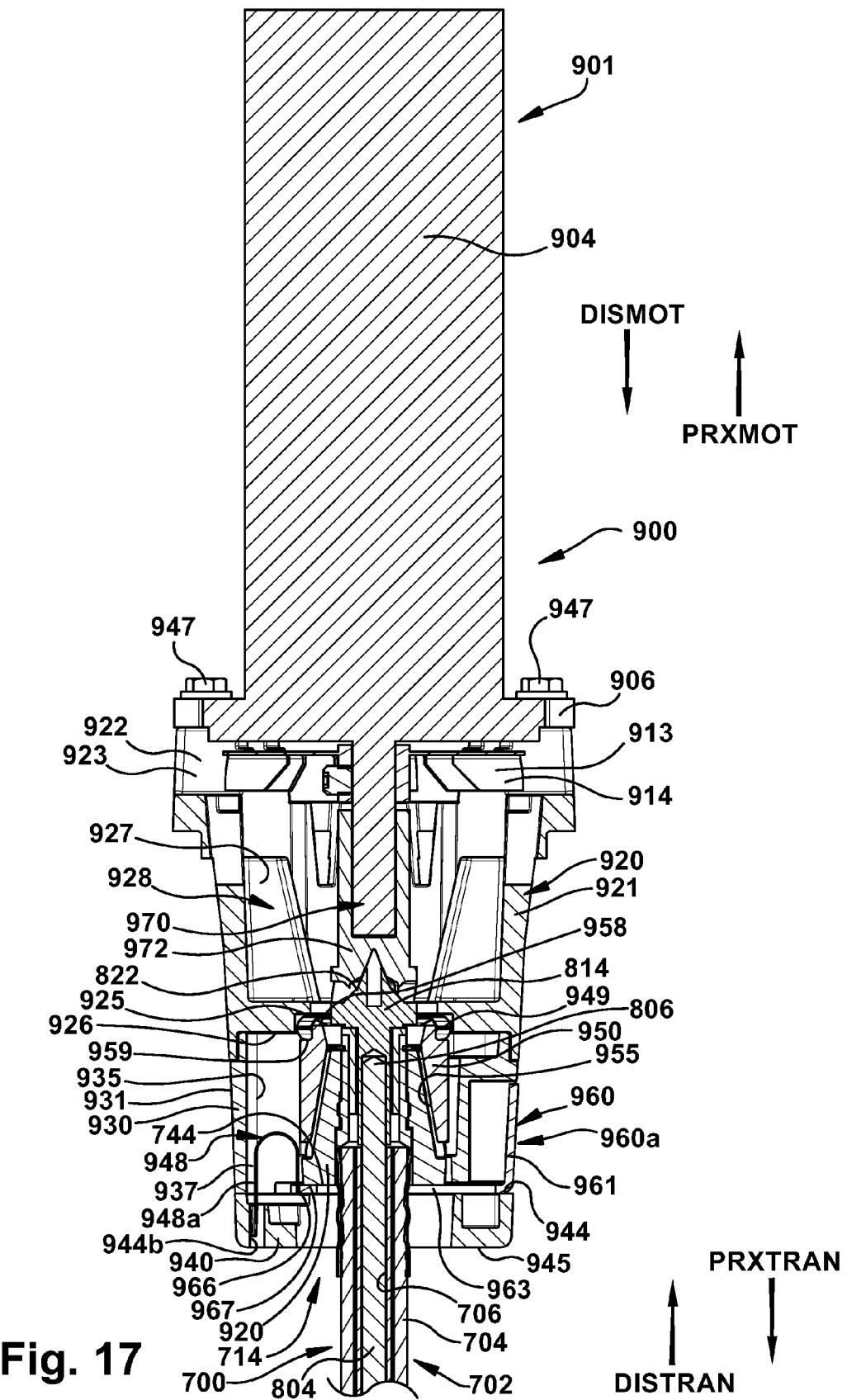
FIG. 17 is a schematic sectional view of the drive motor assembly and the shaft drive transmission of FIG. 12, as seen from a plane indicated by the line 17-17 in FIG. 15, showing a drive connection structure between a motor end portion of the shaft drive transmission and the drive motor assembly.

The drive motor 901 includes a motor drive shaft 970 that extends from a distal end of the drive motor body 904. As used herein, with respect to the drive motor assembly 901, the terms distal or distal direction DISMOT shall mean in a direction from the drive motor body 904 toward the flexible shaft drive transmission 700. The terms proximal or proximal direction PRXMOT shall mean the opposite direction. That is, as can be seen in FIG. 17, a bottom cap 940 of the motor coupling 915 is distal or in a distal direction DISMOT with respect to drive motor body 904, while the drive shaft 970 is proximal or in a proximal direction PRXMOT with respect to the bottom cap 940 of the motor coupling 915. Affixed to the motor drive shaft 970 is a cooling fan 913 having a plurality of radially extending fins 914 that rotate with the drive shaft 970 for air circulation/cooling purposes.

Also affixed to a distal end of the motor drive shaft 970 is the drive fitting 972. The structure and function of drive fitting 972 has been described previously. The drive fitting 972 includes the enlarged cylindrical body 980 extending distally (in the direction DISMOT—FIG. 25) from the cylindrical shaft 976. As can best be seen in FIGS. 14, 25 and 26, the cylindrical shaft 976 defines a keyed opening 978 which receives the drive motor shaft 970. The drive fitting 972 is secured to the drive motor shaft 970 by a pair of set screws 974. The cylindrical body 980 of the drive fitting 972 includes the distal planar surface 981. The plurality of vanes 982, radially spaced apart by the plurality of cavities 991, extend distally from the distal planar surface 981. Each of the plurality of vanes 982 includes the drive or engagement face 984, the back wall 986 and the radial outer surface 988, which corresponds to the radial outer surface 990 of the cylindrical body 980. The dimensions of the plurality of vanes 982 of the drive fitting 972 are approximately the same as the dimensions of the plurality of vanes 830 of the driven fitting 814 as the two fittings 814, 972 are configured to interfit, as shown schematically in FIG. 25. The planar distal surface 981 of the cylindrical body 980 of the drive fitting 972 also includes the locating member 992, which interfits with the locating member 822 of the driven fitting 814. In one exemplary embodiment, the locating member 992 of the drive fitting 972 comprises the tapered central opening 994 in the planar surface 981 which receives the tapered central projection 824 of the driven fitting 814 for axial alignment purposes, as explained previously.

As can best be seen in FIGS. 14-17, the drive motor coupling 915 includes a coupling housing 916 including a coupling upper housing 920, a coupling lower housing 930 and the bottom cap 940. In one exemplary embodiment, the upper housing 920, the lower housing 930 and the bottom cap 940 are separately fabricated of a durable plastic material and are secured together via a pair of shoulder screws 946. However, one of skill in the art would recognize that there are numerous ways to fabricate the coupling housing 916, other than utilizing three separate components.

The coupling upper housing 920 includes a cylindrical body 921 and a flange 922 extending from a proximal end of the cylindrical body 921. The flange 922 includes four bosses 923, one at each corner, extending in a proximal direction from the flange 922. Each of the four bosses 923 includes an axially extending threaded opening 924. The drive motor body 904 includes a drive motor body mounting flange 906 at a distal end of the drive motor body 904. The drive motor body mounting flange 906 includes four apertures 908 that are configured to axially align with the threaded openings 924 such that four screws 947 secure the coupling housing 916 to the drive motor body 904.

As is best seen in FIGS. 14A and 17, the coupling lower housing 930 includes an outer surface 931 and a distal or lower end 933 of the lower housing 930. The lower housing outer surface 931 includes a recess that receives the actuator 961 of the push button latch 960a of the latching mechanism 960. The lower housing distal end 933 includes a recess 934 which provides clearance for a sliding body portion 962 of the push button latch 960a of the latching mechanism 960. The coupling lower housing 930 includes an inner surface 935 that defines a generally cross shaped central opening 936. A planar side wall 937 defining part of the lower housing inner surface 935 is configured to provide clearance for a spring arm 948b of a flat spring 948. As will be explained below, the flat spring 948 is supported by the bottom cap 940 and functions to bias the push button latch 960a to an engagement position.

Figure 16:
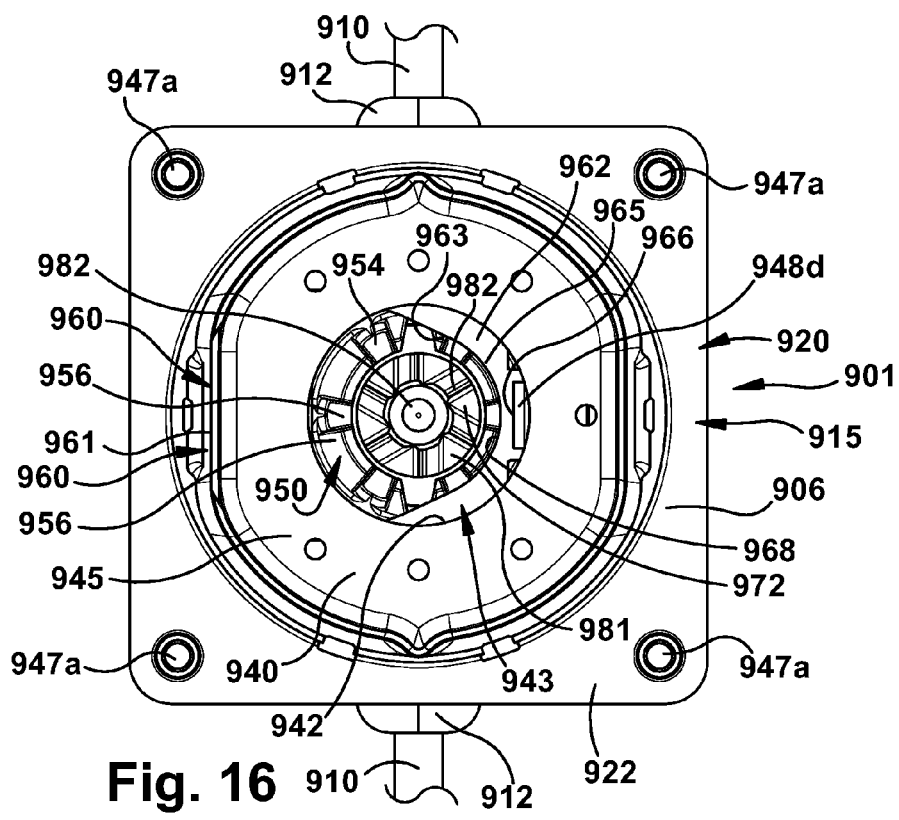
FIG. 16 is a schematic bottom elevation view of the drive motor assembly of the power operated tool assembly of FIG. 1, with the flexible shaft drive transmission removed.

As can best be seen in FIGS. 14A and 16, the coupling bottom cap 940 includes proximal or upper wall 944, a lower or distal wall 945, and an inner surface 942. The inner surface 942 defines a central opening 943. The bottom cap 940 includes a pair of threaded openings 941 that receive the two shoulder screws 946. The proximal wall 944 of the bottom cap 940 includes a planar recesses region 944a that provides clearance for an end 948c of the flat spring. As best seen in FIG. 17, the proximal wall recessed region 944a includes an axially extending opening 944b that receives and supports a stem 948a of the flat spring 948.

As can best be seen in FIGS. 14A, 16-18 and 26-28, the motor end coupling 915 include the tapered collar 950 and a wave spring 949, which functions to bias the tapered collar to a down or distal position (in the direction DISMOT with respect to the drive motor coupling 915). The motor end coupling 915 also includes the latching mechanism 960 and a flat spring 948, which biases the push button latch 960a to an engagement position, that is, a position wherein the push button latch 960a is contacting the proximal end wall 744 of the coupling body 720 to releasably secure the motor end coupling 714 to the drive motor coupling 915.

Figure 26:
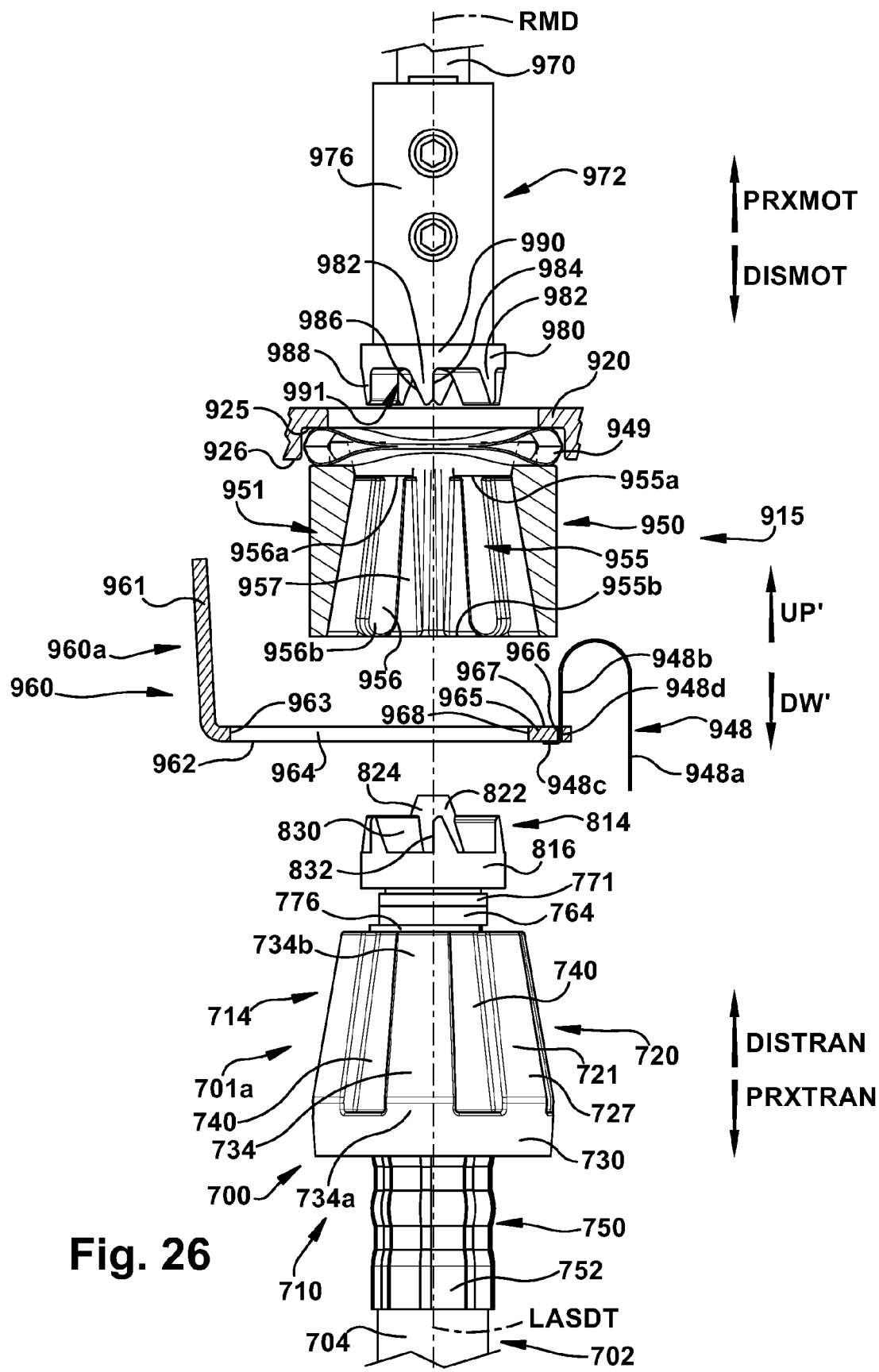
FIG. 26 is a schematic front elevation view of drive connection structure between a motor end portion of the shaft drive transmission and the drive motor assembly in an aligned, disengaged state.

The tapered collar 950 includes a central cylindrical body 951 and radially extending wings 952. Each of the wings 952 defines a vertically extending aperture 953 (FIG. 14A) and the central cylindrical body 951 includes an inner surface 954 that defines a tapered, generally frustoconical central opening 955. As can be seen in FIG. 26, the central opening 955 includes a proximal end 955a and a distal end 955b, the distal end 955b being larger in diameter than the proximal end 955a. The inner surface 954 of the tapered collar 950 includes the plurality of tapered raised ribs 956 and the plurality of tapered channels 957, as previously described, which engage and interfit, respectively, with the tapered channels 740 and tapered raised ribs 734 of the coupling body 720 of the motor end coupling 714. In one exemplary embodiment, as can be seen in FIG. 26, each of the ribs 956 (and also the channels 957) are tapered, that is, a distal end 956b of each of the tapered ribs 956 is wider in circumferential distance or arc than a proximal end 956a of the rib 956. Additionally, in one exemplary embodiment, each of the raised ribs 956 is of substantially uniform height above the respective adjacent channels 957 from the distal end 956b to the proximal end 956a of the rib 956. Further, in one exemplary embodiment, the taper angle of the frustoconical tapered collar or cone 732 of the coupling body 720 of the motor end coupling 714 is substantially equal to a taper angle (approximately 10° with respect to the drive motor shaft center line CLMDS) of the frustoconical central opening 955 of the tapered collar 950 of the motor coupling 915 to ensure a snug fit between the coupling body 720 and the tapered collar 950.

The tapered collar 950 is slidingly supported on the two shoulder screws 946 (FIG. 18) that extend through the axially extending apertures 953 of the wings 952 of the tapered collar 950. The shoulder screws 946 pass through openings 928 in a distal or lower wall 926 of the coupling upper housing 920 and thread into the threaded openings 941 of the coupling bottom cap 940 to secure the bottom cap 940, the coupling lower housing 930, and the tapered collar 950 to the upper housing 940. The tapered collar 950 is biased to the down or distal position by the wave spring 949. The wave spring 949 is seated between a stepped shoulder 925 formed in the proximal wall 926 of the coupling upper housing 920 and a stepped shoulder 959 of a proximal wall 958 of the tapered collar 950.

Figure 27:
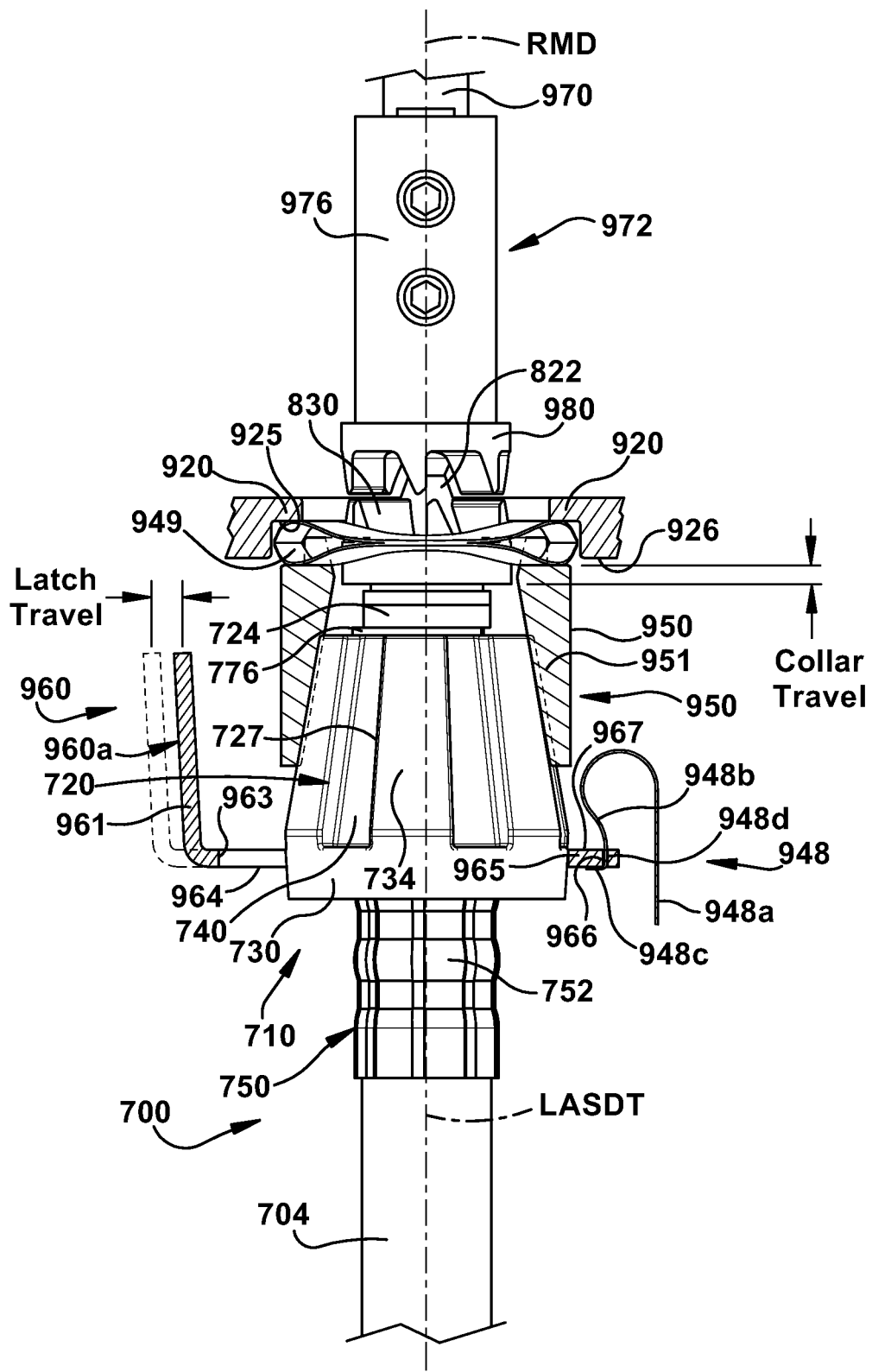
FIG. 27 is a schematic front elevation view of drive connection structure between a motor end portion of the shaft drive transmission and the drive motor assembly in a contact, disengaged state.

The latching mechanism 960 includes the push button latch 960a and the flat spring 948, which functions to bias the push button latch 960a to an engagement position (shown in FIGS. 26 and 28) and away from a deflected position (shown in FIG. 27). As can best be seen in FIGS. 14A, 16-17 and 26-28, the push button latch 960a includes the actuator 961 which, in its engagement position, is generally flush with the outer surface of the coupling lower housing 930. The actuator 961 may be pushed radially inwardly by the operator of the power operated knife 100 to move the push button latch 960a to its deflected position and thereby allow the disengagement of the motor end coupling 714 from the drive motor coupling 915. This may be accomplished by the operator using a single hand. The recess 932 defined in the outer surface 931 of the coupling lower housing 930 allows for radial inward movement of the push button latch 960a.

The push button latch 960a further includes the planar sliding body portion 962. The sliding body portion 962 slides in the recess 934 defined in the distal end 933 of the lower housing 930 and includes a central opening 964. As can best be seen in FIG. 16, in the engagement position, the central opening 964 of the latch 960a of the latching mechanism 960 is slightly offset from the central opening 943 defined by the coupling bottom cap 940. In this way, as the operator pushes the motor end coupling 714 upwardly into the central opening 943 of the bottom cap, the outer surface 721 of the coupling body 720 will contact an inner portion 968 (FIGS. 16 and 26) of a latching region 965 of the sliding body portion 962 of the latch 960a and push the sliding body portion 962 radially such that the latch 960a of the latching mechanism 960 is forced to its deflected position. As can best be seen in FIGS. 17 and 28, when the motor end coupling 714 is engaged with the drive motor coupling 915 and the latch 960a of the latching mechanism 960 is in the engagement position, a top portion 967 of the latching region 965 engages the proximal end wall 744 of the coupling body 720 of the motor end coupling 714 to secure the couplings 714, 915 in the engaged state.

The push button latch 960a of the latching mechanism 960 is biased to the engagement position by the flat spring 948. Specifically, an engagement region 948d of the flat spring 948 contacts and bears against a projection 966 of the latch 960a of the latching mechanism 960. The flat spring 948 has a generally U-shaped configuration and includes the stem portion 948a and the spring arm 948a. The flat spring 948 is secured in place with respect to the coupling housing 916 by the stem 948a which is received in the axial opening 944b of the coupling bottom cap 940 to secure the spring 948. The spring arm 948b of the flat spring 948 includes the end portion 948c which defines the engagement region 948d. As explained previously, the engagement region 948d contacts and bears against the projection 966 of the push button latch 960a to bias the latch 960a of the latch mechanism 960 to the engagement position.

Figure 28:
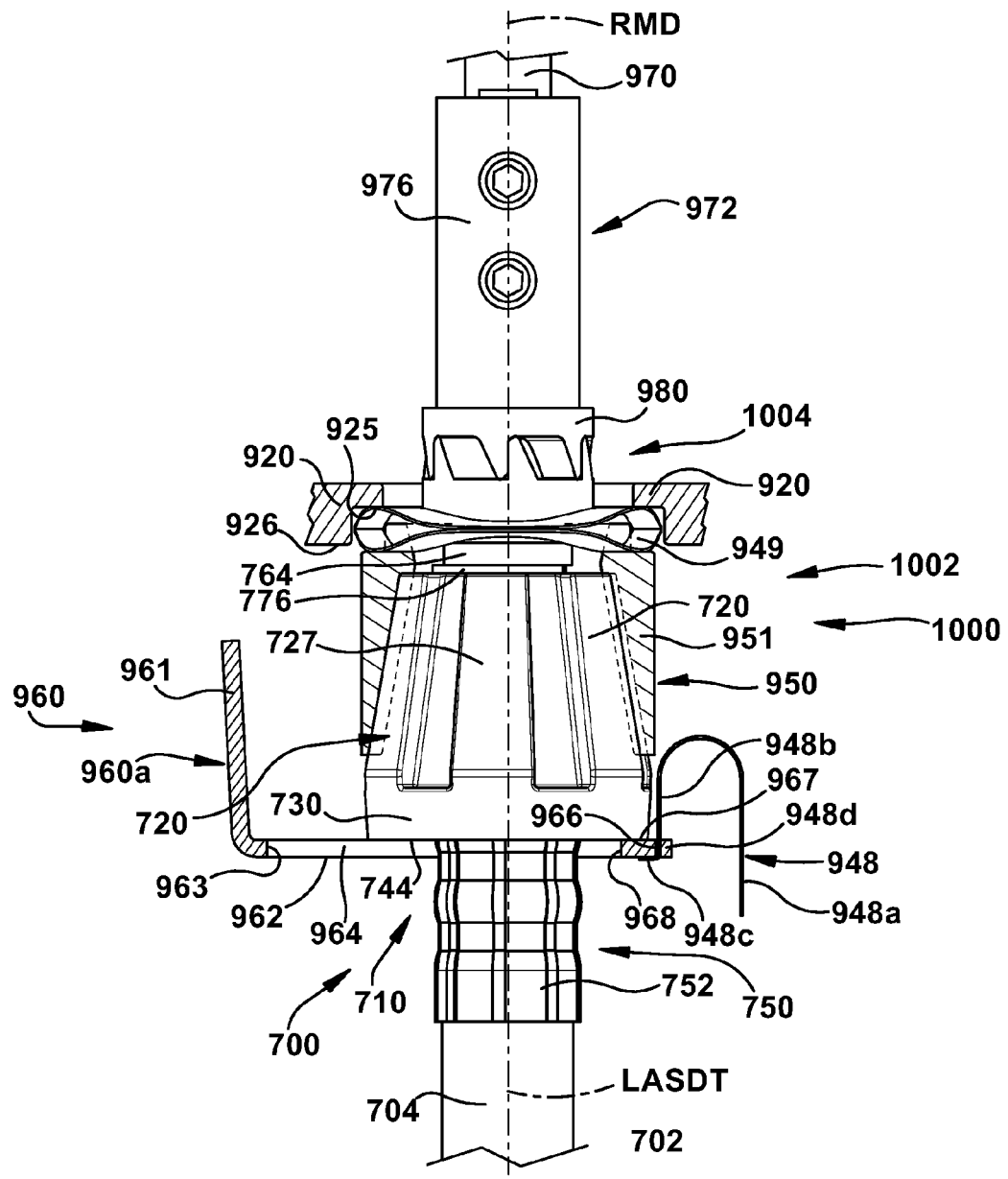
FIG. 28 is a schematic front elevation view of drive connection structure between a motor end portion of the shaft drive transmission and the drive motor assembly in an engaged state.

As best seen in FIGS. 26-28, the wave spring 949 biases the tapered collar 950 to the down position (FIGS. 26 and 28). However, when the operator of the power operated knife 100 seeks to engage the motor end coupling 714 of the flexible shaft drive transmission 700 with the motor drive coupling 915 of the motor drive assembly 900, he or she pushes upwardly (in the direction labeled UP' or DISTRAN in FIG. 26) with the coupling body 720 of the motor end coupling 714 against the tapered collar 950 of the drive motor coupling 915. Urging the coupling body 720 upwardly against the tapered collar 950 compresses the wave spring 949 and moves the tapered collar 950 upwardly with respect to the coupling housing 916. As the tapered collar 950 slides upwardly along the shoulder screws 946 and the coupling body 720 moves upwardly, the outer surface 721 of the coupling body 720 contacts the latching region 965 of the push button latch 960a of the latching mechanism 960 and slides the latch 960a radially from an engagement position (schematically shown in FIGS. 26 and 28) to a deflected position (schematically shown in FIG. 27). When the coupling body 720 has moved in the upward direction a sufficient distance (a distance schematically shown and labeled as COLLAR TRAVEL in FIG. 27), the proximal end wall 744 of the coupling body 720 clears the top portion 967 of the latching region 965 of the push button latch 960a allowing the latch 960a to snap back to its engagement position. As mentioned previously, the push button latch 960a of the latching mechanism 960 is biased to its engagement position (shown in FIGS. 26 and 28) by the flat spring 948. In the engagement position, the top portion 967 of the latching region 965 of the push button latch 960a abuts the proximal end wall 744 of the coupling body 720 to secure the motor end coupling 714 to the drive motor coupling 915.

Engagement Of Shaft Drive Transmission—Drive Motor Assembly

FIGS. 25-28 schematically illustrate the drive connection structure 1000, the drive engagement structure 1002 and the axial locating structure 1004 of the flexible shaft drive transmission 700 and the drive motor assembly 900 of the present disclosure and further schematically illustrate a method or process to proceed from a non-engaged state (where the motor end coupling 714 and the drive motor coupling 915 are not in the engaged state) to the engaged stated where the motor end coupling 714 of the shaft drive transmission 700 and the drive motor coupling 915 of the drive motor assembly 900 are coupled together such that the driven fitting 814 of the drive shaft assembly 800 is operatively engaged by the drive fitting 972 of the drive motor assembly 900. FIGS. 26 and 27 schematically shows the motor end coupling 714 of the shaft drive transmission 700 and the drive motor coupling 915 of the drive motor assembly 900 in a non-engaged state, while FIG. 28 schematically shows the motor end coupling 714 and the drive motor coupling 915 in the engaged state.

As shown in FIG. 26, assuming that the drive motor assembly 900 is in a fixed position, the operator of the power operated rotary knife 100 grasps and manipulates the motor end portion 701a of the shaft drive transmission 700 (grasping the outer casing 705 just below or proximal to the motor end coupling 710) with respect to the drive motor assembly 900 so as to axially align the tapered coupling body 720 of the motor end coupling 714 and the tapered collar 950 of the drive motor coupling 915 such that the driven fitting 814 of the drive shaft assembly 800 is aligned for entry into the central opening 943 of the bottom cap 940 of the motor end coupling 915 (and thereby aligned for entry into the central, frustoconical opening 955 defined by the interior surface 954 of the central cylindrical body 951 of the tapered collar 950).

As is seen in FIG. 27, after alignment, the motor end coupling 714 is moved in an upward direction UP' (or distal direction DISTRAN) with respect to the drive motor assembly 900. As explained previously, the outer surface 721 of the coupling body 720 contacts the inner portion 968 of the latching region 965 of the sliding body portion 962 of the push button latch 960a of the latching mechanism 960 and forces the latch 960a to move in a radial direction, orthogonal to the drive motor axis of rotation RMD, to its deflected position. A distance that the latch 960a moves radially before the engaged state is achieved is shown schematically as a distance labeled LATCH TRAVEL in FIG. 27. Also, as the motor end coupling 714 continues to be moved in the upward direction UP, the coupling body 720 contacts the tapered collar 950 forcing the collar 950 to slide upwardly along the shoulder screws 946 thereby depressing the wave spring 949. A distance that the tapered collar 950 moves upwardly before the proximal end wall 744 of the coupling body 720 clears the top portion 967 the latching region 965 of the push button latch 960a thereby allowing the latch 960a to returned to its engagement position by the flat spring 948 is shown schematically as a distance labeled COLLAR TRAVEL in FIG. 27. Depending upon the specific alignment of the ribs 734 and channels 740 of the coupling body 720 and the ribs 956 and channels 957 of the tapered collar 950 of the motor end coupling 915, as the motor end coupling 714 contacts the drive motor coupling 915 and causes the tapered collar 950 to slide upwardly, a slight rotation (60° or less) of the motor end coupling 714 may be required to facilitate proper alignment of the respective ribs and channels and accomplish full engagement of the coupling body 720 and the tapered collar 950.

The engagement position of the push button latch 960a is shown in dashed line in FIG. 27, while the deflected position of the latch 960a is shown in solid line. Comparing a relative compression of the flat spring 948 between FIGS. 27 and 26 & 28, also illustrates the radial movement of the push button latch 960a when moving between the engagement and deflected positions. When the upward movement of the tapered collar 950 is sufficient such that the inner portion 968 of the latching region 965 of the sliding body portion 962 clears the proximal end wall 744 of the coupling body 720, the sliding body portion 962 is biased or returned to its engagement position by the flat spring 948, as shown in FIG. 28.

The engaged state of the motor end coupling 714 and the drive motor coupling 915 is shown schematically in FIG. 28. As shown in FIG. 28, the top portion 967 of the latching region 965 of the sliding body portion 962 bears against the coupling body 720 and thereby secures the motor end coupling 714 to the drive motor coupling 915. In the engaged state of the couplings 714, 915, the driven fitting 814 of the drive shaft assembly 800 operatively engages the drive fitting 972 of the drive motor assembly 900.

When the motor end coupling 714 of the flexible shaft drive transmission 700 is in the engaged state with the drive motor coupling 915 of the drive motor assembly 900 and the drive motor 901 is actuated, the drive shaft assembly 800 is rotated by the drive fitting 972 of the drive motor assembly 900. The drive shaft assembly 800, in turn, is coupled to and rotates a gear train 604 of the power operated rotary knife 100. The gear train 604 of the power operated rotary knife 100 engages the set of gear teeth 328 of the driven gear 328 of the rotary knife blade 300 to rotate the knife blade 300 about the central axis of rotation R.

Advantageously, the wave washer or wave spring 949 facilitates engagement or coupling between the coupling body 720 of the motor end coupling 714 and tapered collar 950 of the drive motor coupling 915. The wave spring 949 permits the tapered collar 950 of the drive motor coupling 915 to move in the upward direction UP' (FIG. 26) a sufficient extent to provide clearance between the latching region 965 of the sliding body portion 962 of the push button latch 960a and the proximal end wall 744 of the coupling body 720 of the motor end coupling 714 such that the push button latch 960a can snap into its engagement position to couple the coupling body 720 of the motor end coupling 714 and the tapered collar 950 of the drive motor coupling 915. Further, after the engagement position of the push button latch 960a has been achieved and the coupling body 720 of the motor end coupling 714 is coupled to the tapered collar 950 of the drive motor coupling 915, the wave spring 949 continues to apply downward pressure (in the direction DW' in FIG. 26) to the tapered collar 950 and, thereby, forces the tapered collar 950 against the coupling body 720. Recall that the coupling body 720 is precluded from axial movement in the downward direction DW' by the engaged push button latch 960a. The snug fit between the tapered collar 950 and the coupling body 720 mitigates vibration when the drive motor 901 is actuated. Additionally, the snug fit facilitated by the wave spring 949 ensures a full and complete engagement between the driven fitting 814 of the drive shaft assembly 800 and the drive fitting 972 of the drive motor assembly 900. It is important to consistently maintain a constant distance between the top portion or surface 967 of the push button latch 960a and the planar surface 981 of the cylindrical body 980 of the drive fitting 972 for full and complete engagement between the driven fitting 814 and the drive fitting 972.

Should the operator of the power operated rotary knife 100 wish to remove the flexible shaft drive transmission 700 from the motor drive assembly 900, that is, go to the non-engaged state of the motor end coupling 714 and the drive motor coupling 915, he or she need only to depress the actuator 961 of the push button latch 960a of the latching mechanism 960. Assuming that the drive motor 901 is oriented generally vertically with the drive motor coupling 915 facing the ground, the motor end coupling 714 will simply fall away from the motor end coupling 915 toward the ground. Thus, both going from the non-engaged state to the engaged state and going from an engaged state to a non-engaged state requires the operator to use only a single hand. Thus, the drive connection structure 1000 of the present disclosure is properly termed a quick connect and quick disconnect connection structure.

Second Exemplary Embodiment—Flexible Shaft Drive Transmission

Figure 29:
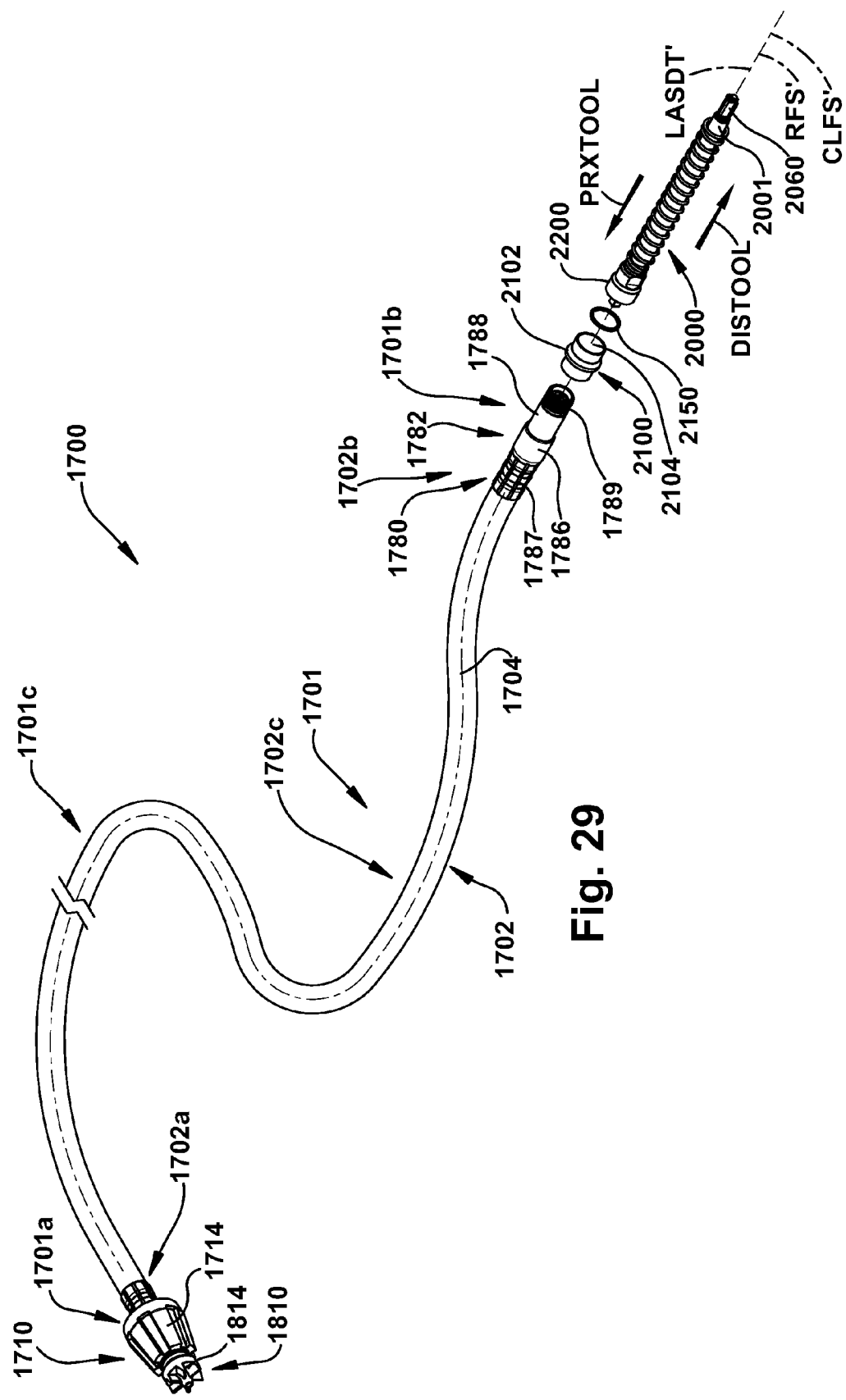
FIG. 29 is a schematic perspective view of a second exemplary embodiment of a flexible shaft drive transmission of the present disclosure.
Figure 30:
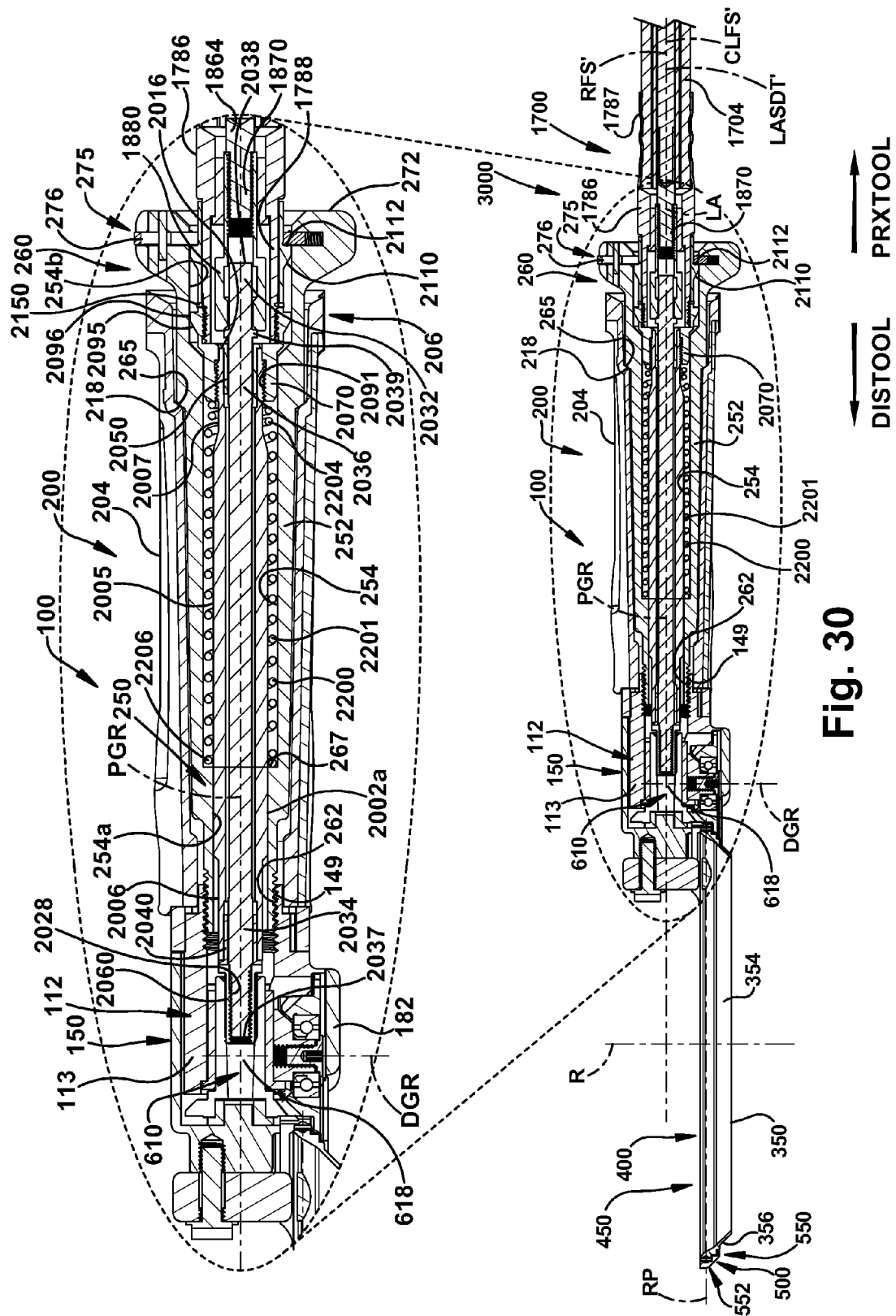
FIG. 30 is a schematic sectional view of a tool end portion of the drive shaft transmission of FIG. 29 in operative engagement or coupled to the handle assembly of the power operated rotary knife of FIG. 1.

A second exemplary embodiment of a flexible shaft drive transmission assembly of the present disclosure is shown generally 1700 in FIGS. 29-31. The flexible shaft drive transmission assembly 1700, like the flexible shaft drive transmission 700 previously described, is configured to transmit rotational power from the drive motor 901 to a power operated tool, such as the power operated rotary knife 100. The flexible shaft drive transmission assembly 1700 includes a flexible drive shaft transmission 1701 and a driver assembly 2000. The flexible drive shaft transmission 1701 includes a first or motor end portion 1701a, a second or tool end portion 1701b and an elongated, flexible central portion 1701c extending between the motor end portion 1701a and the tool end portion 1701b. A length of the flexible drive shaft transmission 1701 will depend upon the application, but may range in length from three to six feet or more. The driver assembly 2000 is releasably coupled to the tool end portion 1701b of the shaft drive transmission 1701, for example, by threaded engagement. The driver assembly 2000, which includes a main tube 2000 and a driver shaft assembly 2020a rotatably supported within the main tube 2000, is configured to releasably engage the handle assembly 110 of the power operated knife 100. When in an engaged state, the driver assembly 2000 is operatively coupled between the tool end portion 1701b of the shaft drive transmission 1701 and the handle assembly 110 of the power operated rotary knife 100 and the shaft drive transmission 1701 is operatively coupled to the drive motor coupling 915. The shaft drive transmission assembly 1700, including the shaft drive transmission 1701 and the driver assembly 2000, transmit rotational power from the drive motor 901 to the gear train 604 of the power operated rotary knife 100.

The shaft drive transmission 1701 includes an outer casing assembly 1702 and a drive shaft assembly 1800 rotatably supported within the outer casing assembly 1702. The outer casing assembly 1702 includes a drive motor end, a tool end, and a flexible central or middle portion 1702c, shown generally at 1702a, 1702b, 1702c, respectively. The outer casing assembly 1702 comprises a flexible, tubular outer casing 1704 (corresponding generally to the central portion 1702c) having an inner surface 1705 defining a throughbore 1706, a first or motor end coupling 1714 (corresponding generally to the drive motor end 1702a) affixed to a first or motor end 1710 of the outer casing 1704, and a second or driver assembly coupling 1782 (corresponding generally to the tool end 1702b) affixed to a distal or tool end 1780 of the outer casing 1704. The drive shaft assembly 1800 includes a flexible, elongated drive transmitting shaft or flex shaft 1802 and a driven fitting 1814 coupled to a first or motor end 1810 of the flex shaft 1802 and a coupler fitting 1880 coupled to a second or tool end 1860 of the flex shaft 1802.

The configuration of the motor end portion 1701a of the shaft drive transmission 1701, including the motor end coupling 1714 and the driven fitting 1814, are substantially identical in structure and function to the motor end portion 701a of the shaft drive transmission 700, previously described. Accordingly, the motor end portion 1701a of the shaft drive transmission 700 will not be discussed in detail, rather, reference is made to the prior description which is incorporated herein. With respect to the tool end portion 1701b of the shaft drive transmission 1701, as described hereinafter, the directions of distal and proximal, labeled as DISTOOL and PRXTOOL in FIGS. 29, 30 and 34, shall refer to the following: the distal direction DISTOOL shall be generally in a direction along the shaft drive transmission assembly 1700 away from the motor end portion 1701a of the shaft drive transmission 1701 and toward the power operated rotary knife 100 and the proximal direction PRXTOOL shall be generally in a direction along the shaft drive transmission assembly 1700 away from the power operated rotary knife 100 and toward the motor end portion 1701a of the shaft drive transmission 1701.

The shaft drive transmission assembly 1700 is part of a power operated tool assembly, like the power operated tool assembly 10, and provides a drive interface or drive connection structure, shown generally at 3000 in FIG. 30, for operatively coupling the flexible shaft drive transmission 1700 and the gear train of a power operated tool, such as the gear train 604 of the power operated rotary knife 100, for transmitting motive or rotational power from the drive motor 901 of the drive motor assembly 900 to the gear train 604 of the power operated rotary knife 100. The shaft drive transmission-power operated tool connection structure 3000 includes a rotational drive structure to transmit rotational power from the flex shaft 1802 of the flexible shaft drive transmission 1701 to the gear train 604 of the power operated rotary knife 100 and a physical connection or coupling structure to couple the flexible shaft drive transmission 1701 to the handle assembly 110 of the power operated rotary knife 100.

The rotational drive structure includes: a driver shaft assembly 2020a of the driver assembly 2000 including a driver shaft 2020, a driven fitting 2032 and a driver fitting 2060; and the drive shaft assembly 1800 of the shaft drive transmission 1701 including the coupler fitting 1880 and a flex shaft fitting 1864 coupled to the distal end 1810 of the flex shaft 1802, all of which are operatively connected to transmit rotational power from the flex shaft 1802 to the gear train 604 of the power operated rotary knife 100. The physical connection structure includes: the driver assembly coupling 1782 of the outer casing assembly 1702 of the shaft drive transmission 1701; a casing coupler 2070 and the main tube 2001 of the driver assembly 2000; and the drive shaft latching assembly 275 of the handle assembly 110 of the power operated rotary knife 100, all of which combine to provide the physical connection or coupling between the shaft drive transmission 1701 and the power operated rotary knife 100. When the driver assembly 2000 is operatively coupled between the driver assembly coupling 1782 of the shaft drive transmission 1700 and the handle assembly 110 of the power operated rotary knife 100 (engaged state), rotation of the flex shaft 1802 causes rotation of the gear train 604 of the power operated knife 100 which, in turn, causes rotation of the rotary knife blade 300 of the power operated rotary knife.

More specifically, the coupler fitting 1880 is coupled to a distal end of the flex shaft 1802. The coupler fitting 1880 is configured to have a drive fitting 1892 at its distal end. The drive fitting 1892 of the coupler fitting 1880 engages a driven fitting 2032 formed at a proximal end of the driver shaft 2020 of the driver assembly 2000. The driver fitting 2060 is coupled to a distal end of the driver shaft 2020. The driver fitting 2060 engages the input shaft 612 of the pinion gear 610, the pinion gear 610 being part of the gear train 604 of the power operated rotary knife 100, as previously described. Thus, rotation of the flex shaft 1802 causes rotation of the coupler fitting 1880, the driver shaft 2020, the pinion gear 610, the drive gear 650 and, ultimately, the rotary knife blade 300.

The driver assembly 2000 includes the main tube 2001, the casing coupler 2070 and a latch collar 2100. The main tube 2001 and casing coupler 2070 are configured to enter into the elongated central core 252 of the hand piece retaining assembly 250 of the power operated rotary knife 100 and be engaged by the drive shaft latching assembly 275. When the drive shaft latching assembly 275 engages the driver assembly 2000 (as shown in FIG. 30), the shaft drive transmission assembly 1700 is operatively engaged or is in the engaged state with respect to the power operated rotary knife 100, that is, the driver shaft 2020 of the driver assembly 2000 operatively engages the pinion gear 610 of the power operated rotary knife gear train 604 such that rotation of the drive motor 901 rotates the rotary knife blade 300 of the power operated rotary knife 100.

To enhance the expected operating life of the shaft drive transmission 1701, during fabrication of the shaft drive transmission 1701, a lubricant 2300 (shown schematically at 2300 in FIG. 33), such as lubricant grease, is injected into a gap or void V between a metal core 1804 comprising the drive transmitting shaft or flex shaft 1802 of the drive shaft assembly 1800 and the inner surface 1705 of the outer casing 1704 of the outer casing assembly 1702. Advantageously, the flexible drive shaft transmission 1701 of the present disclosure is designed and configured to be a sealed lubrication component. That is, after an initial injection or application of lubricant 2300 in the void V during fabrication of the shaft drive transmission 1701, there is no necessity to remove the flex shaft 1802 from the outer casing 1704 in order to inject or apply additional lubricant during the course of the expected operating life of the flexible shaft drive transmission 1701. This is a marked improvement and advantage over prior shaft drive transmissions wherein disassembly of the transmission and lubrication was required at periodic intervals of approximately every 20 operating hours. In one exemplary embodiment, as the expected operating life of the flexible shaft drive transmission 1701 is on the order of 1000 hours or more, approximately 50 or more disassembly and lubrication procedures would be avoided utilizing the shaft drive transmission 1701 of the present disclosure. Elimination of periodic lubrication provides a significant labor and cost savings over the expected operating life of the shaft drive transmission 1701, as well as reducing downtime inherent in disassembly and lubrication procedures.

The shaft drive transmission 1701 of the present disclosure is specifically configured to effectively be a sealed, non-serviceable unit. That is, an enlarged head section 1888 of the coupler fitting 1880, which defines a distal end of the drive shaft assembly 1800, is configured to have a larger diameter than a diameter of a throughbore 1796 of a sleeve bushing 1795 of the driver assembly coupling 1782 of the outer casing assembly. The enlarged head section 1888 of the coupler fitting 1888 thus effectively limits axial movement of the flex shaft 1802 with respect to the outer casing 1704 in the proximal direction PRXTOOL and thereby prevent removal of the flex shaft 1802 from the motor end 1710 of the outer casing 1704 (i.e., moving the flex shaft 1802 in the proximal direction PRXTOOL with respect to the outer casing 1704). Similarly, the driven fitting 1814 at the proximal end of the flex shaft 1802 is configured to have a diameter that is larger than a corresponding diameter of a central opening of the coupling body 1720 of the motor end coupling 1714 of the outer casing assembly 1702. The driven fitting 1814 of the drive shaft assembly 1860 thus effectively limits axial movement of the flex shaft 1802 with respect to the outer casing 1704 in the distal direction DISTOOL and thereby prevent removal of the flex shaft 1802 from the tool end 1780 of the outer casing 1704 (i.e., moving the flex shaft 1802 in the distal direction DISTOOL with respect to the outer casing 1704).

A cylindrical reduced diameter proximal section 1894 of the coupler fitting 1880 is rotatably, but snugly received within a cylindrical throughbore 1796 defined by the sleeve bushing 1795. That is, there is very close fit or engagement between the cylindrical reduced diameter proximal section 1894 of the coupler fitting 1880 and the cylindrical throughbore 1796 of the sleeve bushing 1795. Advantageously, the close fit between the cylindrical proximal section 1894 of the coupler fitting 1880 and an inner surface 1795*b* defining the cylindrical throughbore 1796 of the sleeve bushing 1795 effectively provides a seal between the rotating drive shaft assembly 1800 and the driver assembly coupling 1782 of the outer casing assembly 1702 to inhibit and mitigate leakage of the lubricant 2300 from the tool end portion 1701*b* of the shaft drive transmission 1701. When the power operated tool assembly 10 is in operation, typically, the drive motor 901 is mounted on a hanger positioned above the work area where the power operated rotary knife 100 is manipulated by an operator to trim or cut a product. Thus, the motor end portion 1701*a* of the flexible shaft drive transmission 1701 is typically at a higher vertical position than the tool end portion 1701*b* of the shaft drive transmission 1701. Because of the lower vertical position of the tool end portion 1701*b* of the shaft drive transmission 1701, gravity tends to cause the lubricant 2300 to migrate or drain toward the driver assembly coupling 1782. Thus, inhibiting leakage of the lubricant 2300 between the drive transmitting shaft 1802 and the driver assembly coupling 1782 of the outer casing assembly 1702 is of prime importance. Additionally, the close fit between the driven fitting 1814 of the drive shaft assembly 1800 and the motor end coupling 1714 of the outer casing assembly 1702 also mitigates leakage of lubricant 2300 from the motor end portion 1701*a* of the shaft drive transmission 1701.

Driver Assembly Coupling 1782 of Outer Casing Assembly 1702

Figure 33:
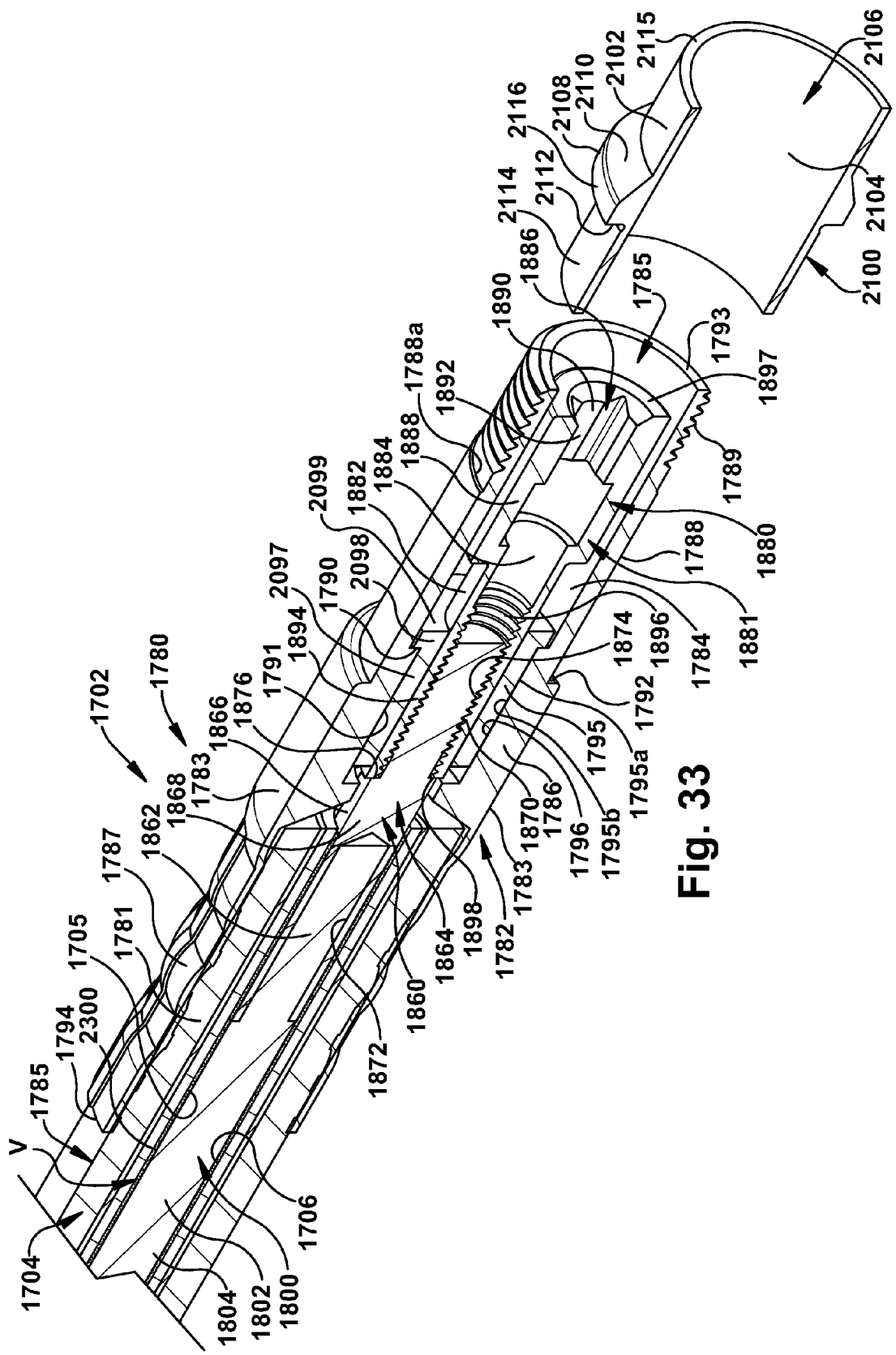
FIG. 33 is a schematic sectional view of a power operated rotary knife end of the shaft drive transmission of FIG. 29 showing a portion of an outer casing assembly and the drive shaft assembly of the shaft drive transmission, with a driver assembly removed.

As can best be seen in FIGS. 32 and 33, the driver assembly coupling 1782 of the outer casing assembly 1702 is affixed to the second end 1780 of the outer casing 1704. The driver assembly coupling 1782 includes an outer surface 1783 and an inner surface 1784. The inner surface 1784 defines a throughbore 1785 extending between and passing through a distal end wall 1793 and a proximal end wall 1794. The driver assembly coupling 1782 includes a central cylindrical body 1786 and stress relief proximal sleeve 1787 that overlies a distal portion 1781 of the outer casing 1704 to mitigate kinking of the second end 1780 of the outer casing 1704 as the operator manipulates the power operated rotary knife 100 during cutting or trimming operations.

In one exemplary embodiment, the driver assembly 2000 is releasably coupled to the driver assembly coupling 1782 by threaded engagement. Accordingly, as can best be seen in FIG. 32, the driver assembly coupling 1782 includes a reduced diameter distal section 1788, having at a threaded portion 1789 adjacent the distal end wall 1793. The threaded portion 1789 of the driver assembly coupling 1782 is threadedly engaged by a threaded proximal end 2092 of an enlarged proximal portion 2082 of an inner surface 2076 of the casing coupler 2070 to secure the driver assembly 2000 to the outer casing assembly 1702.

As can best be seen in FIG. 33, the diver assembly coupling 1782 locates and supports the sleeve bushing 1795. In one exemplary embodiment, a cylindrical body 1797 of the sleeve bushing 1795 is press fit into the throughbore 1785 of the driver assembly coupling 1782. Specifically, a section 1791 of the inner surface 1784 defining the throughbore 1785 defines a seating surface for the cylindrical body 1797 of the sleeve bushing 1795. A radially outwardly stepped shoulder 1792 defined between the central cylindrical body 1786 and the reduced diameter distal section 1788 receives and seats the enlarged distal head 2098 of the sleeve bushing 1795. When the drive assembly 2000 is coupled to the driver assembly coupling 1782, a thrust bearing washer 2150 (FIG. 32) is disposed adjacent a shoulder 1788*a* formed in the outer surface 1783 of the driver assembly coupling 1782 and is sandwiched between a distal end wall 2110 of the latch collar 2100 and a proximal end wall 2094 of the casing coupler 2070 of the driver assembly 2000.

Coupler Fitting 1880 and Flex Shaft Fitting 1864

The drive shaft assembly 1800 includes the previously discussed coupler fitting 1880. In one exemplary embodiment, the coupler fitting 1880 comprises a coupler screw 1881 that is coupled to the flex shaft 1802 via a threaded connection. It should be understood, that other connection structures between the flex shaft 1802 and the coupler fitting 1880 may be utilized, such as, without limitation, welding, brazing, soldering, use of one or more fasteners, press fit, crimping, adhesive attachment, etc., as would be understood by one of skill in the art. As is best seen in FIGS. 32 and 33, in one exemplary embodiment, a flex shaft fitting 1864 is interposed between a distal end section 1862 of the flex shaft 1802 and the coupler screw 1881 and functions to secure the coupler screw 1881 to the flex shaft 1802. Specifically, the flex shaft fitting 1864 includes an enlarged diameter proximal section 1868 and a reduced diameter distal section 1870. A cylindrical sleeve 1872 is defined by the proximal section 1868 of the flex shaft fitting 1864. The sleeve 1872 receives the distal end section 1862 of the flex shaft 1802 and, in one exemplary embodiment, the sleeve is crimped onto the flex shaft end section 1862 to affix the flex shaft fitting 1864 to the flex shaft 1802. An outer surface 1866 of the flex shaft fitting 1864 in the region of the reduced diameter distal section 1870 defines external threads 1874.

The external threads 1874 of the flex shaft fitting 1864 are sized to receive corresponding mating internal threads 1896 of the coupler screw 1880 to affix the coupler screw 1880 to the flex shaft fitting 1864 and thereby secure the coupler screw 1880 to the flex shaft 1880. Preferably, the mating threads 1874, 1896 of the flex shaft fitting 1864 and the coupler screw 1880 are left handed threads. The drive motor 901 rotates the flex shaft 1802 and the driver shaft 2020 in a counter-clockwise direction (labeled CCW in FIG. 35) as viewed from the motor end portion 1701*a* of the shaft drive transmission 1701. Advantageously, the left handed threaded engagement of the coupler screw 1881 and the flex shaft fitting 1864 insures that as the flex shaft 1802 rotates, any relative rotational movement between the flex shaft fitting 1864 and the coupler screw 1881 will tighten, rather than loosen, the engagement of the flex shaft fitting 1864 and the coupler screw 1881. The engagement between the flex shaft fitting 1864 and the coupler screw 1881 is limited by a radially outwardly extending shoulder 1876 in the outer surface 1866 of the flex shaft fitting 1864.

As can best be seen in FIGS. 37-39, the coupler screw 1881 comprises an enlarged distal section 1888 and the reduced diameter proximal section 1894 and includes an outer surface 1882 and an inner surface 1884. The inner surface 1884 defines a throughbore 1886 extending between and through a distal end wall 1897 and a proximal end wall 1898. As noted previously, when the driver assembly 2000 is coupled to the driver assembly coupling 1782 of the outer casing assembly 1702, the distal end wall 1897 of the coupler screw 1881 abuts the stepped shoulder 2084 of the inner surface 2076 of the casing coupler 2070 of the driver assembly 2000. The proximal end wall 1898 of the coupler screw 1881 abuts the stepped shoulder 1896 of the flex shaft fitting 1864.

In one exemplary embodiment, the inner surface 1884 of the coupler screw 1881 forming the throughbore 1886 in the region of the enlarged distal section 1888 defines a female off-round distal section 1890. The off-round distal section 1890 defines a female drive fitting 1892. The female drive fitting 1892 is configured to receive the mating driven fitting 2032 of the driver shaft 2020 of the driver assembly 2000. By way of example and without limitation, the cross sectional shape of the off-round distal section 1890 defining the fitting 1892 may be a square (as shown in FIGS. 38 and 39), a triangle, a pentagon or a more complex polygon shape such as splined or vaned configuration or a star-shaped (i.e., Torx™) configuration. Additionally, the drive fitting 1892 could be a male fitting and the corresponding driven fitting 2032 could be a female fitting, as would be understood by one of skill in the art, without impacting the functionality of the drive connection between the coupler screw 1881 and the driver shaft 2020.

In one exemplary embodiment, the flex shaft 1802 may be fabricated of multiple spiral wrapped windings of steel or steel alloy wire or other material or materials known to have comparable properties. The outer casing 1704 which comprises a flexible tube may be fabricated of one or more layers of a durable plastic or other material or materials know to have comparable properties or rubber composition or a plastic or rubber composition reinforced by one or more braided or spiral windings of steel or steel alloy wire between the layers. The driver assembly coupling 1782 and flex shaft fitting 1864 may be fabricated of steel, stainless steel, or steel alloy or other material or materials know to have comparable properties. The coupler screw 1880 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes.

Driver Assembly 2000

Figure 40:
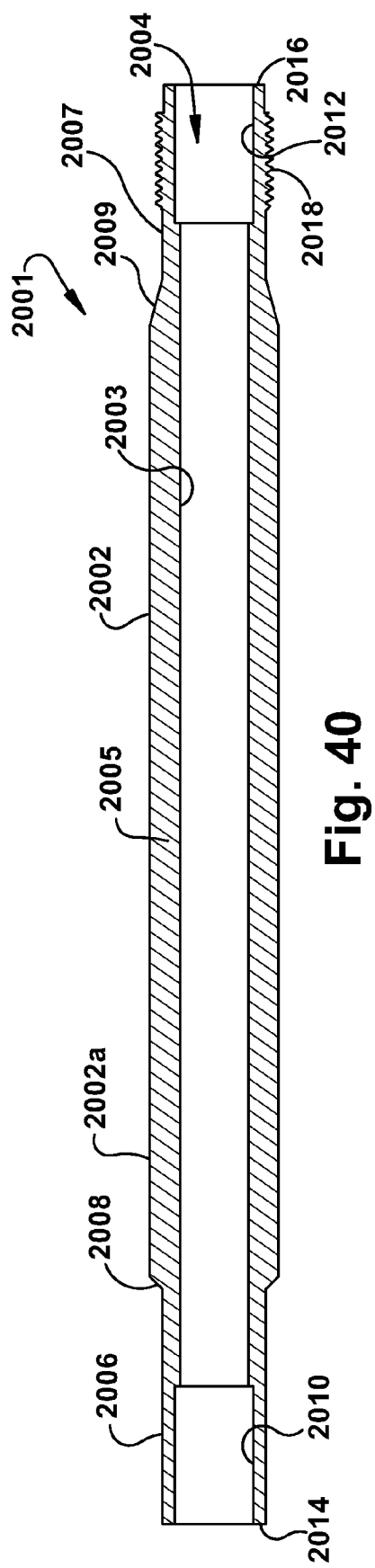
FIG. 40 is a schematic longitudinal section view of a main tube of the driver assembly of FIG. 34 of the shaft drive transmission of FIG. 29.
Figure 41:
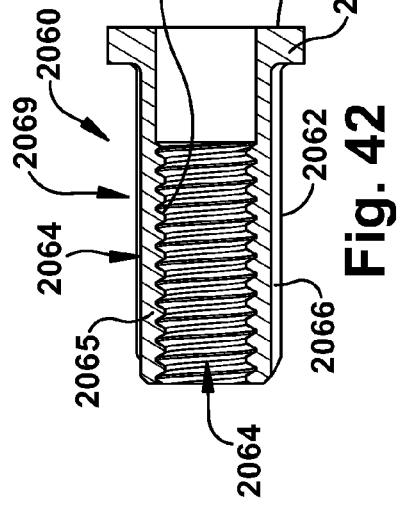
FIG. 41 is a schematic front elevation view of a driver fitting of the driver assembly of FIG. 34 the shaft drive transmission of FIG. 29.
Figure 42:
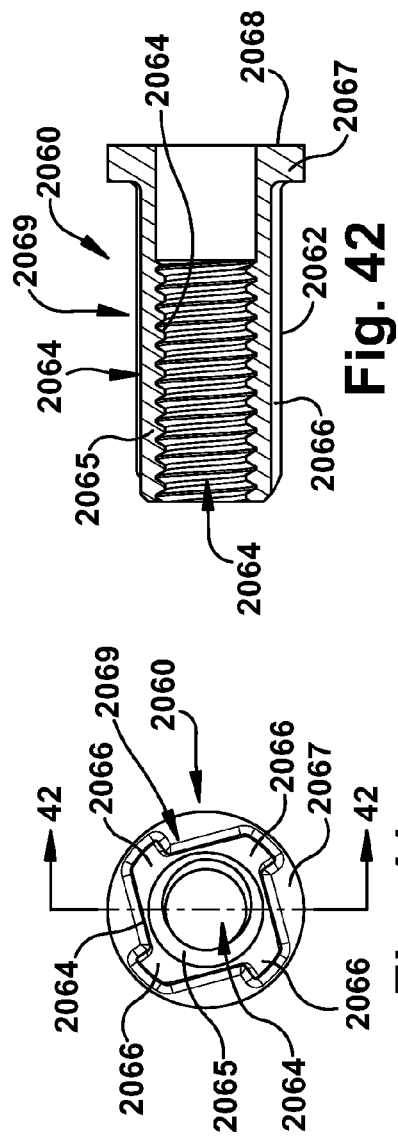
FIG. 42 is a schematic longitudinal section view of the driver fitting of FIG. 41, as seen from a plane indicated by the line 42-42 in FIG. 41.

When a flexible shaft drive transmission 1701 has reached the end of its useful operational life, because the shaft drive transmission 1701 is non-servicable, it is expected to be discarded. However, the driver assembly 2000 is expected to have an operational life substantially longer than the flexible drive transmission 1701. Thus, the driver assembly 2000 is designed and configured to be removed from an exhausted flexible shaft drive transmission 1701 and reattached to a new shaft drive transmission 1701. As can best be seen in FIGS. 34-36 and 40-45, the driver assembly 2000 comprises the driver shaft 2020 and the driver fitting 2060 which function as the rotational drive connection between the flex shaft 1802 of the shaft drive transmission 1701 and the gear train 604 of the power operated rotary knife 100 and the main tube 2001, the casing coupler 2070 and a biasing spring 2200 which function to provide a releasable physical coupling between the tool end portion 1701*b* and the handle assembly 110 of the power operated rotary knife 100. The main tube 2001 (FIG. 40) comprises an enlarged diameter central section 2005, a reduced diameter distal section 2006 and a reduced diameter proximal section 2007 and includes an outer surface 2002 and an inner surface 2003. The inner surface 2003 of the main tube 2001 defines a throughbore 2004 that extends between and through a distal end wall 2014 and a proximal end wall 2016 of the tube 2001.

As can best be seen in FIG. 30, when the driver assembly 2000 is coupled to the handle assembly 110 of the power operated rotary knife 100, the main tube 2001 extends into the elongated central core 252 of the hand piece retaining assembly 250. The outer surface 2002 of the main tube 2001 includes a radially outwardly extending shoulder 2008 that bridges the enlarged diameter central section 2005 and the reduced diameter distal section 2006. The outer surface 2002 of the main tube 2001 also includes a tapered outwardly extending shoulder 2009 that bridges the enlarged diameter central section 2005 and the reduced diameter proximal section 2007. The shoulder 2009 functions to constrain a proximal end section 2204 of the biasing spring 2200 from moving axially in the distal direction DISTOOL. A distal end wall 2098 of the casing coupler 2070 functions to constrain the proximal end section 2204 of the biasing spring 2200 from moving axially in the proximal direction PRXTOOL.

Driver Shaft 2020

Figure 35:
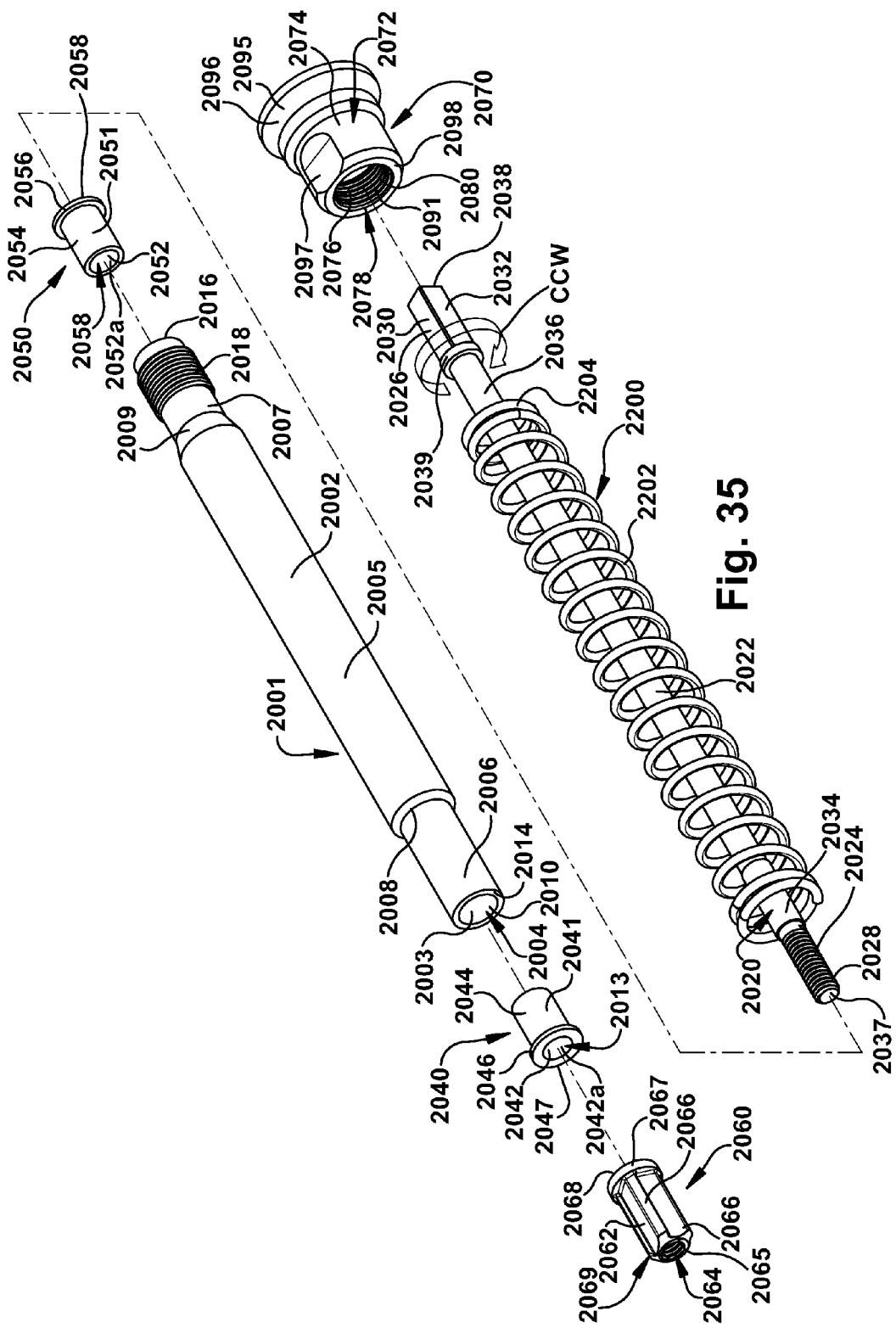
FIG. 35 is a schematic exploded perspective view of the driver assembly of FIG. 34.

As is best seen in FIGS. 34 and 35, the driver shaft assembly 2020a includes the driver shaft 2020 and the driver fitting 2060. The driver shaft assembly 2020a is supported for rotation within the main tube by a first, distal sleeve bushing 2040 and a second, proximal sleeve bushing 2050. The first and second sleeve bushings 2040, 2050 each include an outer surface 2041, 2051, respectively, and an inner surface 2042, 2052, respectively. The respective inner surfaces 2042, 2052 of the distal and proximal sleeve bushings 2040, 2050 define axially aligned cylindrical throughbores 2043, 2053, that is, when the driver assembly 2000 is coupled to the handle assembly 110 of the power operated rotary knife 100, the throughbores 2043, 2053 are axially aligned with respect to the longitudinal axis LA of the power operated rotary knife 100 and are also axially aligned with a central longitudinal axis LASDT' (FIG. 29) of the shaft drive transmission 1701, a centerline CLFS' through the flex shaft 1802 and a central axis of rotation RFS' of the flex shaft 1802. The inner surfaces 2042, 2052 of the distal and proximal sleeve bushings 2040, 2050 define a pair of axially spaced apart, cylindrical bearing support surfaces 2042a, 2052a that rotatably support the driver shaft 2020.

Advantageously, the distal and proximal sleeve bushings 2040 are affixed to respective opposite walls 2014, 2016 of the main tube 2001. In this way, an axial spacing between the respective cylindrical bearing support surfaces 2042a, 2052a provided by the sleeve bushings 2040, 2050 for the rotating driver shaft 2020 are a maximum length possible, given the axial length of the main tube 2001. That is, given the axial length of the main tube 2001 along the central longitudinal axis LASDT', positioning the distal and proximal sleeve bushings 2040, 2050 at opposite ends 2014, 2016 of the main tube 2001 insures that as great an axial distance as possible separates the cylindrical bearing support surfaces 2042a, 2052a. Axially spacing the cylindrical bearing support surfaces 2042a, 2052a within the main tube 2001 advantageously maintains the driver shaft 2020 straight and concentric with the central longitudinal axis LASDT' of the shaft drive transmission 1701 and the central axis of rotation RFS' of the flex shaft 1802, as possible given manufacturing variations.

The distal and proximal sleeve bushings 2040, 2050 each include a cylindrical body 2044, 2054 and an enlarged head 2046, 2056. In one exemplary embodiment, the respective cylindrical bodies 2044, 2054 are press fit into the throughbore 2004. The cylindrical body 2044 of the distal sleeve bushing 2040 is press fit into the reduced diameter distal section 2006 of the main tube 2001 such that the enlarged head 2046 abuts the distal end wall 2014, while the cylindrical body 2054 of the proximal sleeve bushing 2050 is press fit into the reduced diameter proximal section 2007 of the main tube 2001 such that the enlarged head 2056 abuts the proximal end wall 2016.

The driver shaft 2020 (FIG. 35) includes a central region or portion 2022 surrounded by a reduced diameter distal portion 2024 and an enlarged diameter proximal portion 2026. The reduced diameter distal portion 2024 includes a threaded section 2028, while the enlarged diameter proximal portion 2026 includes an off-round proximal end section 2030. The off-round proximal end section 2030 defines a driven fitting 2032, that in one exemplary embodiment, is square in cross section to matingly engage the square cross section drive fitting 1892 of the coupler screw 1880. The driver shaft 2020 includes a proximal end wall 2038 at one end and a distal end wall 2037 at the opposite end. The threaded section 2028 of the driver shaft 2020, adjacent the distal end wall 2037, is received in a mating internal threaded opening 2064 of the driver fitting 2060. The threaded connection between the threaded section 2028 of the driver shaft 2020 and the threaded opening 2064 of the driver fitting 2060 is preferably is a left handed threaded connection for the reasons let forth previously with respect to the threaded connection between the external threads 1874 of the flex shaft fitting 1864 and the internal threaded section 1896 of the coupler screw 1880.

The driver shaft 2020 includes a pair of axially spaced apart slightly enlarged diameter regions 2034, 2036 disposed at opposite ends of the central region 2022. The enlarged diameter regions 2034, 2036 are seated respectively in the cylindrical bearing support surfaces 2042a, 2052a of the distal and proximal sleeve bushings 2040, 2050. A distal end wall 2047 defined by the enlarged head 2046 of the distal sleeve bushing 2040 functions as a bearing surface for the rotating driver fitting 2060. Specifically, as can be seen in FIG. 36, a proximal end wall 2068 defined by an enlarged head 2067 of the distal sleeve bushing 2040 abuts the distal end wall 2047 of the driver fitting 2060 to limit or constrain movement of the driver shaft 2020 with respect to the main tube 2001 in the rearward or proximal direction PRXTOOL. Similarly, a distal end wall 2058 defined by the enlarged head 2056 of the proximal sleeve bushing 2050 functions as a bearing surface for the rotating driver fitting 2060. Specifically, the enlarged diameter proximal portion 2026 of the driver shaft 2020 includes a cylindrical stop 2039. The cylindrical stop 2039 (FIG. 36) of the proximal portion 2026 of the driver shaft 2020 abuts a proximal end wall 2058 of the enlarged head 2056 of the proximal sleeve bushing 2050 to limit or constrain movement of the driver shaft 2020 with respect to the main tube 2001 in the forward or distal direction DISTOOL.

Driver Fitting 2060

The driver fitting 2060 comprises a distal drive body 2064 and an enlarged proximal head 2067 and includes an outer surface 2062. The drive body 2067 defines a drive fitting 2069 that is sized and configured to be received in the input shaft 612 of the pinion gear 610 of the gear train 602 of the power operated rotary knife 100 and, when rotated, to rotate the pinion gear 610. When the driver assembly 2000 is in the engaged state with respect to the handle assembly 110 of the power operated rotary knife 100, the drive fitting 2069 engages the female socket of fitting 622 defined by the pinion gear input shaft 612 such that rotation of the driver shaft 2020 rotates the pinion gear 610 and the drive gear 650 of the gear train 602 thereby causing rotation of the rotary knife blade 300 of the power operated rotary knife 100. The drive body 2064 includes a cylindrical base 2065 and four angled vanes 2066 extending outwardly from the cylindrical base 2065. The configuration of the drive body 2064 is determined by the configuration of the female socket 622 of the pinion gear 610.

As previously mentioned, the internal left handed threaded opening 2064 which passes through the driver fitting 2060 receives the threaded distal end 2028 of the driver shaft 2020. Additionally, the proximal end wall 2068 of the enlarged proximal head 2067 of the driver fitting 2000 abuts the distal end wall 2047 of the enlarged head 2046 of the distal sleeve bushing 2040 to limit movement of the driver shaft 2020 with respect to the main tube 2001 in the rearward or proximal direction PRXTOOL.

Casing Coupler 2070

The casing coupler 2070, best seen in FIGS. 43-45, comprises a cylindrical body 2072 including an outer surface 2074 and the inner surface 2076. A throughbore 2078 is defined by the inner surface 2076 and includes a reduced diameter distal portion 2080 of the throughbore 2078 and the enlarged diameter proximal section 2082 of the throughbore 2078. The outer surface 2074 of the casing coupler 2070 includes a reduced diameter distal section 2084 and a reduced diameter proximal section 2085 on either side of an enlarged diameter central section 2088. The function of the casing coupler 2070 is to releasably connect the driver assembly coupling 1782 of the outer casing assembly 1702 to the main tube 2001. As such, in one exemplary embodiment, the casing coupling 2070 includes two threaded regions to accomplish the connection structure via a pair of threaded engagements. First, the reduced diameter distal portion 2080 of the throughbore 2078 includes an internal threaded distal end 2091. The threaded distal end 2091 is configured to thread onto the threaded distal end 1789 of the driver assembly coupling 1782. Second, the enlarged diameter proximal portion 2082 of the throughbore 2078 includes an internal threaded proximal end 2092. The threaded proximal end 2092 is configured to thread onto the threaded outer surface 2018 of the proximal section 2007 of the main tube 2001. When both threaded engagements are accomplished, the driver assembly 2000 is secured to the driver assembly coupling 1782 of the shaft drive transmission 1701 and the driver assembly driver shaft 2020 and driver fitting 2060 are operatively coupled to the pinion gear 610 of the power operated rotary knife 100 and the flex shaft 1802 of the shaft drive transmission 1701.

The enlarged diameter central section 2088 of the outer surface 2074 of the casing coupler includes a generally cone-shaped outwardly extending section 2095. The cone-shaped section 2095 includes an outer cylindrical rim 2096. The reduced diameter distal section 2084 of the outer surface 2074 of the cylindrical body 2072 of the casing coupler 2070 includes an opposing pair of flats 2097. The pair of flats 2097 facilitate threading and unthreading of the casing coupler 2070 using an end wrench (not shown).

Latch Collar 2100

As can best be seen in FIG. 33, the latch collar 2100 includes an outer surface 2102 and an inner surface 2104. The inner surface 2104 defines a cylindrical throughbore 2106 sized to slide onto the reduced diameter distal section 1788 of the driver assembly coupling 1782. A central section 2108 of the latch collar 2110 includes an outwardly extending cone-shaped surface 2110. A stepped shoulder 2112 is formed between the outwardly extending cone-shaped surface 2110 and a reduced diameter proximal section 2114 of the spacer ring 2100. The cone-shaped surface 2110 includes an outer cylindrical rim 2116. As can be best be seen in FIG. 30, the stepped shoulder 2112 functions as a radial securement groove. The stepped shoulder 2112 is engaged by the latch 276 of the drive shaft latching assembly 275 of the power operated rotary knife 100 to secure the driver assembly 2000 and the flexible shaft drive transmission 1701 with respect to the handle assembly 110, as is shown in FIG. 30, that is, the flexible shaft drive transmission assembly 1700 is in the engaged state with respect to the handle assembly 110 of the power operated rotary knife 100.

Biasing Spring 2200

The coiled spring 2200 comprises a coiled body 2202 including a plurality of spiraled coils and a proximal end section 2204 with reduced diameter coils. The proximal end section 2204 of the coiled spring 2200 is disposed around the reduced diameter proximal section 2007 of the main tube 2001. The coiled spring 2200 is constrained from axial movement in the distal direction DISTOOL with respect to the main tube 2011 by the tapered outwardly extending shoulder 2008 of the main tube 2011 and is constrained from axial movement in the proximal direction PRXTOOL with respect to the main tube 2011 by the distal end wall 2098 of the cylindrical body 2072 of the casing coupler 2070.

When the driver assembly 2000 is in the engaged state with respect to the handle assembly 110 of the power operated rotary knife 100, a distal section 2206 (FIG. 36) of the coiled body 2202 of the biasing spring 2200 bears against an inwardly stepped shoulder 267 (FIG. 30) of the inner surface 254 of the elongated central core 252 of the hand piece retaining assembly 250 and functions to bias the driver assembly 2000 in the proximal direction PRXTOOL with respect to the handle assembly 110 of the power operated rotary knife 100. The biasing spring 2200 performs at least two functions when the driver assembly is in the engaged state: a) The biasing spring 2200 moves the driver assembly 2000 away from the handle assembly 110 to a disengaged state whenever the latch 276 of the drive shaft latching assembly 275 is depressed to move the latch 276 away from engagement with the stepped shoulder 2112 of the latch collar 2100. b) When the driver assembly 2000 is in the engaged or coupled state with respect to the handle assembly 110, the biasing spring 2200 is in a compressed state (FIG. 30). As such, the biasing spring 2200 biases or forces the main tube 2001, the casing coupler 2070 and the outer casing assembly 1702 in the proximal direction PRXTOOL. This biasing force necessarily taking up the small amount of axial slack existing between the tool drive members (driver shaft 2020, coupler screw 1880 and flex shaft 1802) and the physical coupling members (main tube 2001, casing coupler 2070, driver assembly coupling 1782 and outer casing 1704). Taking up the slack between the tool drive members and the physical coupling members forces the tool drive members to move relative to the physical coupling members in the distal direction DISTOOL. This advantageously results in the driver fitting 2060 moving in the distal direction DISTOOL to a full engagement position within the input shaft 612 of the pinion gear 610.

The axial slack between the drive members and the physical coupling members of the flexible shaft drive transmission assembly 1700 necessarily exists because of manufacturing tolerances, that is, in a shaft drive transmission 1701 that may be eight feet in axial length, it is essentially impossible because of manufacturing tolerances to match the total axial length of the tool drive members and the total axial length of the physical coupling members. Thus, some slack is built into the axial lengths such that the drive members have some limited axial movement or slack with respect to the corresponding physical coupling members. The proximal directed force of the biasing spring 2200 advantageously and effectively functions to take up this slack and insure a complete and full engagement of the driver fitting 2060 within the pinion gear input shaft 610.

When the driver assembly 2000 is not engaged to the handle assembly 110 of the power operated rotary knife 100, the latch collar has limited axial sliding movement on the distal section 1788 of the driver assembly coupling 1782 between the washer 2150 and the outwardly stepped shoulder 1792 of the driver assembly coupling 1782. However, when the driver assembly 2000 is in the engaged state, the latch collar 2100 is prevented from moving axially in the proximal direction PRXTOOL by the latch 276 of the drive shaft latching assembly 275 of the power operated rotary knife 100 to secure the driver assembly 2000 and the flexible shaft drive transmission 1701 with respect to the handle assembly 110. As described above, when the driver assembly 2000 is in the engaged state, the biasing spring functions to force the main tube 2001, the casing coupler 2070 and the outer casing assembly 1702 in the proximal direction PRXTOOL. This causes the latch collar 2100 to slide on the distal section 1788 of the drive assembly coupling 1782 in the distal direction DISTOOL and bear against the thrust bearing washer 2150. Specifically, a front wall 2115 (FIG. 33) of the latch collar 2100 bears against the thrust bearing washer 2150 when the driver assembly 2000 is in the engaged state.

The driver assembly 2000 is constrained or held in place radially within the elongated central core 252 of the handle assembly 100 by: a) a snug fit between a portion 2002a of the outer surface 2002 in the central section 2005 of the main tube 2001 and a necked down section 254a of the inner surface 254 of the elongated central core 252; b) a close fit between the outer rim 2096 of the cone-shaped outwardly extending section 2095 of the casing coupler 2070 and an enlarged proximal portion 254b of the inner surface 254 of the elongated central core 252; and c) a close fit between the outer rim 2116 of the cone-shaped outwardly extending surface 2110 of the latch collar 2100 and the enlarged proximal portion 254b of the inner surface 254 of the elongated central core 252.

The driver assembly 2000 is constrained or held in place axially by bearing between the latch collar 2100 against the latch 276 of the drive shaft latching assembly 275 and, more specifically, the bearing of the shoulder 2112 of the latch collar 2100 against the latch 276 to restrain movement of the driver assembly 2000 in the proximal direction PRXTOOL and the biasing of the coiled spring 2200 against the distal end wall 2098 of the casing coupler 2070 to restrain movement of the driver assembly in the distal direction DISTOOL. In FIG. 30, the biasing spring 2200 is shown in a compressed condition, abutting the inwardly stepped shoulder 267 of the elongated central core 252.

In one exemplary embodiment, the driver shaft 2020 may be fabricated of a sold piece of steel or stainless steel or other material or materials known to have comparable properties. The main tube 2001, the casing coupler 2070, biasing spring 2200 and the latch collar 2100 are preferably fabricated of steel, a steel alloy or stainless steel or other material or materials known to have comparable properties. The distal and proximal sleeve bushings 2040, 2050 are preferably fabricated of bronze or brass or other material or materials known to have comparable properties. The driver fitting 2060 is preferably fabricated of steel, a steel alloy or stainless steel or other material or materials known to have comparable properties.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A driver assembly detachably coupled between a flexible shaft drive transmission having an outer casing and an elongated drive transmitting shaft rotatable within the outer casing and a handle assembly of a power operated tool to provide rotational power from a coupler fitting of the drive transmitting shaft and a drive train of the power operated tool, the driver assembly comprising:

a) a tube assembly comprising a main tube defining first and second ends and a throughbore, the first end of the main tube defining a distal end wall of the main tube and the second end of the main tube defining a proximal end wall of the main tube, and first and second bushings disposed within the throughbore at the respective first and second ends of the main tube and a casing coupler secured to and extending beyond the proximal end wall of the second end of the main tube, the casing coupler configured to releasably attach the driver assembly to the outer casing; and b) an elongated shaft supported for rotation by the first and second bushings of the tube assembly, a first end portion of the shaft rotatably supported in the first bushing and a second end portion of the shaft rotatably supported in the second bushing, the first end portion of the elongated shaft including a driver fitting extending axially beyond the distal end wall of the first end of the main tube, the first bushing contacting the first end of the main tube and extending beyond the distal end wall of the first end of the main tube and defining a first bushing distal end wall to constrain axial movement of the elongated shaft with respect to the tube assembly in a first direction, the second end portion of the elongated shaft including a driven fitting extending axially beyond the proximal end wall of the second end of the main tube, the second bushing contacting the second end of the main tube and extending beyond the proximal end wall of the second end of the main tube and including a second bushing proximal end wall to constrain axial movement of the elongated shaft with respect to the tube assembly in a direction opposite of the first direction.

2. The driver assembly of claim 1 wherein an enlarged end of the first bushing extends axially beyond the distal end wall of the first end of the main tube and an enlarged end of the second bushing extends axially beyond the proximal end wall of the second end of the main tube.

3. The driver assembly of claim 2 wherein the enlarged end of the first bushing defines the first bushing distal end wall of the first bushing.

4. The driver assembly of claim 2 wherein the enlarged end of the second bushing defines the second bushing proximal end wall of the second bushing.

5. The driver assembly of claim 1 wherein the driver fitting of the elongated shaft includes an enlarged head which abuts the first bushing distal end wall to constrain axial movement of the elongated shaft with respect to the tube assembly in the first direction.

6. The driver assembly of claim 1 wherein the second end portion of the elongated shaft includes a stop which abuts the second bushing proximal end wall to constrain axial movement of the elongated shaft with respect to the tube assembly in the direction opposite the first direction.

7. The driver assembly of claim 1 wherein the first end portion of the elongated shaft supported in the first bushing has an enlarged diameter with respect to a central portion of the elongated shaft.

8. The driver assembly of claim 1 wherein the second end portion of the elongated shaft supported in the second bushing has an enlarged diameter with respect to a central portion of the elongated shaft.

9. The driver assembly of claim 1 wherein the driver fitting is attached to the elongated shaft by a threaded connection.

10. The driver assembly of claim 1 wherein the casing coupler of tube assembly is attached to the main tube by a threaded connection.

11. The driver assembly of claim 1 wherein the main tube is rigid.

12. The driver assembly of claim 1 wherein the first bushing distal end wall of the first bushing is axially spaced from the distal end wall of the first end of the main tube and the second bushing proximal end wall of the second bushing is axially spaced from the proximal end wall of the second end of the main tube.

13. A driver assembly detachably coupled between a flexible shaft drive transmission having an outer casing and an elongated drive transmitting shaft rotatable within the outer casing and a power operated tool, the driver assembly comprising:
  a) a tube assembly comprising a main tube defining first and second ends and a throughbore, the first end of the main tube defining a distal end wall of the main tube and the second end of the main tube defining a proximal end wall of the main tube, and first and second bushings disposed within the throughbore at the respective first and second ends of the main tube; and
  b) an elongated shaft supported for rotation by the first and second bushings of the tube assembly, a first end portion of the shaft rotatably supported in the first bushing and a second end portion of the shaft rotatably supported in the second bushing, the first end portion of the elongated shaft including a driver fitting extending axially beyond the distal end wall of the first end of the main tube, the first bushing contacting the first end of the main tube and extending beyond the distal end wall of the first end of the main tube and defining a first bushing distal end wall to constrain axial movement of the elongated shaft with respect to the tube assembly in a first direction, the second end portion of the elongated shaft including a driven fitting extending axially beyond the proximal end wall of the second end of the main tube, the second bushing contacting the second end of the main tube and extending beyond the proximal end wall of the second end of the main tube and including a second bushing proximal end wall to constrain axial movement of the elongated shaft with respect to the tube assembly in a direction opposite of the first direction.

14. The driver assembly of claim 13 further including a casing coupler configured to releasably attach the driver assembly to the outer casing of the flexible shaft drive transmission, the casing coupler is secured to and extends beyond the proximal end wall of the second end of the main tube.

15. The driver assembly of claim 13 wherein an enlarged end of the first bushing extends axially beyond the distal end wall of the first end of the main tube, the enlarged end of the first bushing defining the first bushing distal end wall of the first bushing.

16. The driver assembly of claim 13 wherein an enlarged end of the second bushing extends axially beyond the proximal end wall of the second end of the main tube, the enlarged end of the second bushing defining the second bushing proximal end wall of the second bushing.

17. The driver assembly of claim 13 wherein the driver fitting of the elongated shaft includes an enlarged head which abuts the first bushing distal end wall to constrain axial movement of the elongated shaft with respect to the tube assembly in the first direction.

18. The driver assembly of claim 13 wherein the second end portion of the elongated shaft includes a stop which abuts the second bushing proximal end wall to constrain axial movement of the elongated shaft with respect to the tube assembly in the direction opposite the first direction.

19. The driver assembly of claim 13 wherein the first end portion of the elongated shaft supported in the first bushing has an enlarged diameter with respect to a central portion of the elongated shaft and the second end portion of the elongated shaft supported in the second bushing has an enlarged diameter with respect to a central portion of the elongated shaft.

20. The driver assembly of claim 13 wherein the first bushing distal end wall of the first bushing is axially spaced from the distal end wall of the first end of the main tube and the second bushing proximal end wall of the second bushing is axially spaced from the proximal end wall of the second end of the main tube.

* * * * *